(12) United States Patent
Kaku et al.

(10) Patent No.: US 6,298,036 B1
(45) Date of Patent: Oct. 2, 2001

(54) MULTIPLEX TRANSMISSION SYSTEM WHEREIN ANALOG SIGNAL IS TRANSFORMED TO BASE BAND, RANDOM-TRANSFORMED AND SUPERIMPOSED ON DISPERSED SIGNAL POINTS IN VECTOR SIGNAL SPACE

(75) Inventors: Takashi Kaku; Ryoji Okita; Noboru Kawada, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/916,595

(22) Filed: Aug. 22, 1997

Related U.S. Application Data

(63) Continuation of application No. 08/482,742, filed on Jun. 7, 1995, now Pat. No. 5,710,754, which is a continuation of application No. 08/240,093, filed on May 9, 1994, now abandoned, which is a continuation of application No. 08/004,762, filed on Jan. 14, 1993, now abandoned.

(30) Foreign Application Priority Data

Jan. 14, 1992 (JP) .................................................. 4-004860
Sep. 30, 1992 (JP) .................................................. 4-260925

(51) Int. Cl.<sup>7</sup> ................................................. H04J 11/00
(52) U.S. Cl. ...................... 370/207; 370/527; 370/537; 375/222
(58) Field of Search .................................. 370/204, 206, 370/207, 527, 529, 480, 481, 465, 537; 375/222, 261, 216, 377

(56) References Cited

U.S. PATENT DOCUMENTS 3,718,766    2/1973    Stover .

(List continued on next page.)

FOREIGN PATENT DOCUMENTS 0 506 400    9/1992    (EP) .
WO 92/09153    5/1992    (WO) .

OTHER PUBLICATIONS

Hill et al. A Performance Study of NLA 64–State QAM, IEEE Transactions on Communications, Jun. 1983, pp. 824–826.

(List continued on next page.)

*Primary Examiner*—Chau Nguyen
*Assistant Examiner*—Phuongchau Ba Nguyen
(74) *Attorney, Agent, or Firm*—Helfgott & Karas, P.C.

(57) ABSTRACT

A transmission system for transmitting a data signal with an analog passband signal through a analog transmission line. The data signal is transformed to a signal representing a descrete data signal point in a vector signal space. The analog passband signal is transformed to a base band signal, and the base band signal is superimposed on the signal representing a descrete data signal point. A signal representing the superimposed data signal point is modulated and transmitted through the analog transmission line. In a receiver, the data signal point is decided from the signal representing the superimposed data signal point, and the superimposed bass band signal is extracted by subtracting the decided result from the signal representing the superimposed data signal point. The base band signal is transformed to the analog passband signal. A portion of information carried by the analog passband signal may be converted to a digital signal, and the digital signal is multiplexed with the data signal. Further, a portion of information of each of a plurality of analog passband signals may be converted to a digital signal, and the digital signal is multiplexed with each other, and the other portion of the information is transformed to a base band signal, and the base band signal is superimposed on a signal representing a data signal point generated from a signal generated by the multiplexing.

15 Claims, 63 Drawing Sheets

U.S. PATENT DOCUMENTS

| | | |
|---|---|---|
| 3,809,817 * | 5/1974 | Gill et al. . |
| 3,870,828 | 3/1975 | Saliga . |
| 4,534,040 | 8/1985 | Thapar . |
| 4,630,287 | 12/1986 | Armstrong . |
| 4,651,320 | 3/1987 | Thapar . |
| 5,022,053 | 6/1991 | Chung et al. . |
| 5,105,442 | 4/1992 | Wei . |
| 5,105,443 | 4/1992 | Retts et al. . |
| 5,164,963 | 11/1992 | Lawrence et al. . |
| 5,214,656 | 5/1993 | Chung et al. . |
| 5,448,555 | 9/1995 | Bremer et al. . |

OTHER PUBLICATIONS

Ishio et al. A Proposal of a Carrier Digital Transmission System Using Multilevel APSK, 1975.

T. Hill et al., "A Performance Study of NLA 64. State QAM", IEEE Transactions on Communications, vol. 31, No. 6, Jun. 1983, New York, US, pp. 821–826.

* cited by examiner

SOUND SIGNAL
(BASE BAND)

SOUND DATA

Fig. 22

BIT SERIES IN
OUTPUT OF SCRAMBLER 20
$D_1$ $D_0$ $C_1$ $C_0$ $B_1$ $B_0$ $A_1$ $A_0$ ⇨
(2,400 BAUD)

| $X_2$ | $X_1$ | $X_0$ | |
|---|---|---|---|
| $A_1$ | $A_0$ | $X_0$ | FIRST SYMBOL |
| $B_1$ | $B_0$ | $A_1$ | SECOND SYMBOL |
| $C_1$ | $C_0$ | $B_1$ | THIRD SYMBOL |
| $D_1$ | $D_0$ | $C_1$ | FOURTH SYMBOL |
| ... | ... | ... | ... |

Fig. 23

BIT SERIES IN
OUTPUT OF SCRAMBLER 20
C₂ C₁ C₀ B₂ B₁ B₀ A₂ A₁ A₀ ⇨
(3,200 BAUD)

| X₂ X₁ X₀ | |
|---|---|
| A₂ A₁ A₀ | FIRST SYMBOL |
| B₂ B₁ B₀ | SECOND SYMBOL |
| C₂ C₁ C₀ | THIRD SYMBOL |
| D₂ D₁ D₀ | FOURTH SYMBOL |
| ... | ... |

| EXTRACTED SET OF BITS | X2 | X1 | X0 | |
|---|---|---|---|---|
| | 1 | 2 | 3 | 1ST SYMBOL (1/2880 SEC) |
| | 5 | 6 | 7 | 2ND SYMBOL (1/2880 SEC) |
| | 9 | 10 | 11 | 3RD SYMBOL (1/2880 SEC) |
| | 13 | 14 | 15 | 4TH SYMBOL (1/2880 SEC) |
| | 17 | 18 | 19 | 5TH SYMBOL (1/2880 SEC) |
| | 21 | 22 | 23 | 6TH SYMBOL (1/2880 SEC) |

MULTIPLEX TRANSMISSION SYSTEM WHEREIN ANALOG SIGNAL IS TRANSFORMED TO BASE BAND, RANDOM-TRANSFORMED AND SUPERIMPOSED ON DISPERSED SIGNAL POINTS IN VECTOR SIGNAL SPACE

This is a continuation of application Ser. No. 08/482,742, now U.S. Pat. No. 5,710,754 filed Jun. 7, 1995, which is a continuation of application Ser. No. 08/240,093 filed May 9, 1994 now abandoned, which is in turn a continuation of application Ser. No. 08/004,762 filed Jan. 14, 1993 now abandoned.

BACKGROUND OF THE INVENTION

1. Field of the Invention

The present invention relates to a transmission system wherein information carried by at least one analog signal and a data signal are multiplexed and transmitted. The present invention relates, in particular, to a multiplex transmission system wherein information carried by at least one analog signal including, for example, a voice signal and facsimile signal is multiplexed with a data signal and transmitted through an analog transmission (telephone) line of two wires or four wires.

2. Description of the Related Art

Recently, various types of signals including telephone (voice) signals, facsimile signals, data signals, and image data signals are multiplexed and transmitted in digital transmission systems. However, analog transmission lines are still mainly used in the presently equipped networks except basic transmission lines since it takes a long time for the digital transmission lines to prevail, and the running costs of the digital transmission lines are relatively high. Therefore, data signals are modulated by modems and transmitted through analog transmission lines, and then analog voice signals cannot be transmitted through the same analog transmission line as the analog transmission line through which the data signals modulated by modems are transmitted at the same time. Thus, development of a technique whereby various types of signals including telephone (voice) signals, facsimile signals, data signals, and image data signals can be multiplexed and transmitted in an analog transmission line, is required.

FIG. 1 is a diagram illustrating a transmission system connected between a main office 1000 and a branch office 1200, between the main office 1000 and a plurality of sub-branch offices 116-1 to 116-n, and between the branch office 1200 and a plurality of other sub-branch offices 116-1' to 116-n'. The main office 1000 and the branch office 1200 are connected by a digital transmission line 1400 through which digital multiplex signals are transmitted, where telephone (voice) signals, facsimile signals, data signals, and image data signals are multiplexed into the respective multiplex signals. However, taking the high running cost of the digital transmission lines into consideration, the main office 1000 and the plurality of subbranch offices 116-1' to 116-n are connected by a plurality of analog transmission lines 121-1 to 121-n and 122-1 to 122-n, where a plurality of data signals are modulated by modems 120-1 to 120-n and transmitted through the analog transmission lines 121-1 to 121-n, and the analog voice signals are transmitted through the analog transmission lines 122-1 to 122-n. Similarly, the branch office 1200 and the plurality of sub-branch offices 116-1' to 116-n' are connected by a plurality of analog transmission lines 121-1' to 121-n' and 122-1' to 122-n', where a plurality of data signals are modulated by modems 120-1' to 120-n' and transmitted through the analog transmission lines 121-1' to 121-n', and the analog voice signals are transmitted through the analog transmission lines 122-1' to 122-n'. Since transmission of data signals and transmission of analog signals are often carried out concurrently, the analog transmission lines 121-1 to 121-n and 122-1 to 122-n are separately used for transmitting the data signals and for transmitting the analog voice signals, respectively, between the main office 1000 and the plurality of sub-branch offices 116-1 to 116-n. Similarly, the analog transmission lines 1211' to 121-n' and 122-1' to 122-n' are separately used for transmitting the data signals and for transmitting the analog voice signals, respectively, between the branch office 1200 and the plurality of sub-branch offices 116-1' to 116-n'. The transmission system of FIG. 1 has a drawback that a great number of transmission lines must be subscribed to, and therefore, the cost for the subscription and equipment for the great number of transmission lines is great.

SUMMARY OF THE INVENTION

A first object of the present invention is to provide a multiplex transmission system wherein information carried by at least one analog signal and a data signal are multiplexed and transmitted through a single analog transmission line.

A second object of the present invention is to provide a multiplex transmission system wherein information carried by more than one analog signal is multiplexed and transmitted through a single analog transmission line.

According to the first aspect of the present invention, there is provided a transmission system comprises a transmitter, a receiver, and an analog transmission line; the transmitter including a data signal point generation unit for receiving a serial digital data signal, and generating a first vector base band signal in a vector signal space, based on a block series of samples of the received serial digital data signal, wherein the generated data signal point is one of a plurality of predetermined data signal points in the vector signal space, a base band transformation unit for receiving an analog voice or facsimile signal in the form of a passband signal, and transforming the analog voice or facsimile signal into a second vector base band signal; a vector signal superimposing unit for superimposing a plurality of vector components of the second vector base band signal on a plurality of vector components of the first vector base band signal, component by component to generate a superimposed vector base band signal, and a modulation unit for modulating the superimposed vector base band signal to generate an analog modulated signal to be transmitted through the analog transmission line; the receiver including a demodulator unit for receiving the analog modulated signal transmitted through the analog transmission line, and demodulating the analog modulated signal to regenerate the superimposed vector base band signal, a decision unit for receiving the regenerated superimposed vector base band signal, and determining as to which one of the plurality of predetermined data signal points in the vector signal space the regenerated superimposed vector base band signal corresponds (is nearest), to regenerate the first vector base band signal, a vector signal subtracter unit for receiving the regenerated superimposed vector base band signal and the regenerated first vector base band signal, and subtracting a plurality of vector components of the first vector base band signal from a plurality of vector components of the superimposed vector base band signal, component by component, to regenerate the respective vector components of the second base band signal, a code transformation unit for receiving the first vector base band signal, and transforming the first vector base band signal to regenerate the serial digital data signal, and a passband transformation unit for receiving the regenerated second base band signal, and transforming the regenerated second base band signal to regenerate the analog voice or facsimile signal in the form of the passband signal.

According to all the aspects and embodiments of the present invention, the analog signal inputted into the transmitter may be any kind of analog signal, and may not be a passband signal. When the analog signal input into the transmitter is not a passband signal, the base band transformation unit transforms the analog signal to the base band signal, and the passband transformation unit in the receiver transforms the regenerated base band signal to the analog signal which is inputted into the transmitter.

According to a second aspect of the present invention, in addition to the system of the first aspect of the present invention, the demodulator unit may comprise an equalizer unit for equalizing the analog modulated signal after demodulating to regenerate the superimposed vector base band signal. The transmitter further includes a random transformation unit, provided between the base band transformation unit and the vector signal superimposing unit, for receiving the second vector base band signal from the base band transformation unit, and shifting the phase of the second base band signal by random phase shift values, to generate and supply to the vector signal superimposing unit a randomly transformed second vector base band signal so that the frequency spectrum of the second vector base band signal uniformly spreads over a whole frequency band. The above vector signal superimposing unit receives the randomly transformed second vector base band signal, superimposing a plurality of vector components of the randomly transformed second vector base band signal, instead of the second vector base bland signal, on a plurality of vector components of the first rector base band signal, component by component to generate a superimposed vector base band signal. The demodulator unit regenerates the randomly transformed second vector base band signal instead of the superimposed vector base band signal. The receiver further includes an inverse random transformation unit for inversely shifting the phase, which is randomly shifted by the random transformation unit in the transmitter, of the randomly transformed second vector base band signal to regenerate and supply to the passband transformation unit the second vector base band signal. In an embodiment of the transmission system, the transmitter may further include a scrambler unit for scrambling the serial digital signal before the serial data signal is received by the data signal point generation unit. The data signal point generation unit receives the scrambled serial data signal instead of the serial digital data signal, and generates the first vector base band signal, based on a block series of samples of the serial digital data signal received after being scrambled by the scrambler unit. The code transformation unit in the receiver receives the first vector base band signal, and transforms the first vector base band signal to regenerate the scrambled serial digital data signal. The receiver further includes a descrambler unit for descrambling the scrambled digital data signal to regenerate the digital data signal.

According to the third aspect of the present invention, the transmitter may further include an amplitude control circuit for receiving the second vector base band signal from the base band transformation unit, and controlling the amplitude of the second vector base band signal so that the amplitude of the second base band signal is maintained below a predetermined level. A secondary channel may be provider from the receiver to the transmitter.

The receiver may include a signal quality detecting unit for monitoring an error rate in the second digital base band signal regenerated by the vector signal subtracter unit, and transmitting information on the error rate from the transmitter to the receiver through the secondary channel. The transmitter may further include an amplitude control signal generating unit for receiving the information on the error rate from the signal quality detecting unit in the receiver, and generating and supplying to the amplitude control circuit, an amplitude control signal for controlling the operation of the amplitude control circuit. The amplitude control circuit in the transmitter includes an automatic gain control unit for receiving the second vector base band signal from the base band transformation unit, and controlling the amplitude of the second vector base band signal according to the amplitude control signal; a maximum level limiting unit for limiting positive peaks of the respective vector components of the second vector base band signal after the amplitude of the second vector base band signal is controlled by the automatic gain control unit, to a first level according to the amplitude control signal, and a minimum level limiting unit for limiting negative peaks of the respective vector components of the second vector base band signal, after the amplitude of the second vector base band signal is controlled by the automatic gain control unit, to a second level according to the amplitude control signal.

According to a fourth aspect of the present invention, the transmission system includes the features of both the second and third aspects of the present invention.

According to a fifth aspect of the present invention, the decision unit performs a soft decision.

According to a sixth aspect of the present invention, there is provided a transceiver including the transmitter and the receiver according to the fifth aspect of the present invention, and further contains a hybrid circuit fear coupling the transmitter and the receiver with a two-wire analog transmission line; and an echo estimation unit for monitoring the superimposed vector base band signal and the input of the receiver, and estimating a leakage signal from the transmitter side through the hybrid circuit to the receiver side to regenerate the leakage signal. The regenerated leakage signal is supplied to a signal subtracter unit to subtract the regenerated leakage signal from a receiving signal which is received at the hybrid circuit and is to be supplied to the receiver.

According to a seventh aspect of the present invention, there is provided a transmission system which includes a transmitter, a receiver, and an analog transmission line. The transmitter includes a base band transformation unit for receiving an analog voice or facsimile signal in the form of a passband signal, and transforming the analog voice or facsimile signal into a first vector base band signal; a signal information division unit for receiving the first vector base band signal, and dividing information carried by the first vector base band signal into first and second portions, wherein the first portion of information is supplied to a time division multiplex unit as a first digital signal, and the second portion of information is supplied to a vector signal superimposing unit as a second vector base band signal; a time division multiplex unit having first and second signal input ports and at least one signal output port, for receiving the first digital signal from the signal information division unit through the first signal input port, and a second digital signal (data signal) through the second signal input port, and multiplexing the first and second digital signals to supply the multiplexed digital signal to a data signal point generation unit; a data signal point generation unit for receiving the multiplexed digital signal, and generating a third vector base band signal representing a data signal point in a vector signal space, based on a block (or series) of samples of the received multiplexed digital signal, wherein the generated data signal point is one of a plurality of predetermined data signal points in the vector signal space; a vector signal superimposing unit for superimposing a plurality of vector components of the second vector base band signal on a plurality of vector components of the third vector base band signal, component by component to generate a superimposed vector base band signal; and a modulation unit for modulating the superimposed vector base band signal to generate an analog modulated signal to be transmitted through an analog transmission line. The receiver includes a demodulator unit for receiving the analog modulated signal, and demodulating the analog modulated signal to regenerate the superimposed vector base band signal; a decision unit for receiving the regenerated superimposed vector base band signal, and determining as to which one the plurality of predetermined data signal points in the vector signal space the regenerated superimposed vector base band signal corresponds (is nearest), to regenerate the third vector base band signal; a code transformation unit receiving the third vector base band signal, and transforming the third vector base band signal to the multiplexed digital signal; a vector signal subtracter unit receiving the regenerated superimposed vector base band signal and the regenerated third vector base band signal, and subtracting a plurality of vector components of the third vector base band signal from a plurality of vector components of the superimposed vector base band signal, component by component, to regenerate the respective vector components of the second vector base band signal, wherein the regenerated second vector base band signal is supplied to a signal synthesis unit; a time division demultiplex unit for receiving the regenerated multiplexed digital signal, and demultiplexing the regenerated multiplexed digital signal to regenerate the first and second digital signals, wherein the regenerated first digital signal is supplied to the signal synthesis unit; the signal synthesis unit for receiving the regenerated second vector base band signal and the regenerated first digital signal, and synthesizing the first and second signals to regenerate the first vector base band signal, wherein the regenerated first vector base band signal is supplied to a passband transformation unit; and a passband transformation unit for receiving the regenerated first base band signal, and transforming the regenerated first base band signal to the analog voice or facsimile signal in the form of the passband signal.

According to an eighth aspect of the present invention, there is provided a transmission system which includes a transmitter, a receiver, and an analog transmission line. The transmitter includes a plurality of base band transformation units respectively provided for a plurality of channels of analog passband signals, each of the plurality of base band transformation units receiving the analog passband signal of the channel, and transforming the analog passband signal into a base band signal; a plurality of quantization units respectively provided for a plurality of channels of analog passband signals, each of the plurality of quantization units receiving the base band signal generated by the base band transformation unit provided for the channel, generating a first portion of information for the channel based on the base band signal, and quantizing the first portion of information to supply the quantized first portion of information to the time division multiplex unit; a plurality of remainder signal generation units respectively provided for a plurality of channels, of analog passband signals, each of the plurality of remainder signal generation units, receiving the base band signal generated by the base band transformation unit provided for the channel and generating a second portion of the information for the channel based on the base band signal; a time division multiplex unit for receiving the quantized first portions of information for the plurality of channels, and multiplexing the first portions of information for the plurality of channels to generate a multiplexed signal; a data signal point generation unit for receiving the multiplexed signal, and generating a data signal point signal representing a data signal point based on the multiplexed signal, wherein the generated data signal point is one of a plurality of predetermined data signal points the vector signal space; a signal adder for superimposing the second portion of information for the plurality of channels on the data signal point signal; and a modulation unit for receiving and modulating the digital signal point signal on which the second portions are superimposed to transform the data signal point signal on which the second portions are superimposed, to an analog modulated signal to be transmitted to the receiver through the analog transmission line. The receiver includes a demodulator and equalizer unit for receiving and demodulating the analog modulated signal transmitted from the transmitter; a decision unit for determining the data signal point included in the signal demodulated and equalized by the demodulator and equalizer unit, to regenerate the data signal point signal; a vector signal subtracter for obtaining a difference between the signal demodulated and equalized by the demodulator and equalizer unit, and the data signal point signal regenerated by the decision unit; a code transformation unit for receiving and transforming the data signal point signal regenerated by the decision unit to regenerate the multiplexed signal; a time division demultiplex unit for receiving and demultiplexing the multiplexed signal to regenerate the quantized first portions of information for the plurality of channels; a plurality of signal synthesis units respectively provided for the plurality of channels, each of the plurality of signal synthesis units receiving the first and second portions of information for the channel, and regenerating the base band signal for the channel, based on the first and second portions of information for the channel, wherein each of the plurality of signal synthesis units comprises an inverse quantization unit provided for each of the plurality of channels, each of the plurality of inverse quantization units receiving and inversely quantizing the quantized first portion of information for the channel, to regenerate the first portion of information for the channel; and a passband transformation units respectively provided for the plurality of channels, each of the plurality of passband transformation units receiving the base band signal for the channel, and transforming the base band signal to regenerate the passband signal for the channel.

BRIEF DESCRIPTION OF THE DRAWINGS

In the drawings:

FIG. 22 is a diagram illustrating the operation of the bit extracting unit in the case of 2,400 Baud;

FIG. 23 is a diagram illustrating the operation of the bit extracting unit in the case of 3,200 Baud;

DESCRIPTION OF THE BASIC CONSTRUCTION OF THE FIRST ASPECT OF THE INVENTION

Figure 1:
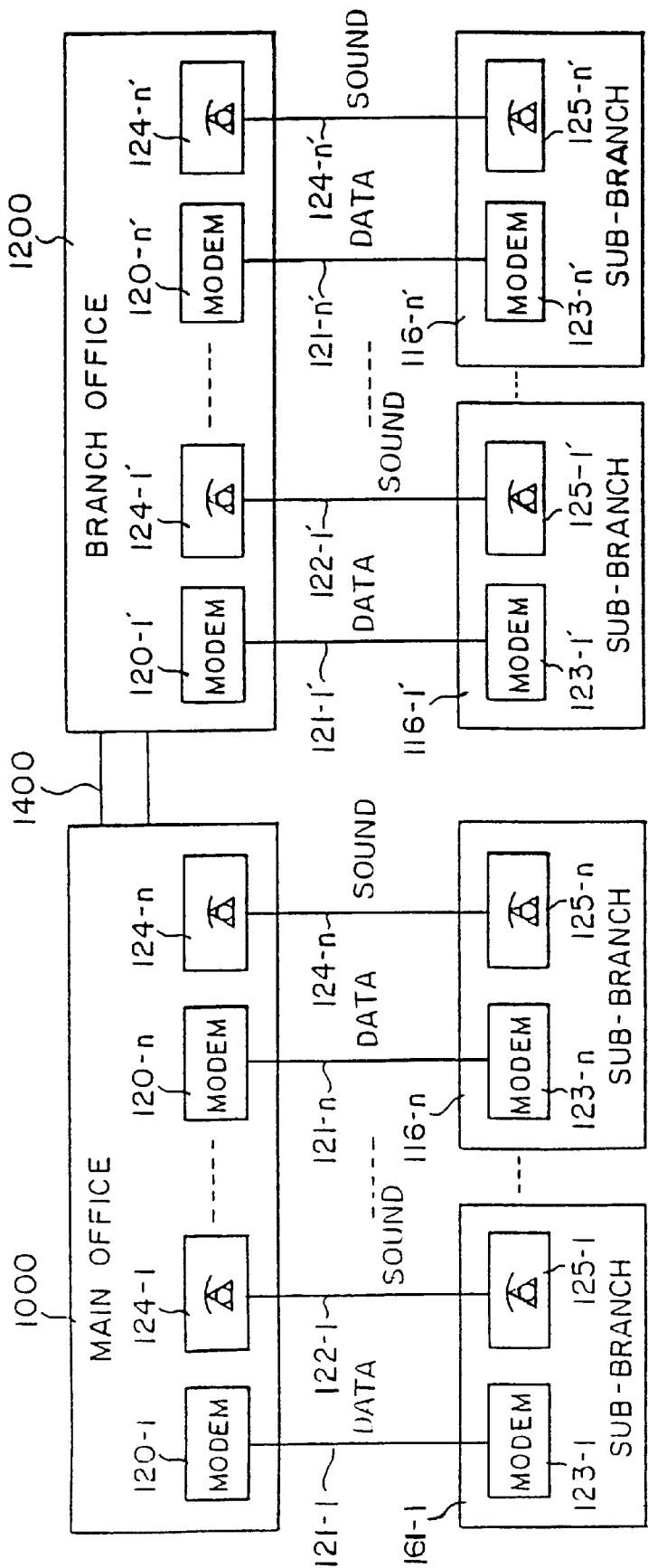
FIG. 1 is a diagram illustrating a transmission system connected between a main office and a branch office, between the main office and a plurality of sub-branch offices, and between the branch office and a plurality of other sub-branch offices in accordance with the prior art.
Figure 2:
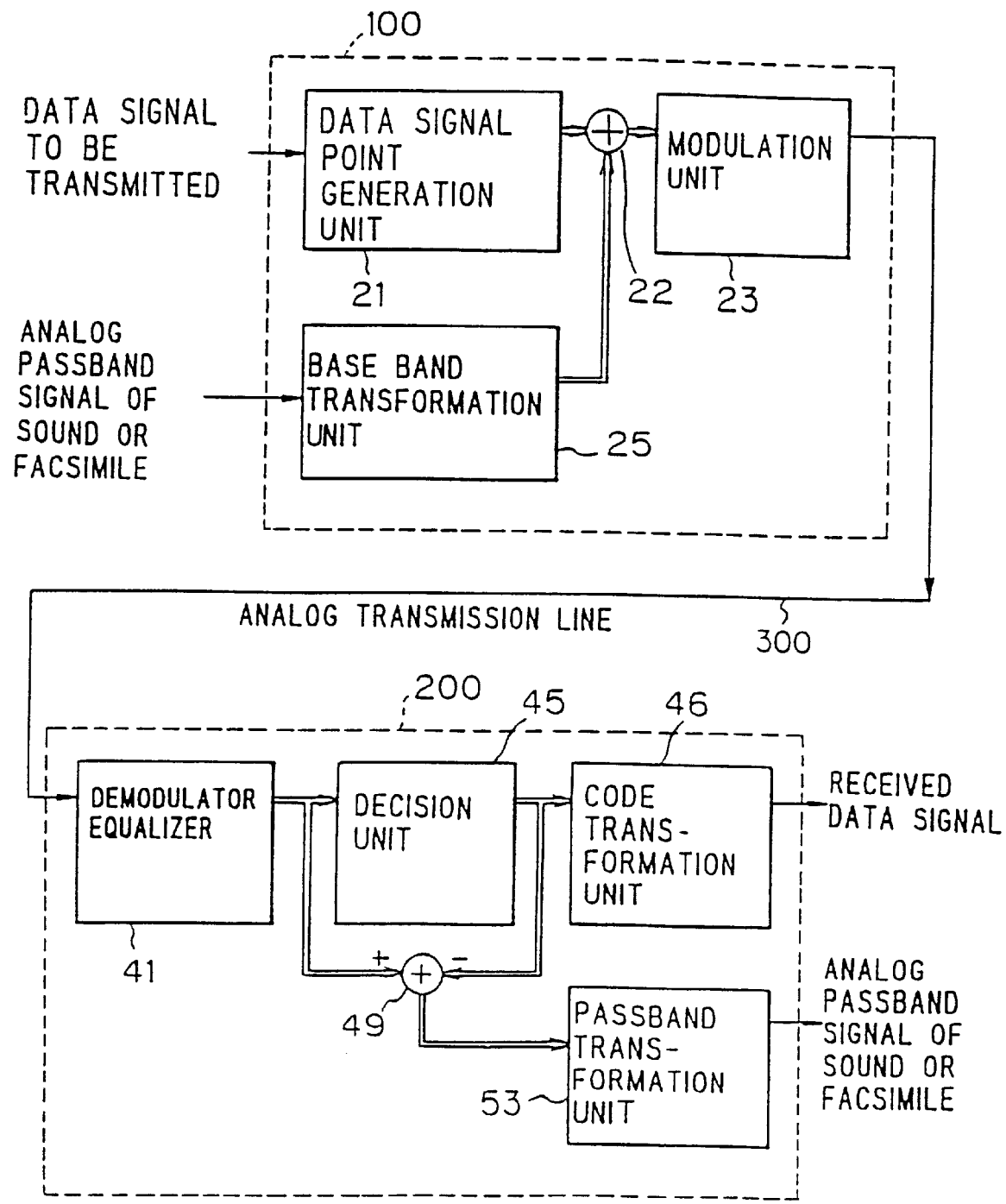
FIG. 2 is a block diagram illustrating a transmission system according to the first aspect of the present invention.

FIG. 2 is a diagram illustrating a transmission systems according to the first aspect of the present invention. In FIG. 2, reference numeral 100 denotes a transmitter, and 200 denotes a receiver. In the transmitter 100, reference numeral 21 denotes a data signal point generation unit, 22 denotes a vector signal superimposing unit (signal adder), 23 denotes a modulation unit, and 25 denotes a base band transformation unit. In the receiver 200, reference numeral 40 denotes a demodulator/equalizer, 45 denotes a decision unit, 46 denotes a code transformation unit, 49 denotes a vector signal subtracter unit, and 53 denotes a passband transformation unit.

In the transmitter 100, the data signal point generation unit 21 receives a serial digital data signal, and generates a data signal point (a first vector base band signal) in a vector signal space, based on a block (or series) of samples of the received serial digital data signal. The generated data signal point is one of a plurality of predetermined data signal points in the vector signal space. The base band transformation unit 25 receives an analog voice or facsimile signal in the form of a passband signal, and transforms the analog voice or facsimile signal into a second vector base band signal. The vector signal superimposing unit (signal adder) 22 superimposes a plurality of vector components of the second vector base band signal on a plurality of vector components of the first vector base band signal, component by component to generate a superimposed vector base band signal. The modulation unit 23 modulates the superimposed vector base band signal to generate an analog modulated signal. The analog modulated signal is transmitted through an analog transmission line 300 connecting the transmitter 100 with the receiver 200.

In the receiver 200, the demodulator/equalizer 40 receives the analog modulated signal, and equalizes and demodulates the analog modulated signal to regenerate the above superimposed vector base band signal. The decision unit 45 receives the regenerated superimposed vector base band signal, and determines which one of the plurality of predetermined data signal points in the vector signal space the above regenerated superimposed vector base band signal corresponds to (is nearest) to regenerate the above first vector base band signal. The code transformation unit 46 receives the first vector base band signal, and transforms the same to regenerate the above serial digital data signal. The vector signal subtracter unit 49 receives the above regenerated superimposed vector base band signal and the above regenerated first vector base band signal, and subtracts a plurality of vector components of the first vector base band signal from a plurality of vector components of the superimposed vector base band signal, component by component, to regenerate the respective vector components of the above second base band signal. The passband transformation unit 53 receives the regenerated second base band signal, and transforms the same to regenerate the above analog voice or facsimile signal in the form of the passband signal. In the construction of the receiver 200, the function of the equalization may be eliminated from the most essential construction of the first aspect of the invention.

OPERATION OF THE FIRST ASPECT OF THE INVENTION (FIGS. 3–8)

Figure 3:
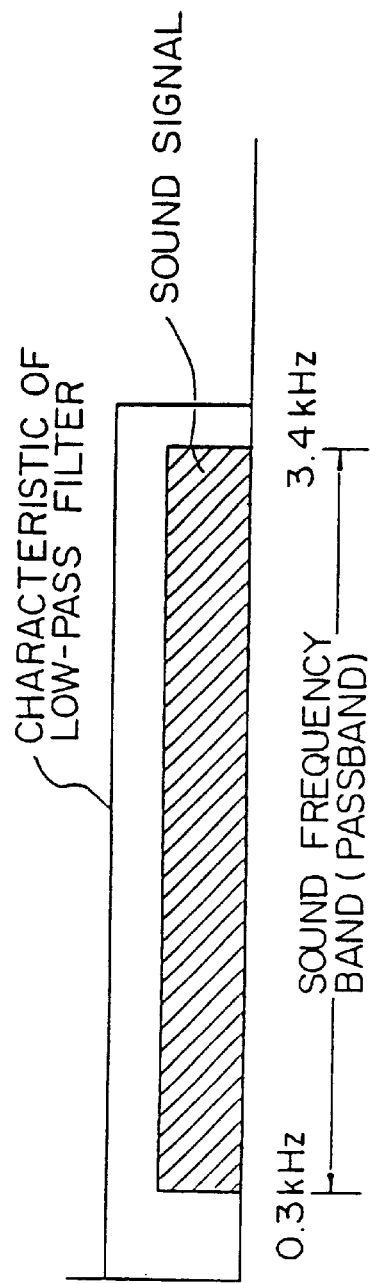
FIG. 3 is a diagram illustrating the frequency bands of the analog passband signal.

Generally, the frequency band of analog passband signals transmitting through an analog transmission line ranges from 0.3 to 3.4 kHz as indicated in FIG. 3, and frequencies of the analog voice signals and the data signals modulated by the modems are within the frequency band. Therefore, when the analog voice signals and the data signals modulated by the modems are simply multiplexed, they cannot be separated, and frequency division multiplex is also impossible.

Figure 4:
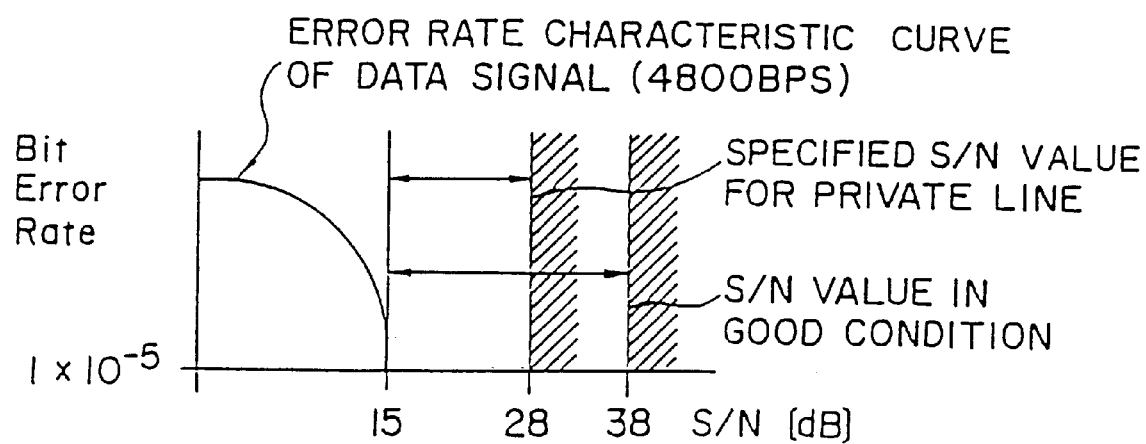
FIG. 4 is a diagram illustrating an error rate characteristic of analog data signals when the transmission rate is 4,800 bps.

FIG. 4 shows an error rate characteristic of analog data signals when the transmission rate is 4,800 bps. As shown in FIG. 4, an error rate of $1 \times 10^{-5}$ is satisfied when the signal-to-noise ratio (S/N) is 15 dB. The specified value of the signal-to-noise ratio (S/N) for an analog privates transmission line is 28 dB, and the signal-to-noise ratio (S/N) of 38 dB can be achieved when the condition of the analog private transmission line is good. Namely, there is a considerable amount of noise margin. According to the present invention, the above noise margin is utilized to superimpose signal components corresponding to analog signals on data signals to enable transmission of the superimposed signal through a single analog transmission line. Namely, signal components corresponding to analog signals of a level which does not cause an error rate more than $1\times10^{-5}$ can be superimposed as noise components on the data signals.

Figure 7:
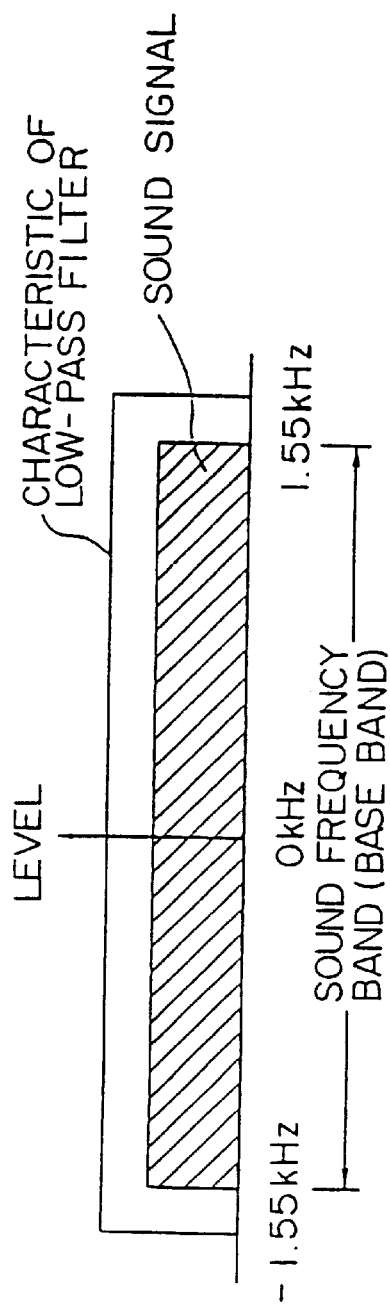
FIG. 7 is a diagram illustrating the frequency band of the analog base band signal.
Figure 5:
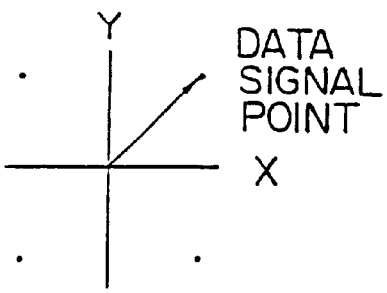
FIG. 5 is a signal-space diagram illustrating a constellation comprised of four data signal points generated by the data signal point generation unit of the system of FIG. 2.
Figure 6:
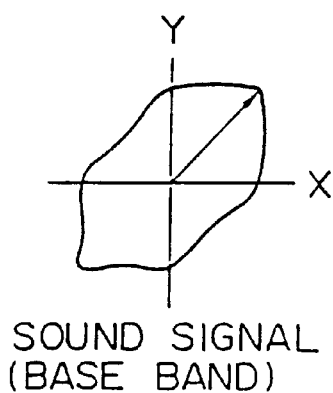
FIG. 6 is a signal-space diagram illustrating a vector base band signal transformed from an analog voice signal.
Figure 8:
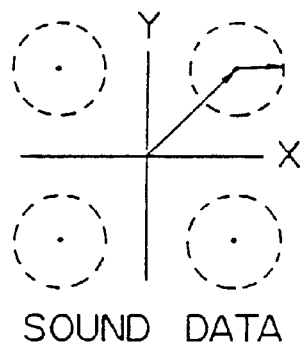
FIG. 8 is a signal-space diagram illustrating areas onto which the vector base band signal of FIG. 6 is superimposed.

For example, in case of a modulated signal of 4,800 bps according to the CCITT recommendation V.29, the Baud rate is 2,400 Baud. Therefore, transmission of 2 bits/symbol is carried out, and thus one of the four data signal points as indicated in FIG. 5 are generated from signal levels of the two bits for each symbol. FIG. 6 is a signal-space diagram illustrating a vector base band signal transformed from an analog voice signal. The transformed analog voice signal of FIG. 6 is not symmetric due to existence of correlation. FIG. 7 is a diagram illustrating the frequency band of the analog base band signal (the second vector base band signal) generated by the base band transformation unit 25. Details of the bass band transformation are explained later. The vector base band signal of FIG. 6 is superimposed on the data signal points of FIG. 5 into the areas within the circles indicated by dashed lines in FIG. 8. The circles of FIG. 8 are separated from each other so that the data signal points can be determined from the superimposed vector base band signal in the decision unit 43 in the receiver 200-1 with a low error rate.

In this specification, explanations are given for a two-dimensional signal space, and vector signals are expressed by a two-dimensional vectors having two vector components. The two components are often mentioned as a real part R and an imaginary part I, and a vector signal (R, I) may be expressed by a complex number R+jI on a complex plane, where j is an imaginary unit. However, the signal space used in the present invention is not limited to two-dimensional vector signals and a two-dimensional space, and generally, n-dimensional vector signals and n-dimensional signal spaces can be used, where n is an integer.

BASIC CONSTRUCTION OF THE SECOND ASPECT OF THE INVENTION (FIGS. 9–12)

Figure 9:
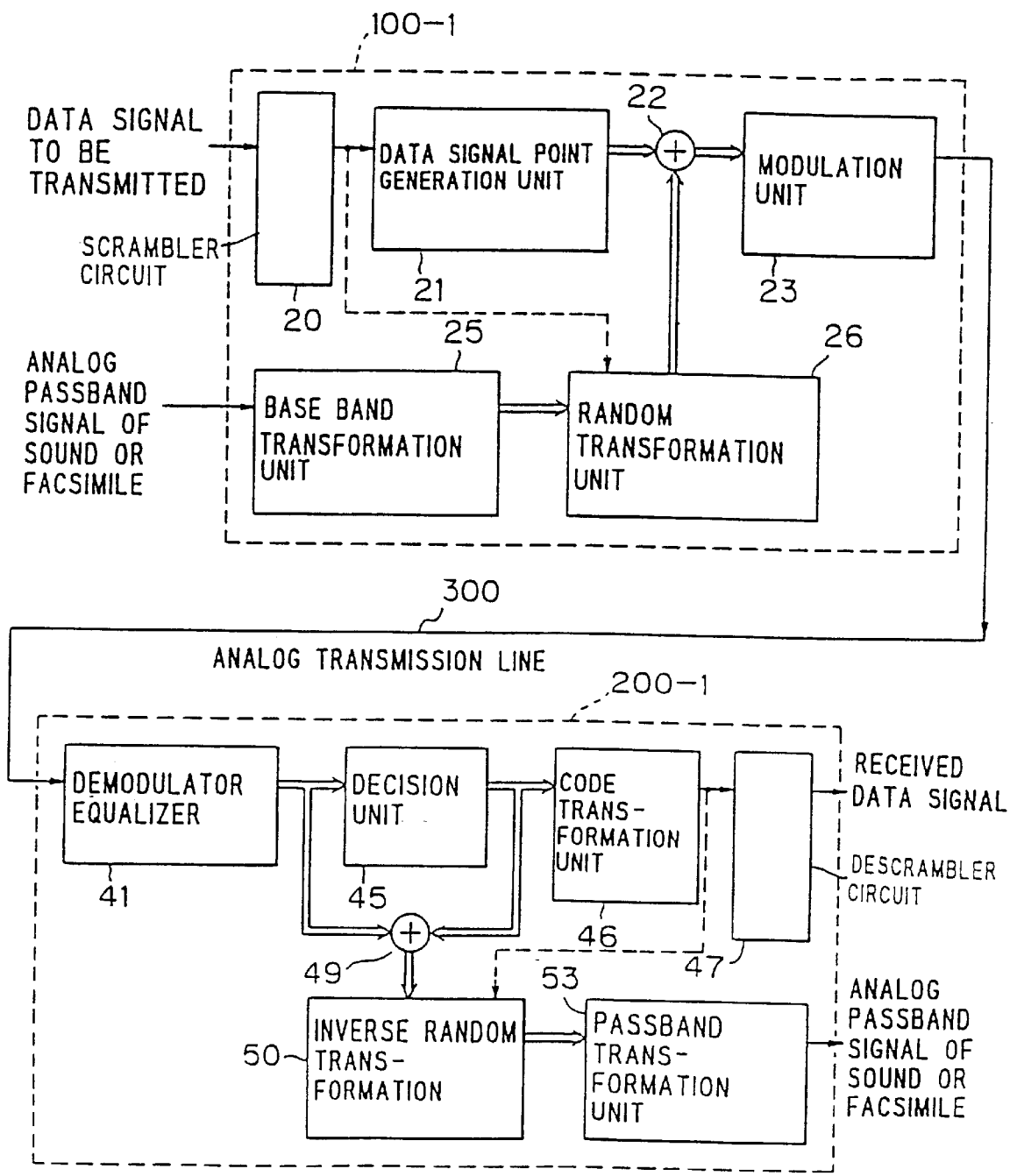
FIG. 9 is a block diagram illustrating a transmission system according to the second aspect of the present invention.

FIG. 9 is a block diagram illustrating a transmission system according to the second aspect of the present invention. In FIG. 9, reference numeral 100-1 denotes a transmitter, and 200-1 denotes a receiver. The transmitter 100-1 comprises a scrambler circuit 20 on the input side of the data signal point generation unit 21, and a random transformation unit 26 connected between the base band transformation unit 25 and the vector signal superimposing unit (signal adder) 22, in addition to the structural components shown in the construction of FIG. 2. The receiver 200-1 comprises a descrambler circuit 47 on the output side of the code transformation unit 46, and an inverse random transformation unit 50 connected between the vector signal subtracter unit 49 and the passband transformation unit 53, in addition to the construction of the receiver of FIG. 2.

Figure 10:
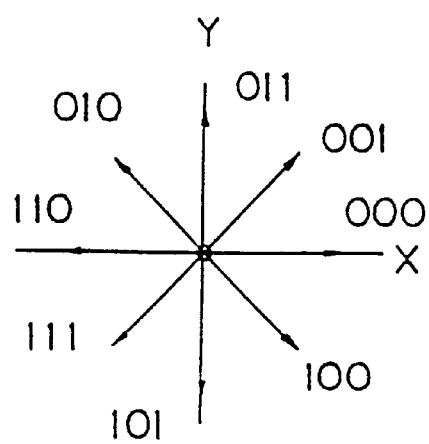
FIG. 10 is a signal-space diagram illustrating an example set of phase shift values generated in the random transformation unit of the system of FIG. 9.
Figure 11:
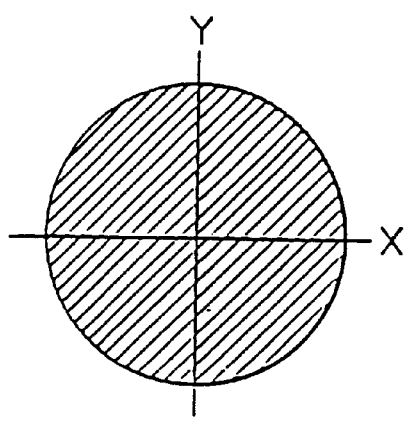
FIG. 11 is a signal-space diagram illustrating an example set of phase shift values generated in the random transformation unit.
Figure 12:
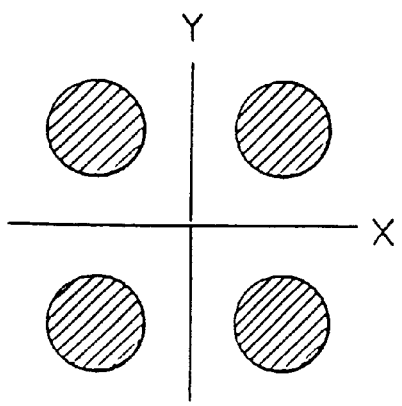
FIG. 12 is a signal-space diagram illustrating areas onto which the vector base band signal of FIG. 6 is superimposed.

The scrambler circuit 20 in the transmitter 100-1 scrambles the serial data signal before inputting the same into the data signal point generation unit 21. The random transformation unit 26 receives the second vector base band signal from the base band transformation unit 25 and shifts the phase of the second base band signal by random phase shift values, to generate a randomly transformed second vector base band signal so that the frequency spectrum of the second vector base band signal uniformly spreads over a whole frequency band. As explained in detail later, the random transformation unit 26 generates the phase shift values randomly, for example, as indicated in FIG. 10. In FIG. 10, eight phase shift values, 0°, 45°, 90°, 135°, 180°, 225°, 270°, 315°, and 360°, are generated. By randomly shifting the phase of the second vector base band signal, the randomly transformed second vector base band signal uniformly distributes on the vector signal space as indicated in FIG. 11. When the randomly transformed second vector base band signal of FIG. 11 is superimposed on the first vector base band signal from the data signal point generation unit 21 as indicated in FIG. 5 in the vector signal superimposing unit (signal adder) 22, the superimposed vector base band signal output from the vector signal superimposing unit 22 distributes as indicated in FIG. 12. Although not shown in FIG. 9, an equalizer for equalizing a received signal will be provided in the receiver 200-1. Since both the first and second base band signals are made random by the provision of the scrambler circuit 20 and the random transformation unit 26, an equalizer can stably perform the equalizing operation. In the receiver 200-1, the randomly transformed second vector base band signal is regenerated by the vector signal subtracter unit 49, and is supplied to the inverse random transformation unit 50. In the inverse random transformation unit 50, the phase, which is randomly shifted by the random transformation unit 26 in the transmitter 100-1, of the randomly transformed second vector base band signal is inversely shifted to regenerate the second vector base band signal. The regenerated second vector base band signal is supplied to the passband signal transformation unit 53. In addition, the scrambled digital data signal is regenerated by the code transformation unit 46, and the scrambled digital data signal is descrambled by the descrambler 47 to regenerate the digital data signal.

Figure 13:
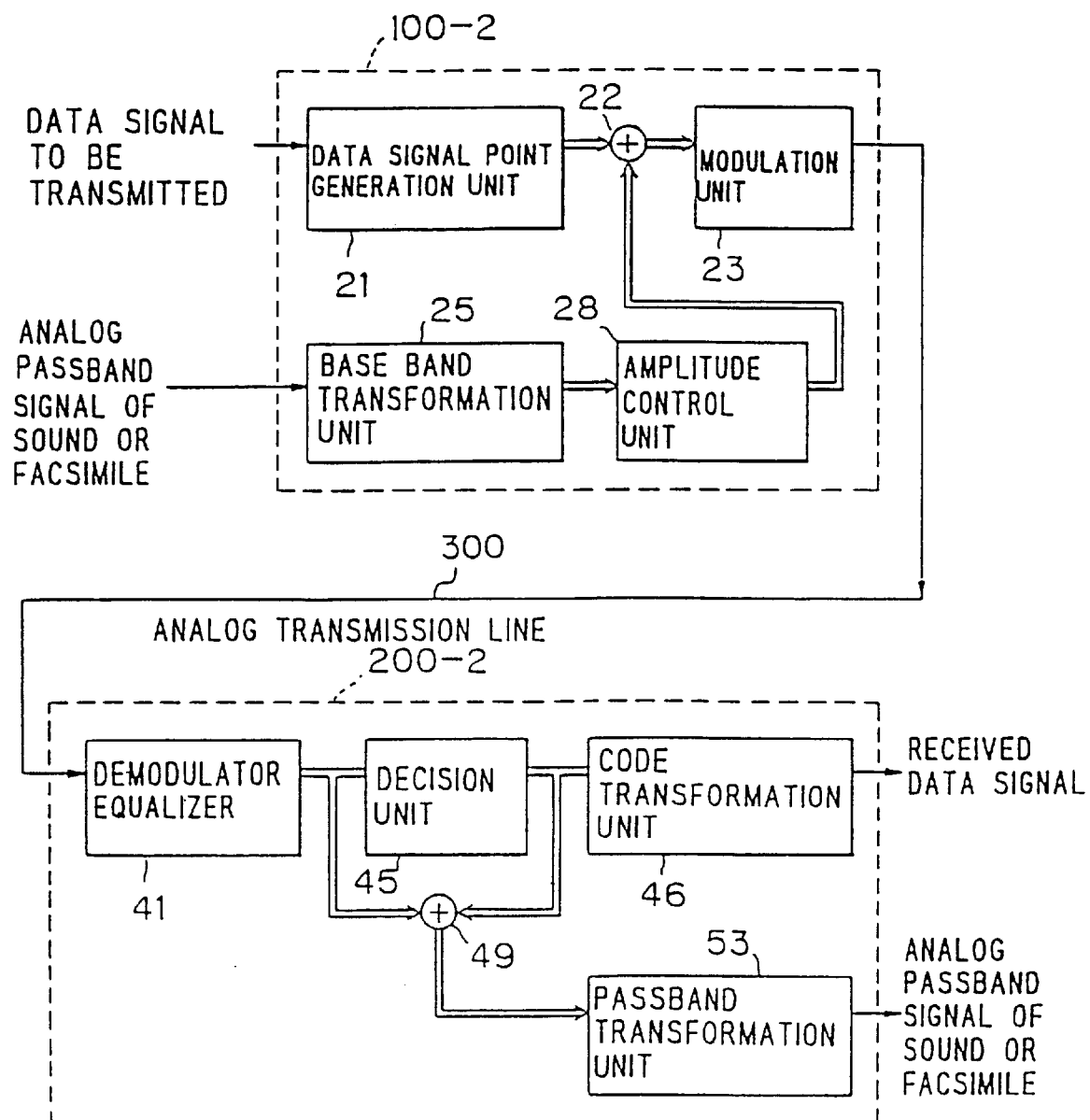
FIG. 13 is a block diagram illustrating a transmission system according to the third aspect of the present invention.
Figure 14:
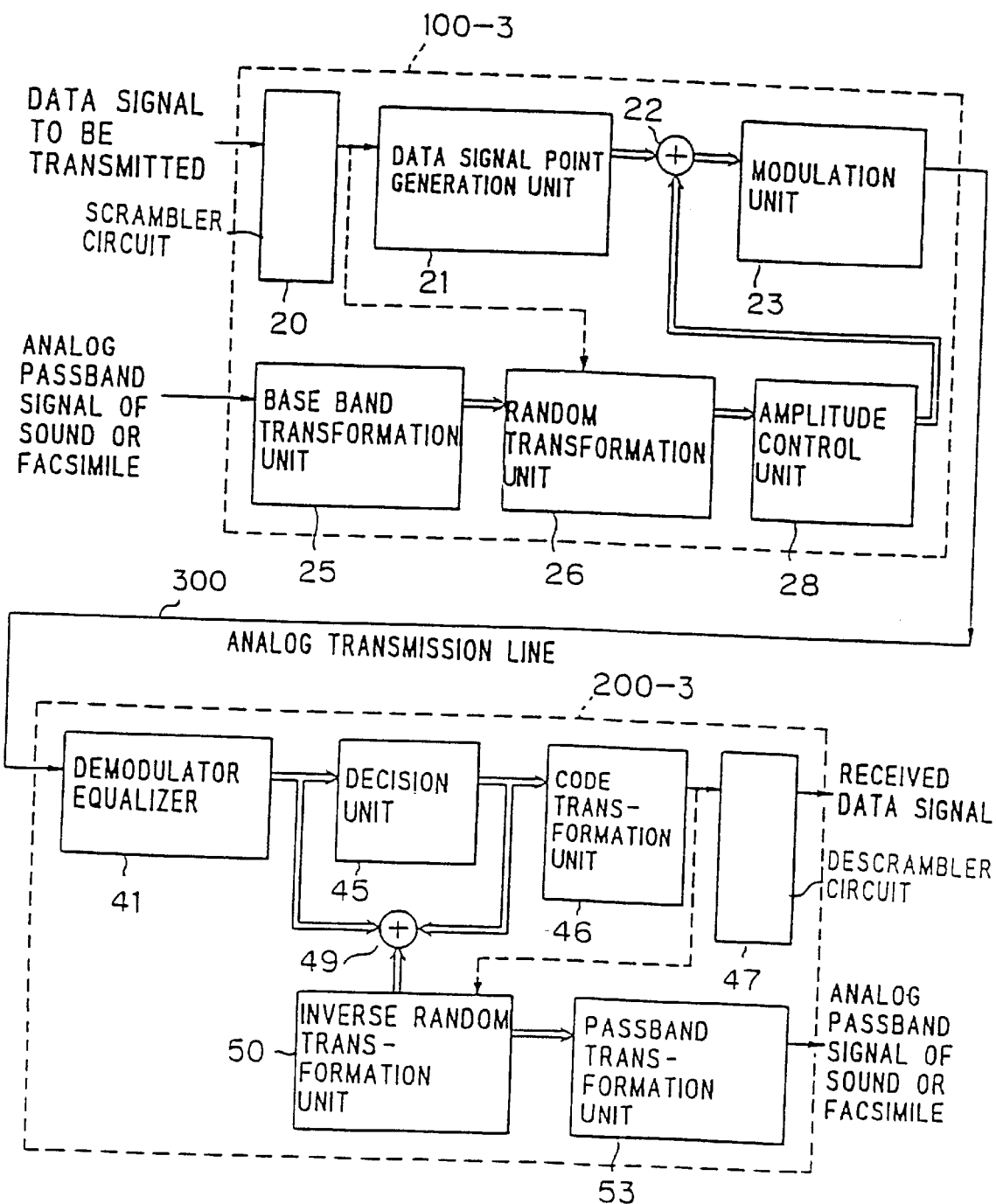
FIG. 14 is a block diagram illustrating a transmission system according to the fourth aspect of the present invention.

BASIC CONSTRUCTIONS OF THE THIRD AND FOURTH ASPECTS OF THE INVENTION (FIGS. 13 and 14)

FIG. 13 is a block diagram illustrating a transmission system according to the third aspect of the present invention. In FIG. 13, reference numeral 100-2 denotes a transmitter, and 200-2 denotes a receiver. The transmitter 100-2 comprises an amplitude control circuit 28 connected between the base band transformation unit 25 and the vector signal superimposing unit 22, in addition to the structural components of the construction of FIG. 2. The construction of the receiver 200-2 is the same as that of FIG. 2.

The amplitude control circuit 28 receives the second vector base band signal from the base band transformation unit 25, and controls the amplitude of the second vector base band signal so that the amplitude of the second base band signal is maintained below a predetermined level. The detail of the amplitude control circuit 28 is explained later. The predetermined level is such that the circles of FIG. 8 are separated from each other so that the data signal points can be determined from the superimposed vector base band signal in the decision unit 43 in the receiver 200-2 with a low error rate.

FIG. 14 is a diagram illustrating a transmission system according to the third aspect of the present invention. In FIG. 14, reference numeral 100-3 denotes a transmitter, and 200-3 denotes a receiver. As indicated in FIG. 14, the transmitter 100-3 and the receiver 200-3 of the fourth aspect of the present invention includes, respectively, the constructions of both the first and second aspects, of the present invention. As will be explained later, the output of the scrambler circuit 20 in the transmitter 100-3 is also used for the random phase shifting operation in the random transformation unit 26, and the input of the descrambler circuit 47 in the receiver 200-3 is also used for realizing the inverse random transformation in the inverse random transformation unit 50.

Figure 16:
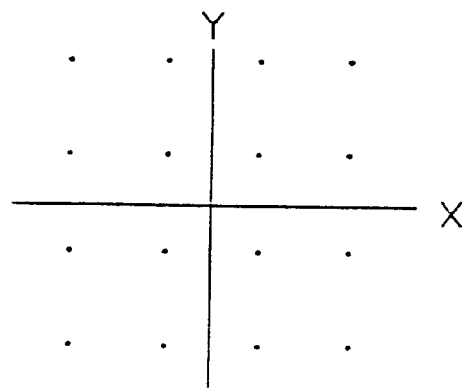
FIG. 16 is a signal-space diagram illustrating a constellation comprised of the data signal points generated by Trellis-coded modulation in the case of 3,200 Baud, 3+1 bits/symbol, and 9.6 kbps.
Figure 15:
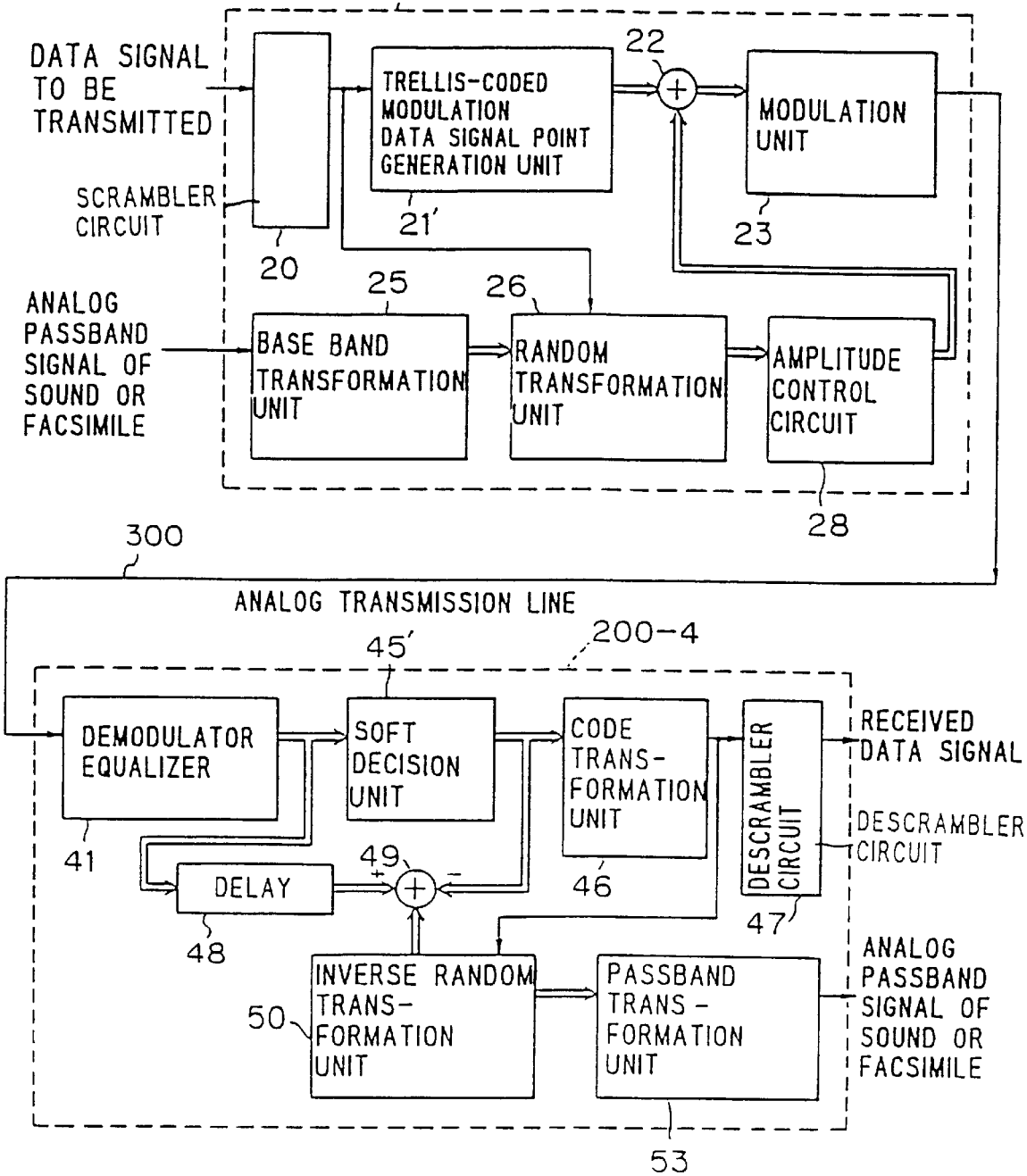
FIG. 15 is a block diagram illustrating a transmission system according to the fifth aspect of the present invention.

BASIC CONSTRUCTION OF THE FIFTH ASPECT OF THE INVENTION (FIGS. 15 and 16)

Figure 17A:
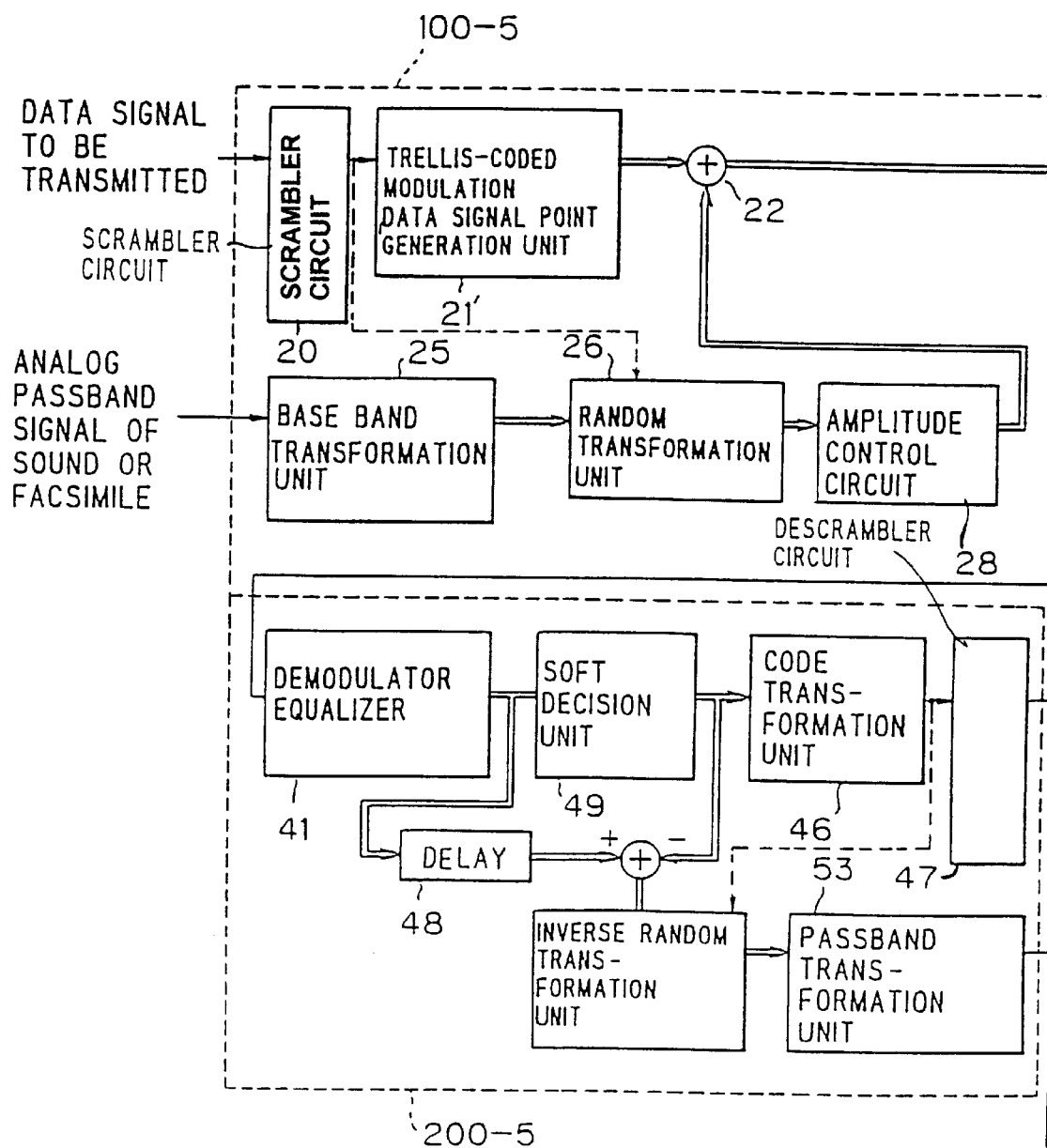
FIG. 17 is a block diagram illustrating a transceiver according to the sixth aspect of the present invention.
Figure 17B:
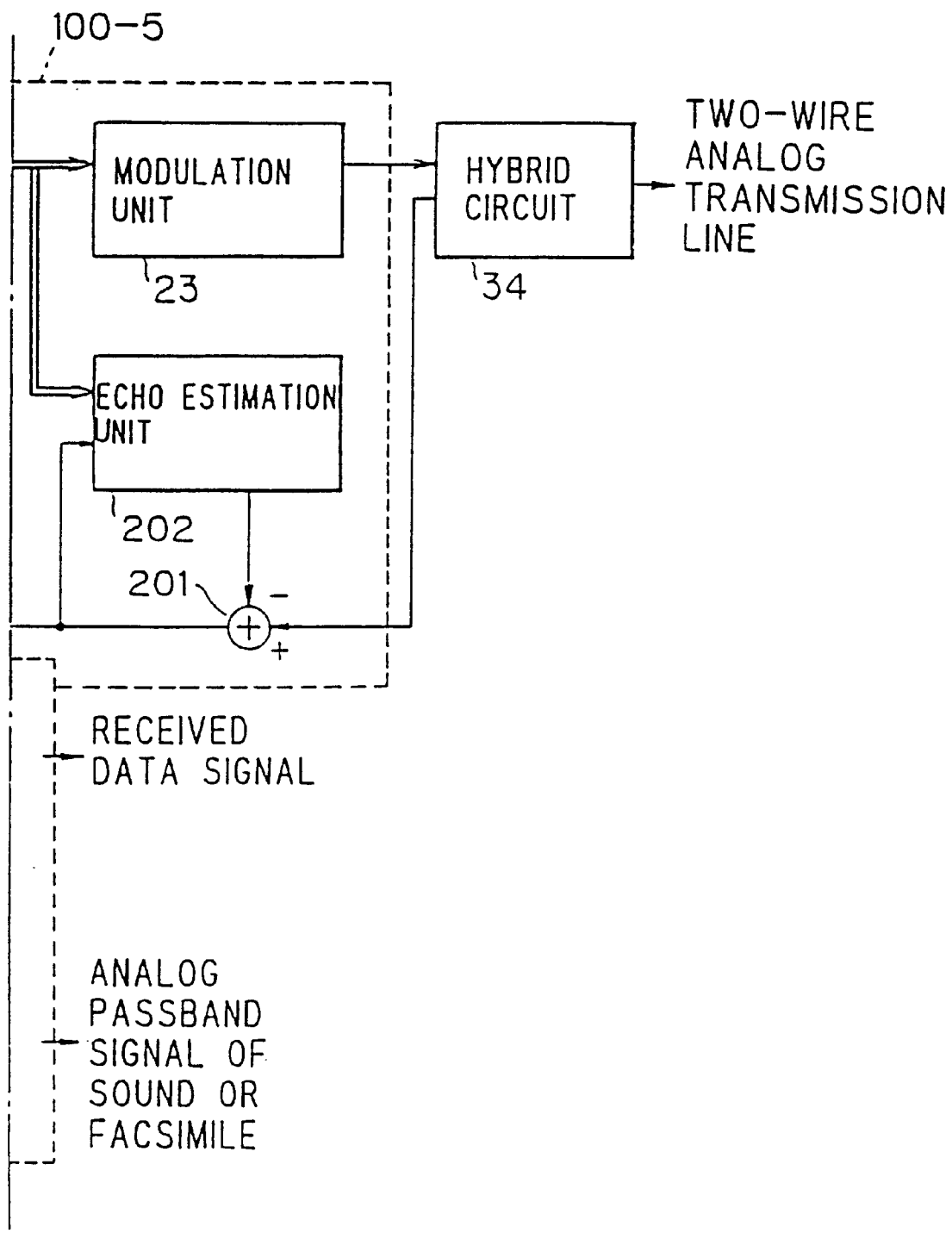

FIG. 15 is a diagram illustrating a transmission system according to the fifth aspect of the present invention. In FIG. 15, reference numeral 100-4 denotes a transmitter, and 200-4 denotes a receiver. The data signal point generation unit 21' in the transmitter 100-4 of FIG. 15 uses a Trellis-coded modulation in generating the data signal points. By Trellis-coded modulation, data signal points are generated as indicated in FIG. 16. FIG. 16 is a signal-space diagram illustrating a constellation comprised of the data signal points generated by Trellis-coded modulation in the case of 3,200 Baud, 3+1 bits/symbol, and 9.6 kbps. Thus, the signal-to-noise ratio (S/N) is improved by 3 to 5 dB as in the CCITT recommendations V.33 and V.32. In the receiver 200-4 of FIG. 15, the decision unit 45' performs a soft decision by, for example, the viterbi algorithm, for determining the data signal point. To compensate for a delay caused by the soft decision unit 45', a delay unit 48 is provided between the demodulator and equalizer 41 and the vector signal subtracter unit 49. The other portions of the transmitter 100-4 and the receiver 200-4 are the same as the construction of FIG. 14. denotes a transmitter, and 200-5 denotes a receiver. In the embodiment of FIGS. 17A–17B, reference numeral 34 denotes a hybrid circuit, 201 denotes a signal subtracter, and 202 denotes an echo estimation unit. The hybrid circuit 34 is provided for coupling the transmitter 100-5 and the receiver 200-5 with a two-wire analog transmission line. The echo estimation unit 202 monitors the superimposed vector base band signal and the input of the receiver 200-5, and estimates a leakage signal from the transmitter side through the hybrid circuit 34 to the receiver side to regenerate the leakages signal. The regenerated leakage signal is supplied to the signal subtracter unit 201 to subtract the regenerated leakage signal from a receiving signal which is received at the hybrid circuit 34 and is to be supplied to the receiver 200-5. The other portions of the transmitter 100-5 and the receiver 200-5 are the same as the construction of FIG. 15.

TRANSMITTER OF THE FIRST EMBODIMENT (FIGS. 18A–18B)

Figure 18A:
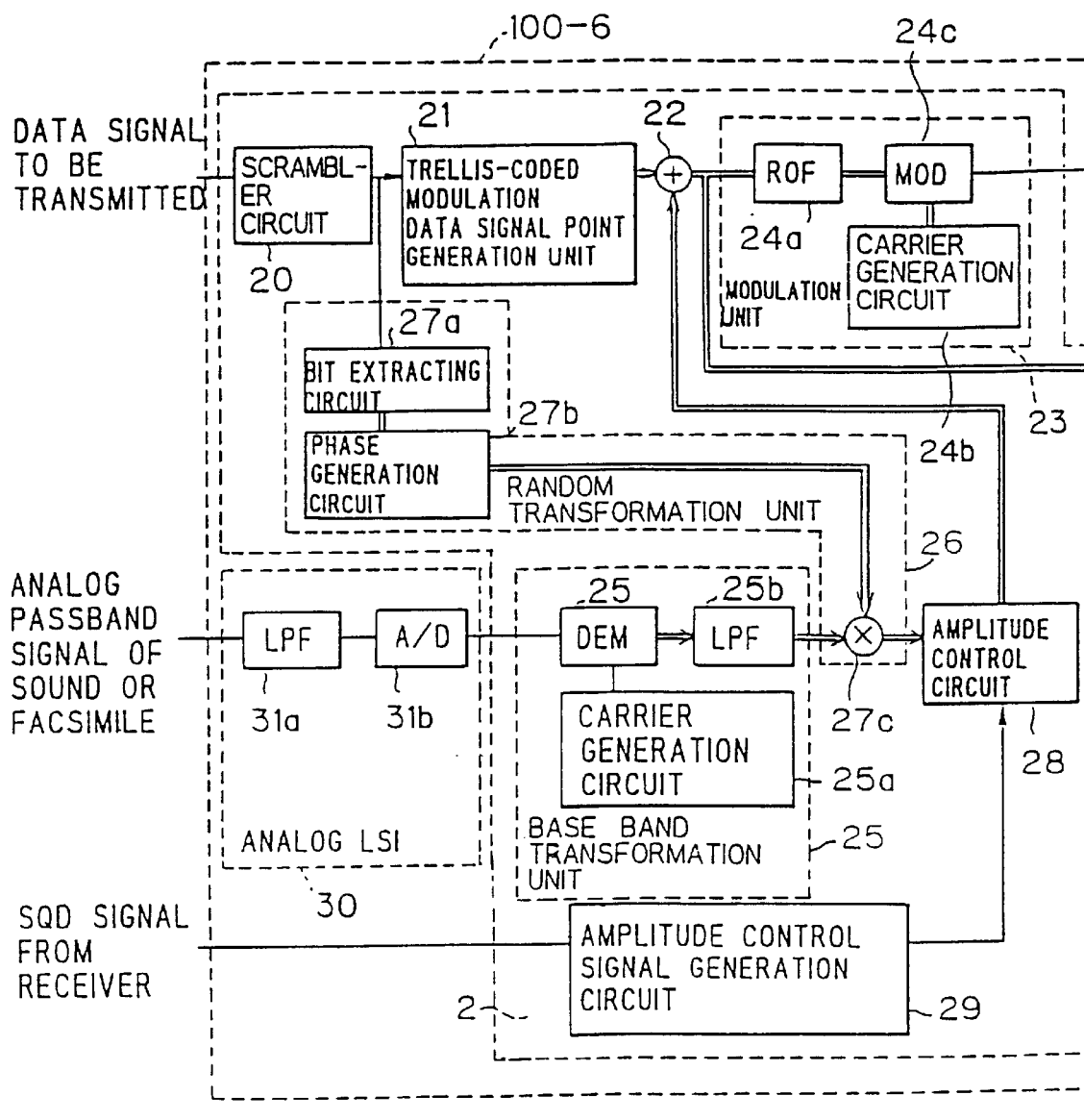
FIG. 18 is a block diagram illustrating a transmitter in the first embodiment of the present invention.
Figure 18B:
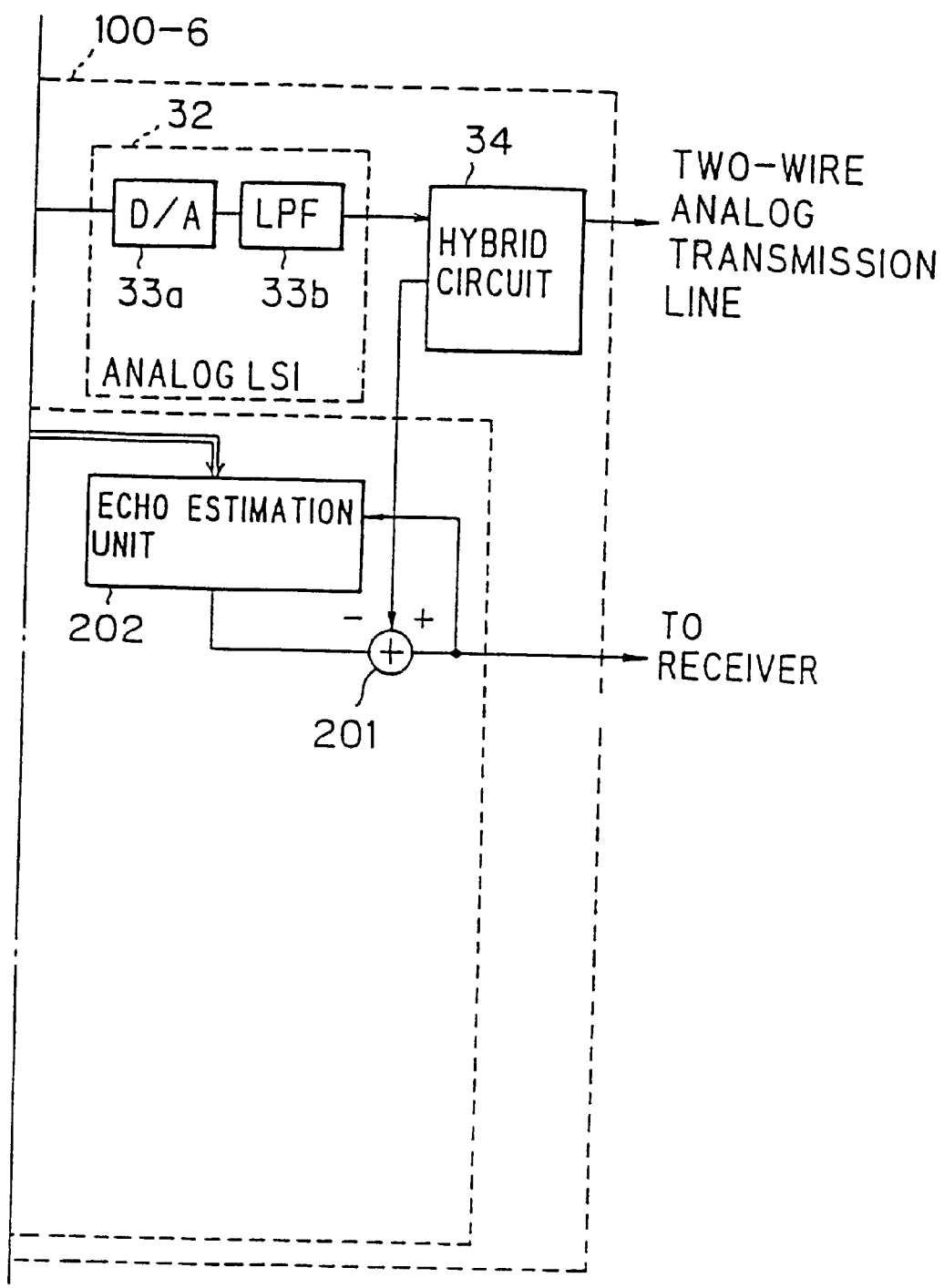

FIGS. 18A–18B show a block diagram illustrating the construction of the transmitter in the first embodiment of the present invention. In FIGS. 18A–18B, reference numeral 100-6 denotes a transmitter, 2 denotes a processor portion, and 30 and 32 each denote an analog large scale integrated circuit (LSI). The construction of the transmitter 100-6 of FIGS. 18A–18B realizes the transmitter 100-5 in th basic construction of FIGS. 17A–17B (sixth aspect of the present invention). The processor portion 2 is realized by a microprocessor and a digital signal processor. The analog large scale integrated circuits (LSI) 30 and 32 are respectively provided at an input port receiving the analog passband signal of a voice or facsimile, and at an output port coupled to the hybrid circuit 34.

The analog large scale integrated circuit (LSI) 30 comprises a low-pass filter 31a and an analog to digital converter 31b to convert the analog passband signal into a digital form (digital passband signal) and supply the same to the base band transformation unit 25.

BASE BAND TRANSFORMATION UNIT (FIGS. 18A–18B, 19–20)

Referring to FIGS. 18A–18B, 19 and 20, the base band transformation unit 25 comprises a carrier signal generation circuit 25a, a low-pass filter 25b, and a demodulator 25c. The demodulator 25c receives the digital passband signal and a carrier signal (rotating clockwise with the center frequency –1,850 Hz of the voice signal band, i.e., shifting the frequency toward left on the frequency axis) generated by the carrier signal generation circuit 25a, to demodulate the digital passband signal for generating a digital base band signal and supply the digital base band signal to the low-pass filter 25a. The digital base band signal is then supplied to the random transformation unit 26 through the low-pass filter 25b. The low-pass filter 25b is provided for suppressing unnecessary frequency components in the output of the demodulator 25c.

Figure 19:
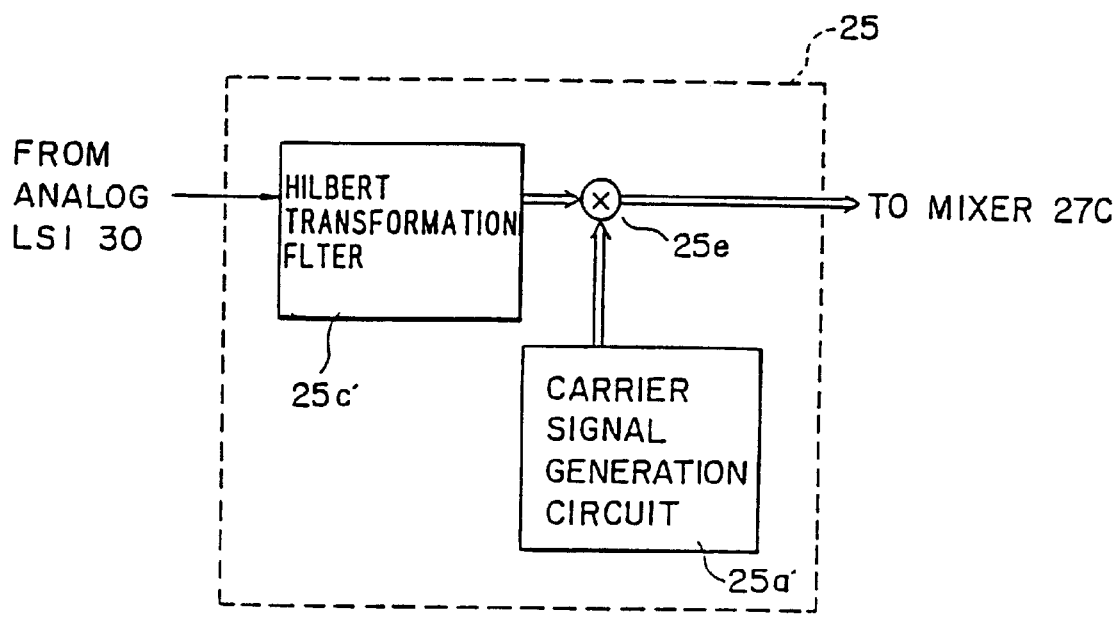
FIG. 19 is a block diagram illustrating a second embodiment of the base band transformation unit of the transmitter of FIG. 18.

FIG. 19 is diagram illustrating another embodiment of the base band transformation unit 25 of FIGS. 18A–18B. In FIG. 19, reference numeral 25a' denotes a carrier generation pundit, 25c' denotes a Hilbert filter, and 25e denotes a vector signal multiplier. The Hilbert filter 25c' converts the above digital passband signal into a vector passband signal. Then, the vector passband signal is converted to a vector base band signal by mixing the respective vector components vector passband signal with a carrier signal (rotating clockwise with a frequency equal to –1,850 Hz) generated by the carrier signal generation circuit 25a'

Figure 20:
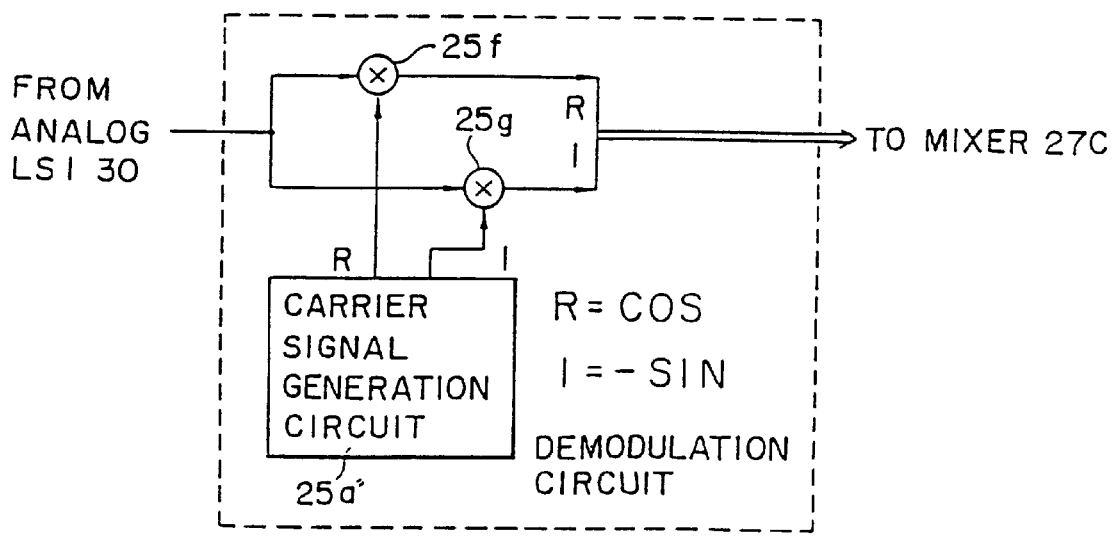
FIG. 20 is a block diagram illustrating a third embodiment of the base band transformation unit of the transmitter of FIG. 18.

FIG. 20 is a block diagram illustrating yet another embodiment of the base band transformation unit 25 of FIGS. 18A–18B. In FIG. 20, reference numeral 25a" denotes a carrier signal generation circuit, and 25f and 25g each denote a multiplier. The carrier generation unit 25a" generates cosine and sine carrier signals to supply the same to the multipliers 25f and 25g, respectively. The multiplier 25f receives the digital passband signal and the cosine carrier signal, and mixes the digital passband signal with the cosine carrier signal to generate a real part of the digital base band signal. The multiplier 25g receives the digital passband signal and the sine carrier signal, and mixes the digital passband signal with the sine carrier signal to generate an imaginary part of the digital base band signal.

RANDOM TRANSFORMATION UNIT (FIGS. 18A–18B, 21–23)

As indicated in FIGS. 18A–18B, the random transformation unit 26 comprises a bit extracting unit 27a, a phase generation unit 27b and a multiplier 27c. The bit extracting unit 27a serially receives the output of the scrambler circuit 20 and obtains blocks of bits from the output off the scrambler circuit 20 to be supplied to the phase generation unit 27b. The phase generation unit 27b determines phase shift values according to the values of the blocks of bits supplied from the bit extracting unit 27a, respectively, and generates random phase vector signals respectively having phases of the phase shift values. Details of the operations of the bit extracting unit 27a and the phase generation unit 27b are explained below. The multiplier 27c receives the digital base band signal from the barge band transformation unit 25 and the above random phase vector signals from the phase generation unit 27b, and multiplies the digital base band signal by the random phase vector signals to generate the randomly transformed vector base band signal.

Figure 21:
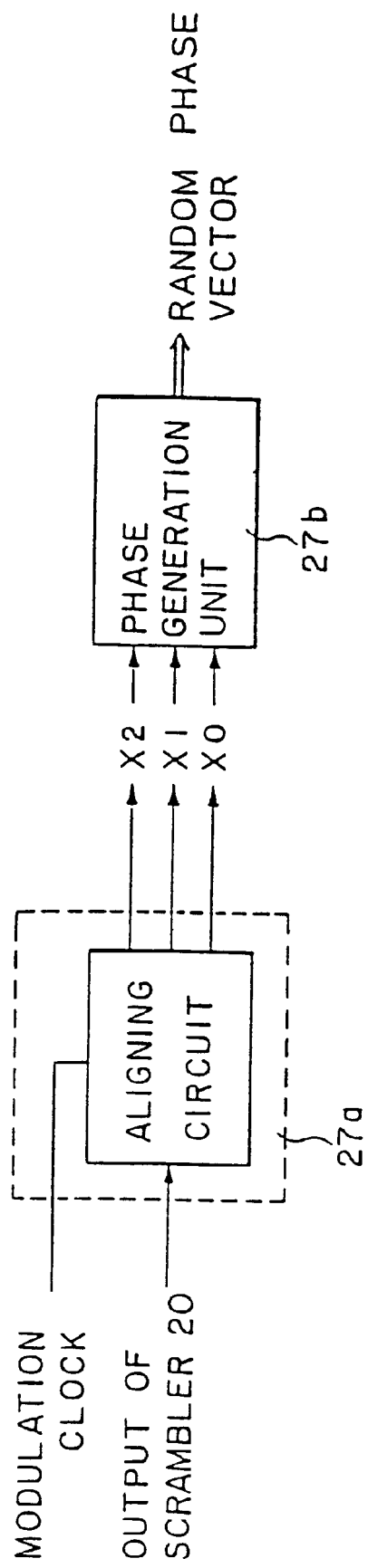
FIG. 21 is a diagram Illustrating the inputs and outputs of the bit extracting unit and the phase generation unit of the transmitter of FIG. 18.

FIG. 21 shows the inputs and outputs of the bit extracting unit 27a and the phase generation unit 27b in the construction of FIG. 18. In FIG. 21, the output of the bit extracting unit 27a is comprised of three bits $X^0$, $X^1$, and $X^2$. The three bits are required to generate the eight phase shift values, 0°, 45°, 90°, 135°, 180°, 225°, 270°, 315° and 360°, as indicated in FIG. 10. FIG. 22 shows the operation of the bit extracting unit 27a in the case of 2,400 Baud. A series of bits, $A^0$, $A^1$, $B^0$, $B^1$, $C^0$, $C^1$, $D^0$, $D^1$, . . . from the scrambler 20 are aligned as indicated in FIG. 22 to generate a set of three bits $X^0$, $X^1$, and $X^2$ for each symbol. FIG. 23 shows the operation of the bit extracting unit 27a in the case of 3,200 Baud. A series of bits, $A^0$, $A^1$, $B^0$, $B^1$, $C^0$, $C^1$, $C^2$, . . . from the scrambler 20 are aligned as indicated in FIG. 23 to generate a set of three bits $X^0$, $X^1$, and $X^2$ for each symbol. The phase generation unit 27b receives three bits $X^0$, $X^1$, and $X^2$ for each symbol, and determines phase shift value 0 according to the correspondence as indicated in Table 1. Then, the phase generation unit 27b generates a random phase vector signal having the determined phase 0, where the vector signal is comprised of two vector components, cos 0 and sin 0. The vector signal is supplied to the multiplier 27c to be mixed with the above digital base band signal therein.

TABLE 1

Correspondence between Three Bits and Phase Shift Value for Random Transformation

| Bit Series | | | Phase Shift Value |
|---|---|---|---|
| $X^0$ | $X^1$ | $X^2$ | 0 |
| 0 | 0 | 0 | $+0°$ |
| 0 | 0 | 1 | $+45°$ |
| 0 | 1 | 0 | $+90°$ |
| 0 | 1 | 1 | $+135°$ |
| 1 | 0 | 0 | $+180°$ |
| 1 | 0 | 1 | $+225°$ |
| 1 | 1 | 0 | $+270°$ |
| 1 | 1 | 1 | $+315°$ |

Although the scrambled bit series of the data signal is used in this embodiment, the phase of the vector base band signal may be randomly shifted without the scrambled bit series of the data signal.

Figure 24:
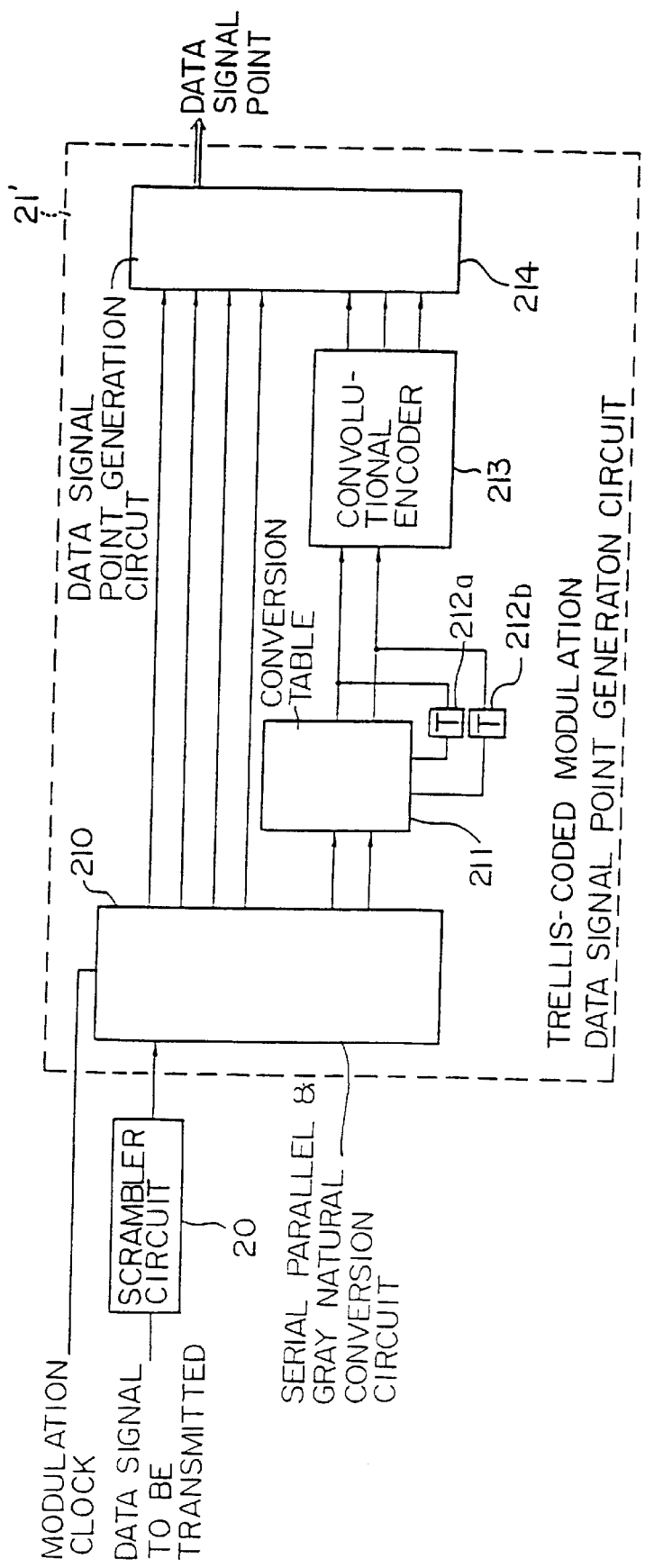
FIG. 24 is a block diagram illustrating an embodiment of Trellis-coded modulation data signal point generation unit in the transmitter of FIG. 18.
Figure 25:
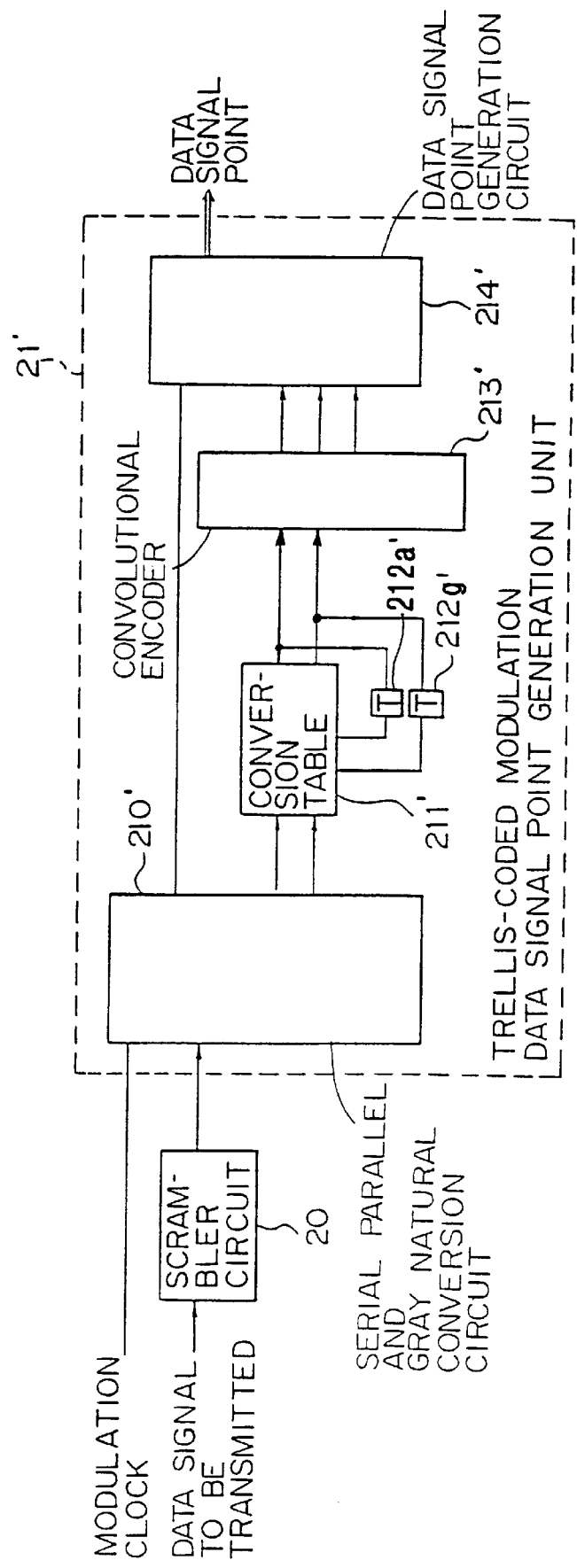
FIG. 25 is a block diagram illustrating another embodiment of Trellis-coded modulation data signal point generation unit in the transmitter of FIG. 18.

TRELLIS-CODED MODULATION DATA SIGNAL POINT GENERATION UNIT (FIGS. 24 and 25)

FIG. 24 is a block diagram illustrating a Trellis-coded modulation data signal point generation unit 21' in the construction of FIG. 18. The construction of FIG. 24 is used in the case of 2,400 Baud, 6+1 bits/symbol, and 14.4 kbps. In FIG. 24, reference numeral 210 denotes a serial/parallel and Gray/natural conversion circuit, 211 denotes a conversion table, 212a and 212b each denote a delay unit, 213 denotes a convolutional encoder, and 214 denotes a data signal point generation circuit. The operation of Trellis-coded modulation is known from the CCITT recommendations V.33, V.32, and V.32 bis. The serial/parallel and Gray/natural conversion circuit 210 receives the serial output of the scrambler circuit 20, and converts six successive bits in the serial output to parallel bits corresponding to each symbol, and the six parallel bits are then converted from the Gray code to the natural code. The conversion table 211 and the delay units 212a and 212b constitute a phase differential encoder, and a pair of bits among the six parallel bits are input into the phase differential encoder, and the phase differential encoder obtains and outputs a pair of difference bits comprised of a first difference between a first bit of the input pair of bits and a first bit of the precedingly output pair of difference bits and a second difference between a second bit of the input pair and a second bit of the precedingly output pair of difference bits. The pair of difference bits output from the phase differential encoder are supplied to the convolutional encoder 213. The convolutional encoder 213 converts the pair of difference bits to three encoded bits which include one redundant bit. The three encoded bits are input into the data signal point generation circuit 214 together with the remaining four bits output from the serial/parallel and Gray/natural conversion circuit 210. The data signal point generation circuit: 214 maps then symbol determined by the seven (three plus four) bits onto a vector signal space to generate a data signal point.

FIG. 25 is a diagram illustrating a construction of Trellis-coded modulation data signal point generation unit 21' in the construction of FIG. 18. The construction of FIG. 25 is used in the case of 3,200 Baud, 3+1 bits/symbol, and 9.6 kbps. in FIG. 25, reference numeral 210' denotes a serial/parallel and Gray/natural conversion circuit, 211' denotes a conversion table, 212a', and 212b' each denote a delay unit, 213', denotes a convolutional encoder, and 214' denotes a data signal point generation circuit. The serial/parallel and Gray/natural conversion circuit 210' receivers the serial output of the scrambler circuit 20, and converts three successive bits in the serial output to parallel bits corresponding to each symbol, and the three parallel bits are then converted from the natural code to the Gray code. The conversion table 211' and the delay units 212a' and 212b' constitutes a phase differential encoder, and a pair of bits among the three parallel bits are input into the phase differential encoder, and the phase differential encoder obtains and outputs a pair of difference bits comprised of a first difference between a first bit of the input pair of bits and a first bit of the precedingly output pair of difference bits and a second difference between a second bit of the input pair and a second bit of the precedingly output pair of difference bits. The pair of difference bits output from the phase differential encoder are supplied to the convolutional encoder 213'. The convolutional encoder 213' converts the pair of difference bits to three encoded bits which include one redundant bit. The three encoded bits are input into the data signal point generation circuit 214' together with the remaining one bit output from the serial/parallel and Gray/natural conversion circuit 210'. The data signal point generation circuit 214' maps the symbol determined by the four (three plus one) bits onto a vector signal space to generate a data signal point.

OPTIMUM AMPLITUDE CONTROL (FIGS. 18A–18B. 26 and 27)

As indicated in FIGS. 18A–18B, the system further comprises an amplitude control signal generation circuit 29. The amplitude control signal generation circuit 29 receives a signal quality detect (SQD) signal from a receiver through a secondary channel from the receiver to the transmitter, where the receiver means a receiver (not shown in FIG. 19) which receives an analog modulated signal transmitted from the transmitter of FIG. 18. The amplitude control circuit 28 comprises an amplitude controlled amplifier receiving and amplifying the output of the random transformation unit 26 to supply the amplified signal to the vector signal superimposing unit (signal adder) 22, where a gain of the amplifier is controlled by a control signal supplied from the amplitude control signal generation circuit 29. The control signal indicates a maximum allowable amplitude value, a value of the gain, or the control signal is a gain increase/decrease control signal. The amplitude control signal generation circuit 29 determines the maximum allowable amplitude value, the gain, or whether the gain is to be increased or decreased, and generates and supplies the control signal according to the determination.

Figure 26:
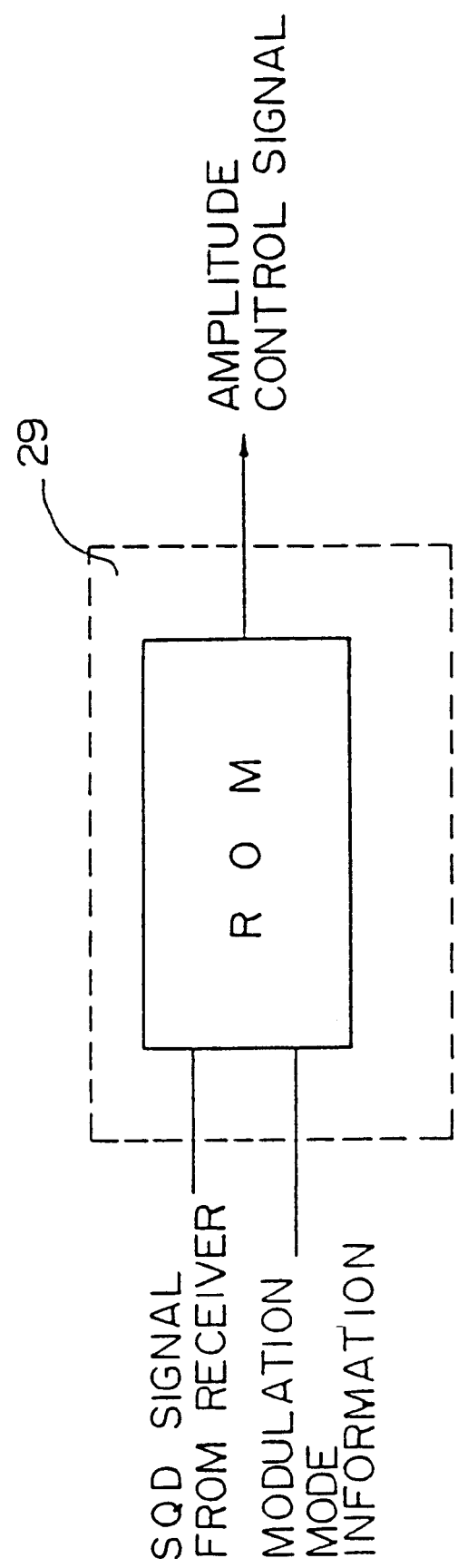
FIG. 26 is a block diagram illustrating an embodiment of the amplitude control signal generation circuit.

FIG. 26 is an example construction of the amplitude control signal generation circuit 29. The amplitude control signal generation circuit 29 of FIG. 26 comprises a read-only memory (ROM) which receives an address signal the signal quality detect (SQD) signal and modulation mode information, and outputs an optimum amplitude control value to supply the same to the amplitude control circuit 28. The modulation mode information indicates, for example, that the signal transmitted from the transmitter 100-6 of FIG. 18 is modulated in accordance with the CCITT recommendation V.29 with 2,400 Baud, 3+1 bit/symbol, and 9.6 kbps, or that the signal transmitted from the transmitter 100-6 of FIG. 18 is modulated in accordance with the CCITT recommendation V.29 with 3,200 Baud, 6+1 bit/symbol, and 14.4 kbps.

Figure 27:
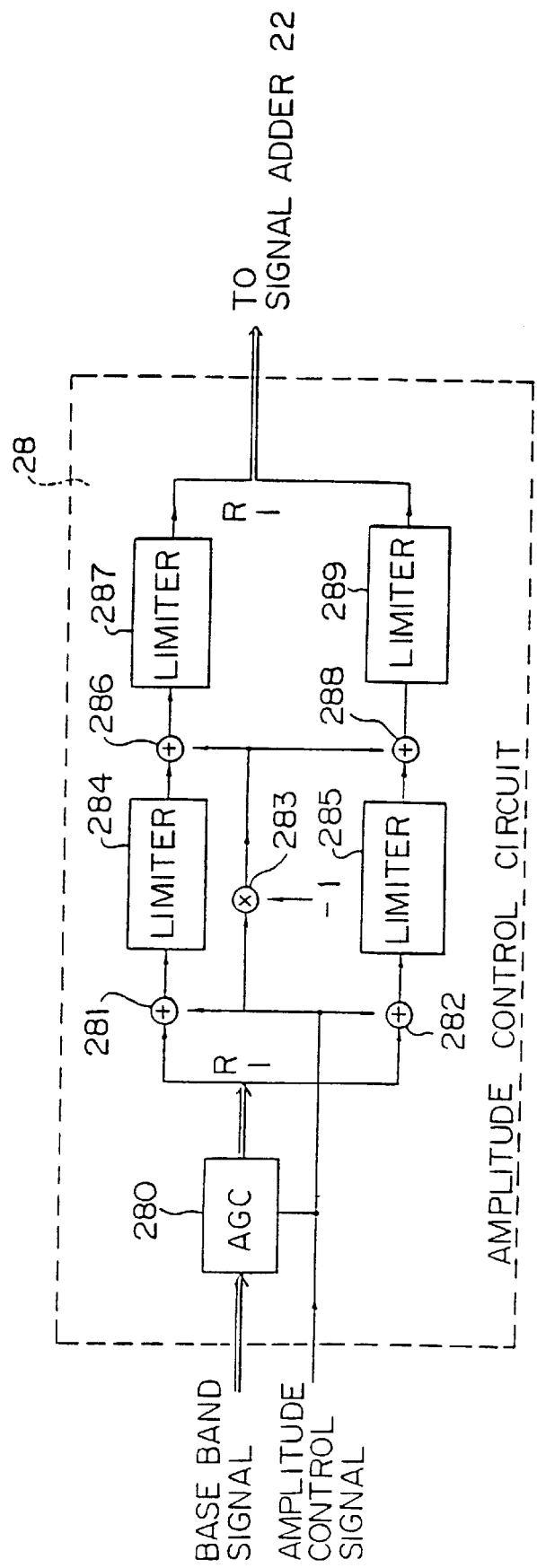
FIG. 27 is a block diagram illustrating an embodiment of the amplitude control circuit.

FIG. 27 is an example construction of the amplitude control circuit 28. The amplitude control circuit 28 of FIG. 27 comprises an automatic gain control (AGC) unit 280, signal adders 281, 282, 286, and 288, a multiplier 283, and limiters 284, 285, 287, and 289. To the amplitude control circuit 28, the maximum allowable amplitude value is supplied as the above control signal (optimum amplitude control value). The maximum allowable amplitude value is supplied to the automatic gain control (AGC) unit 280 as a control value, and to the adders 281 and 282 as an addend. The superimposed vector base band signal from the vector signal superimposing unit 22 is input into the automatic gain control (AGC) unit 280, and the respective vector components (respectively designated by R and I) are amplified in the automatic gain control (AGC) unit 280 according to the maximum allowable amplitude value. Namely, the maximum allowable amplitude value is used as a gain control signal in the automatic gain control (AGC) unit 280. The amplified vector components R and I are respectively supplier to the signal adders 281 and 282 as an augend, and the maximum allowable amplitude value is added to the amplified vector components R and I, respectively. Then, the outputs of the signal adders 281 and 282 are supplied to the limiters 284 and 285, respectively, and the positive peaks of the respective vector components are limited therein. The maximum allowable amplitude value is also applied to the multiplier 283 to be multiplied by minus one to obtain a minimum (negative) allowable amplitude value. The minimum allowable amplitude value is supplied to the signal adders 286 and 288, respectively as an addend. The outputs of the limiters 284 and 285 are supplied to the signal adders 286 and 288, respectively, and thus the minimum allowable amplitude value is added to the vector components output from the limiters 284 and 285, respectively. Then, the outputs of the signal adders 286 and 288 are supplied to the limiters 287 and 288, respectively, and the negative peaks of the respective vector components are limited therein to obtain the vector base band signal having the optimum amplitude and supply the same to the vector signal superimposing unit (signal adder) 22.

Figure 28:
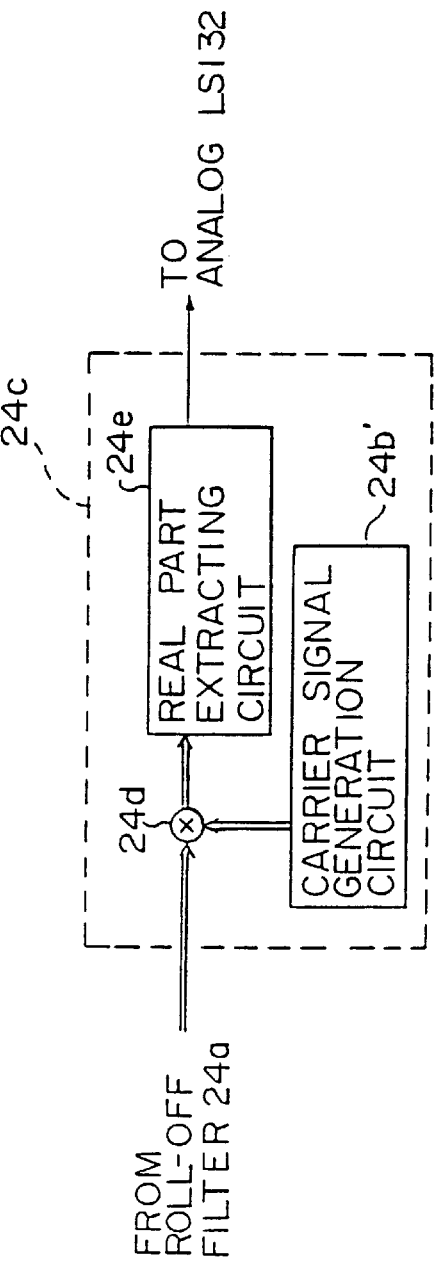
FIG. 28 is a block diagram of an embodiment of a modulator.
Figure 29:
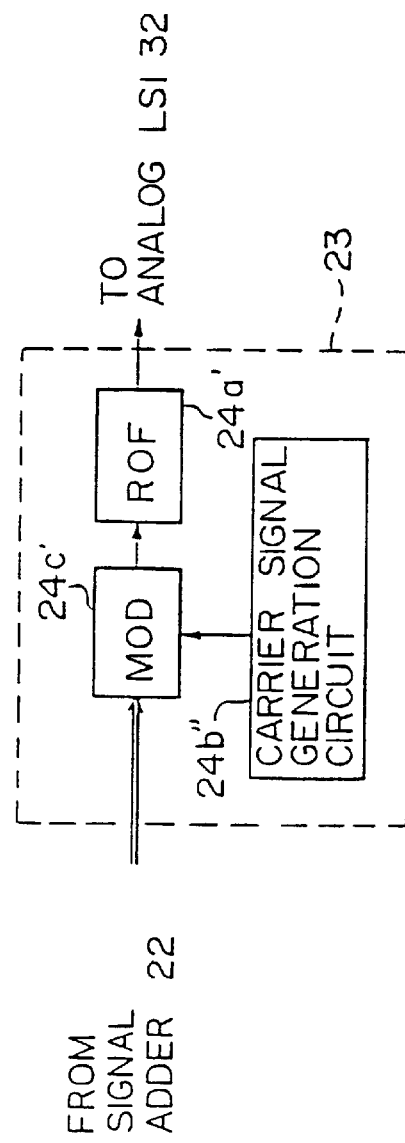
FIG. 29 is a block diagram of another embodiment of a modulation unit.

MODULATION OF SUPERIMPOSED BASE BAND SIGNAL (FIGS. 28 and 29)

As explained above for the construction of FIGS. 2, 9, 13, 14, 15, and 17, in the vector signal superimposing unit (signal adder) 22 of FIGS. 18A–18B, the second vector base band signal representing the analog voice or facsimile signal, is superimposed on the first vector base band signal representing the digital data signal. The superimposed vector base band signal is output from the vector signal superimposing unit 22 to the modulation unit 23. The construction and operation of modulating the base band signal is the same as the conventional transmitter wherein a vector base band signal representing a digital data signal only, is modulated and transmitted. As indicated in FIGS. 18A–18B, the modulation unit 23 comprises a roll-off filter 24a, a carrier generation unit 24b, and a modulator 24c. The frequency band of the superimposed vector base band signal is limited by the roll-off filter 24a, and is then modulated in the modulator 24c using a carrier signal generated by the carrier generation 24b, to obtain a modulated signal.

In FIG. 28, reference numeral 24b' denotes a carrier generation unit, 24d denotes a multiplier, and 24e denotes a real part extracting circuit. The superimposed vector base band signal which is filtered through the rolloff filter 24a, is mixed with a carrier signal generated by the carrier generation unit 24b', and then the real part of the mixed signal is obtained by the real part extracting circuit 24e as the modulated signal.

FIG. 29 is a diagram illustrating another embodiment of the modulation unit 23. In FIG. 29, reference numeral 24b" denotes a carrier generation unit, 24c' denotes a modulator, and 24a' denotes a roll-off filter. The superimposed vector base band signal is modulated in the modulator 24c' using a carrier signal generated by the carrier generation unit 24b" to obtain a modulated signal. Then, the frequency band of the modulated signal is limited by the roll-off filter 24a'.

The modulated signal output from the modulation unit 23 is supplied to the analog large scale integrated circuit (LSI) 32 provided at an output port coupled to the hybrid circuit 34. The analog large scale integrated circuit (LSI) 32 comprises a digital to analog converter 33a and a low-pass filter 33b. The modulated signal is converted to an analog signal in the dac 33a, and is then filtered through the lowpass filter 33b to be supplied to the hybrid circuit 34.

RECEIVER OF THE FIRST EMBODIMENT (FIGS. 30A–30B)

Figure 30A:
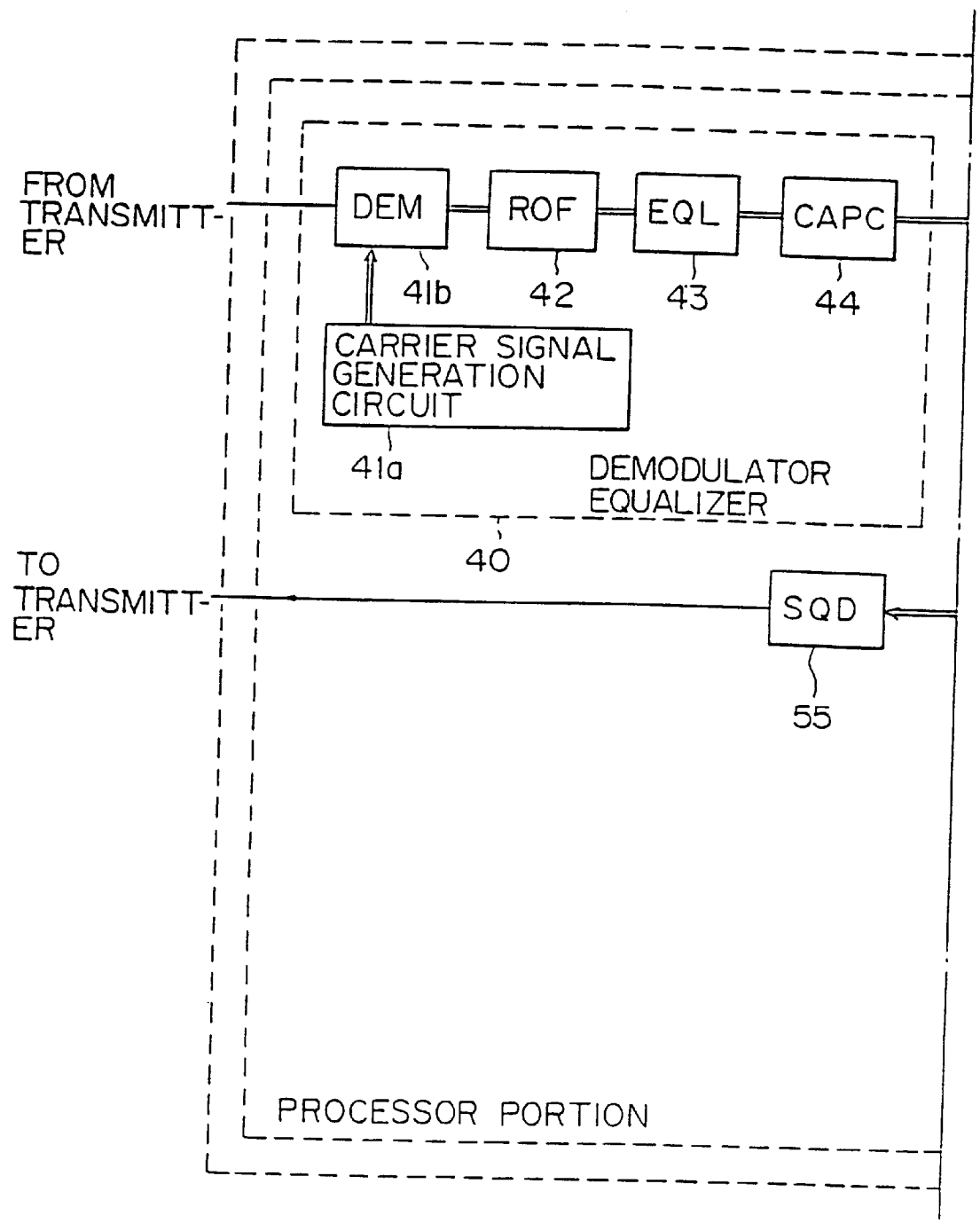
FIGS. 30A–30B show a block diagram illustrating a receiver of the first embodiment.
Figure 30B:
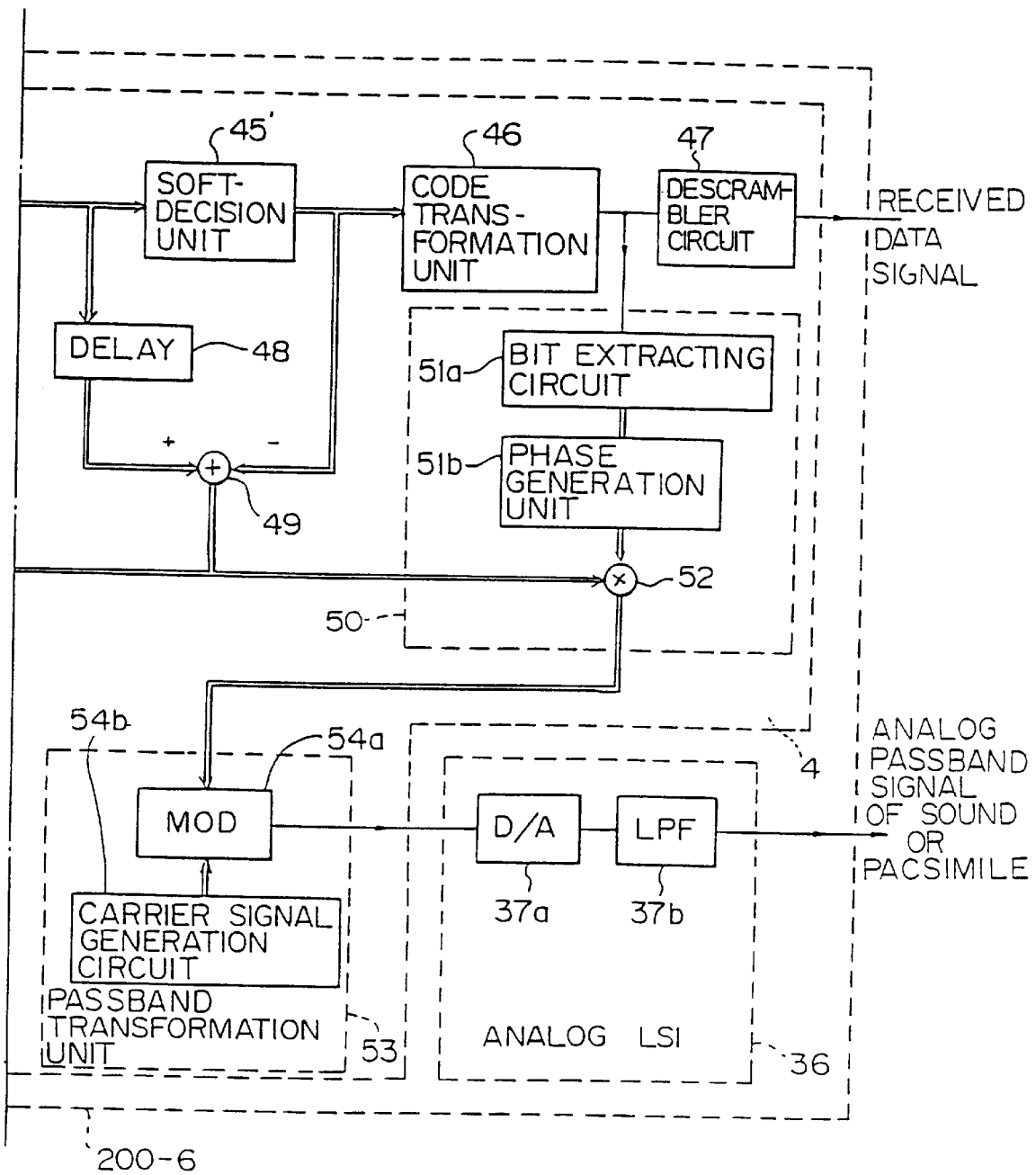

FIGS. 30A–30B show is a diagram illustrating the construction of the receiver of the first embodiment of the present invention. In FIG. 30, reference numeral 200-6 denotes a receiver, 4 denotes a processor portion, and 36 denotes an analog large scale integrated circuit (LSI). The construction of the receiver 200-6 of FIG. 30 realizes the receiver 200-5 in the basic construction of FIG. 17 (sixth aspect of the present invention). The processor portion 4 is realized by a microprocessor and a digital signal processor. The analog large scale integrated circuit (LSI) 36 is provided at an output port transmitting the analog passband signal of a voice or facsimile.

Figure 31:
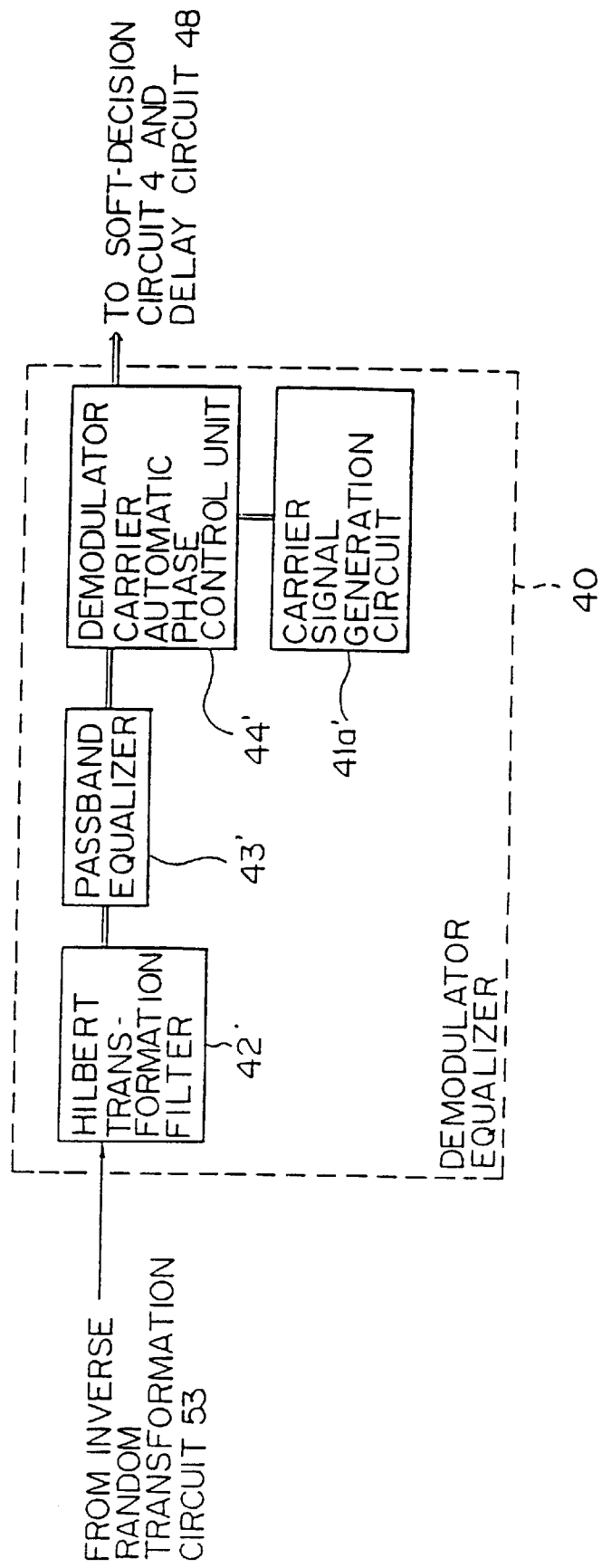
FIG. 31 is a block diagram illustrating an embodiment of a demodulator and equalizer unit.

DEMODULATION OF RECEIVED SIGNAL (FIGS. 30A–30B and 31)

The analog modulated signal transmitted from the transmitter having the construction of FIGS. 18A–18B is received by the demodulator and equalizer 40. The demodulator and equalizer 40 (FIGS. 30A–30B) comprises a carrier generation unit 41a, a demodulator 41b, a rolloff filter 42, an automatic equalizer 43, and a carrier automatic phase control unit 44. The received signal is modulated in the modulator 41b using a carrier signal generated by the carrier signal generation circuit 41a. The modulated signal is filtered by the roll-off filter 42, and is then automatically equalized by the automatic equalizer 43. A frequency offset is removed by the carrier automatic phase control unit 44.

FIG. 31 is a block diagram illustrating another embodiment of the demodulator and equalizer 40. The demodulator and equalizer 40 comprises a carrier generation unit 41a', a Hilbert transformation unit 42', a passband equalizer 43', and a modulator/carrier automatic phase control unit 44'. According to the embodiment of FIG. 31, the received signal is converted to a vector signal by the Hilbert transformation unit 42', and the vector signal is equalized by the passband equalizer 43'. Then, a phase gitter of a frequency offset caused on the transmission line from the transmitter 100-6 to the receiver 200-6 is removed by the modulator/carrier automatic phase control unit 44'.

As explained above with reference to FIG. 15, the decision unit 45' receives the regenerated superimposed vector base band signal from the demodulator/equalizer 40, and determines as to which one of the plurality of predetermined data signal points in the vector signal space the regenerated superimposed vector base band signal corresponds (is nearest), to regenerate the first vector base band signal representing the digital data signal. The decision unit 45' performs a soft decision by the Viterbi algorithm, for determining the data signal point.

Figure 32:
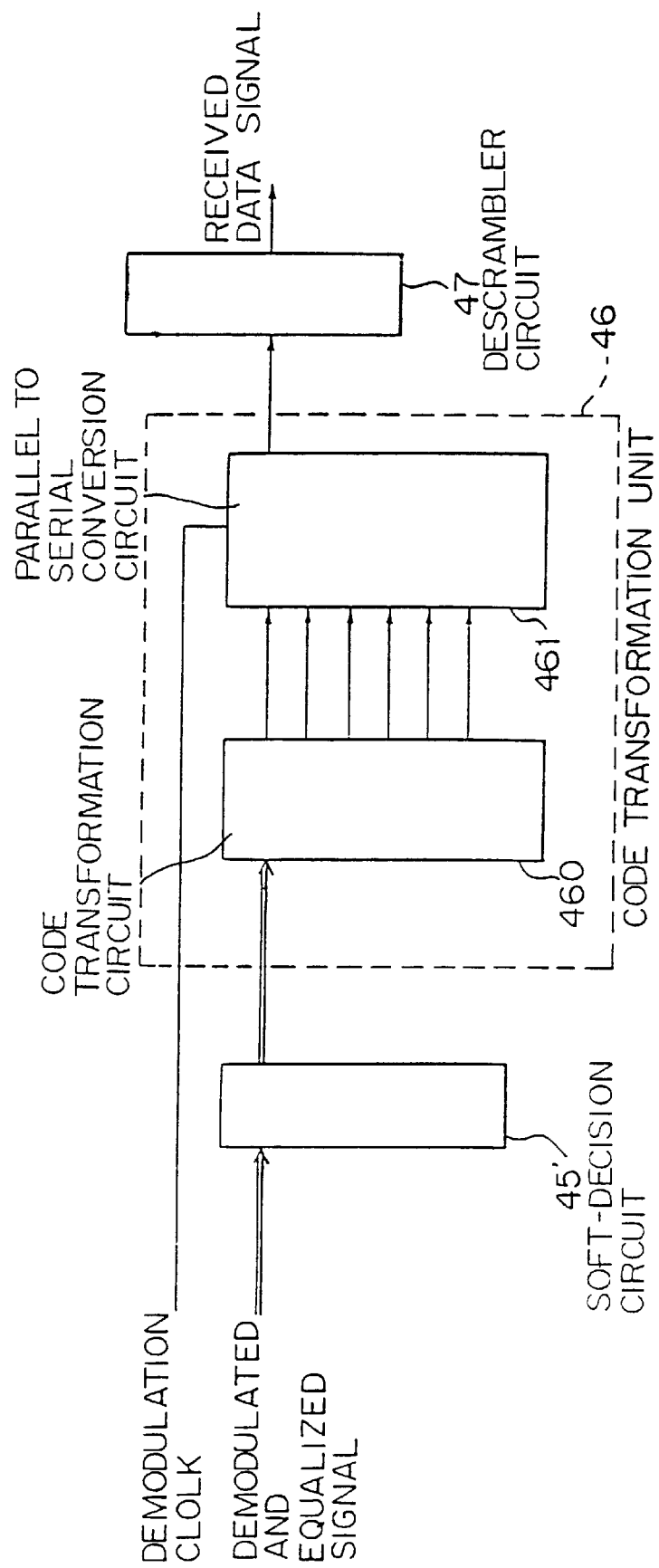
FIG. 32 is a block diagram illustrating an embodiment of a code transformation unit.
Figure 33:
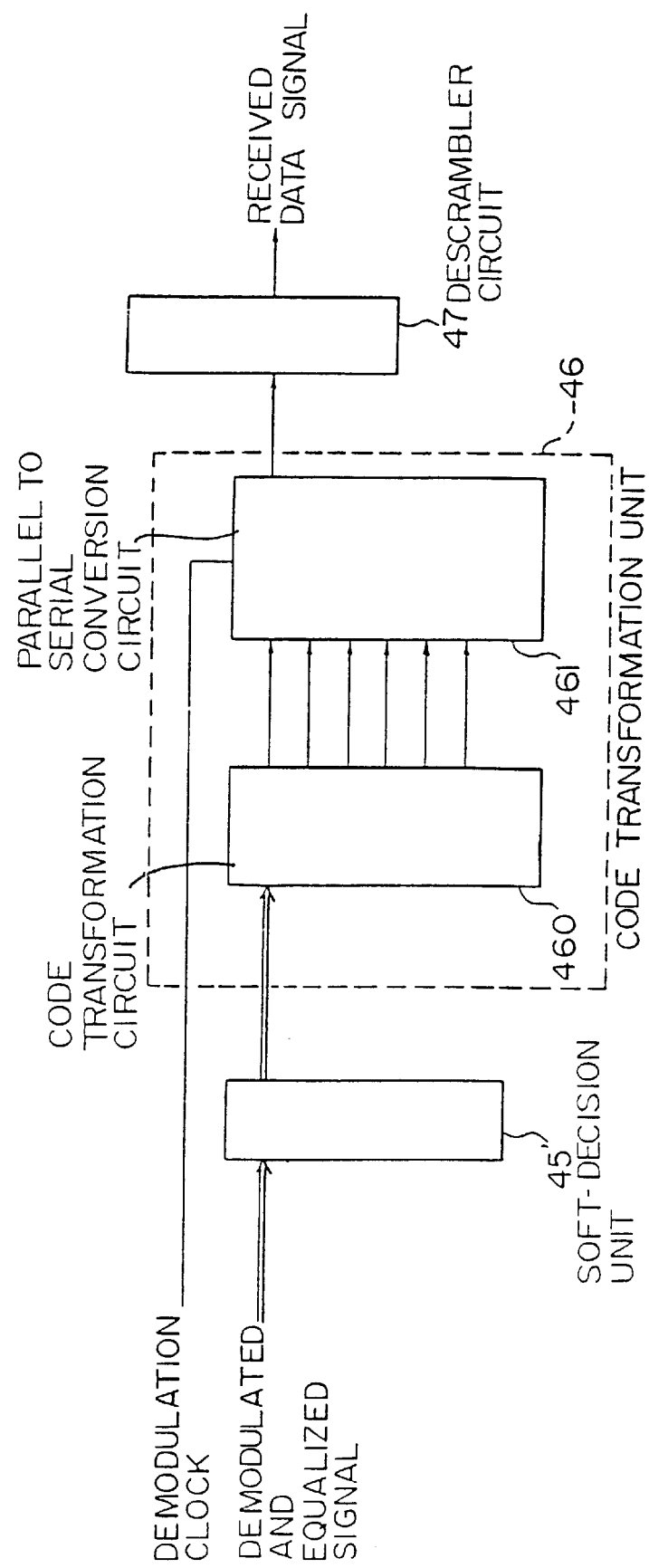
FIG. 33 is a block diagram illustrating another embodiment of the code transformation unit.

The code transformation unit 46 receives the first vector base band signal, and transforms the same to regenerate the serial digital data signal. FIG. 32 is a block diagram illustrating an example construction of the code transformation unit 46. The construction of FIG. 32 is used in the case of 2,400 Baud, 6+1 bits/symbol, and 14.4 kbps. The code transformation unit 46 of FIG. 32 comprises a cole transformation circuit 460 and a parallel to serial unit 461. The code transformation circuit 460 performs differential decoding and conversion from the Gray code to the natural code, to generate and output a decoded six bits in parallel for each symbol. Then, the decoded six parallel bits are converted to six serial bits (the scrambled serial data signals) by the parallel to serial unit 461, and the six serial bits are supplied to the descrambler circuit 47. FIG. 33 is a block diagram illustrating another example embodiment of the code transformation unit 46. The circuit of FIG. 25 is used in the case of 3,200 Baud, 3+1 bits/symbol, and 9.6 kbps. The code transformation unit 46 of FIG. 33 comprises a code transformation circuit 460' and a parallel to serial unit 461'. The code transformation circuit 460' performs differential decoding and conversion from the Gray code to the natural code, to generate and output a decoded three bits in parallel for each symbol. Then, the decoded parallel three bits are converted to three serial bits (the scrambled serial data signals) by the parallel to serial unit 461, and the three serial bits are supplied to the descrambler circuit 47. The output of the code transformation unit 46 is also supplied to the inverse random transformation unit 50.

Figure 34:
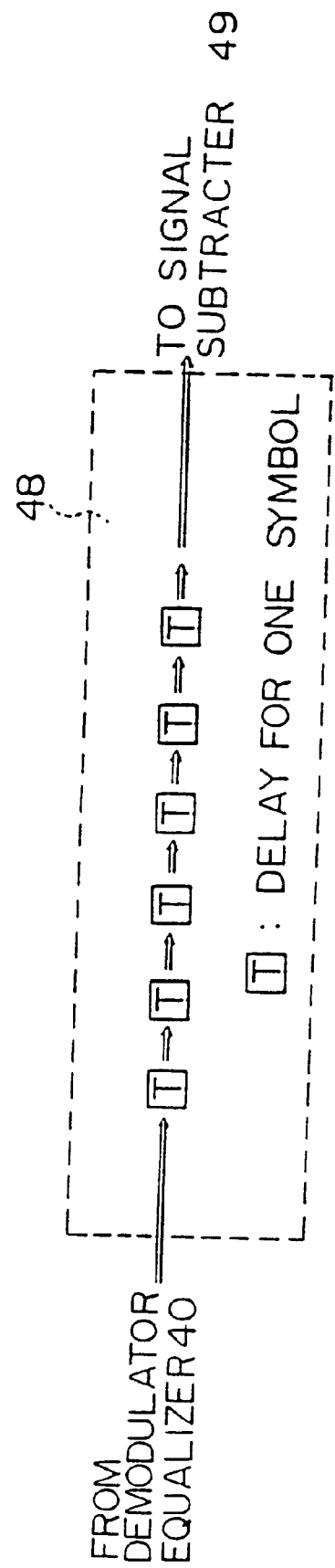
FIG. 34 is a block diagram illustrating an embodiment of a delay unit.
Figure 35:
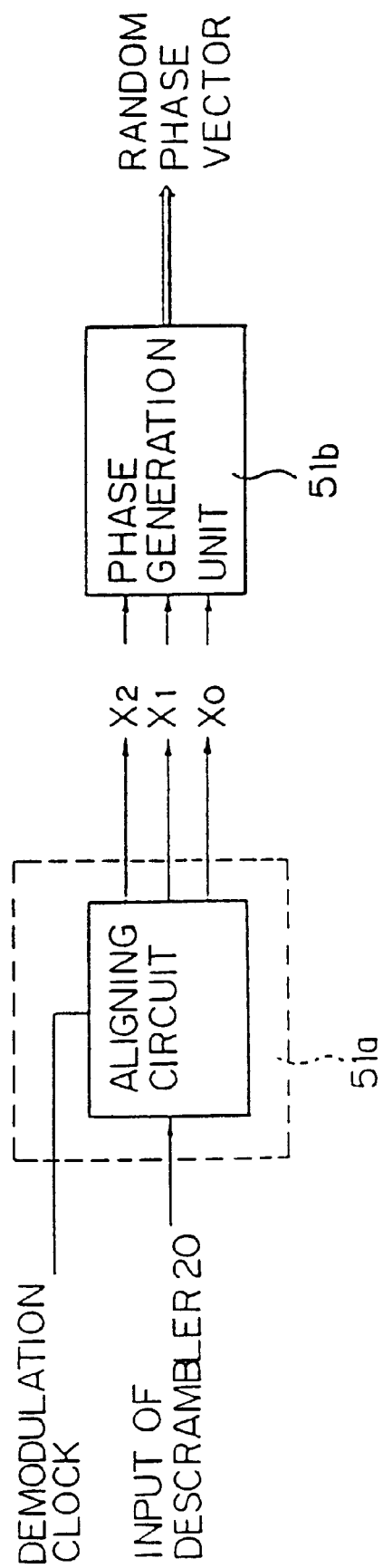
FIG. 35 shows inputs and outputs of the bit extracting unit and the phase generation unit in the receiver of FIGS. 30A–30B.

INVERSE RANDOM TRANSFORMATION (FIGS. 34 and 35)

The vector signal subtracter unit 49 in FIGS. 30A–30B receives the demodulated and equalized vector signal (the regenerated superimposed vector base band signal) from the demodulator/equalizer 40 through the delay unit 48, and the output (the regenerated first vector base band signal) of the decision unit 45', and subtracts the plurality of vector components of the output of the decision unit 45' from a plurality of vector components of the demodulated and equalized vector signal, component by component, to regenerate the respective vector components of the second base band signal corresponding to the analog voice or facsimile signal. The delay unit 48 is provided between the demodulator/equalizer 40 and the vector signal subtracter unit 49 for compensating the delay caused by the soft decision unit 45'. FIG. 34 in a diagram illustrating an example construction of the delay unit 45'.

As indicated in FIGS. 30A–30B, the inverse random transformation unit 50 comprises a bit extracting unit 51a, a phase generation unit 51b, and a multiplier 52. The bit extracting unit 51a serially receives the output of the code transformation unit 46, and obtains blocks of bits from the output of the code transformation unit 46 to be supplied to the phase generation unit 51b. The phase generation unit 51b determines phase shift values according to the values of the blocks of bits supplied from the bit extracting unit 51a, respectively, and generates random phase vector signals respectively having phases of the phase shift values. The operation of the bit extracting unit 51a and the phase generation unit 51b are similar to the operations of the bit extracting unit 27a and the phase generation unit 27b, as explained with reference to FIGS. 22 and 23. The multiplier 52 receives the above second digital base band signal from the vector signal subtracter unit 49 and the above random phase vector signals from the phase generation unit 51b, and multiplies the second digital base band signal by the random phase vector signals for performing inversely random transformation for the randomly transformed vector base band signal to obtain a vector base band signal retrieved from the random transformation.

FIG. 35 shows the inputs and outputs of the bit extracting unit 51a and the phase generation unit 51b in the construction of FIG. 30. In FIG. 35, the output of the bit extracting unit 51a is comprised of three bits $X^0$, $X^1$, and $X^2$. The three bits are required to generate the eight phase shift values, 0°, 45°, 90°, 135°, 180°, 225°, 270°, 315°, and 360°, as indicated in FIG. 10. The operation of the bit extracting unit 51a in the case of 2,400 Baud, is the same as the bit extracting unit 27a of FIG. 21, as indicated in FIG. 22. A series of bits, $A^0$, $A^1$, $B^0$, $B^1$, $C^0$, $C^1$, $D^0$, $D^1$, ... from the scrambler 20 are aligned as indicated in FIG. 22 to generate a set of three bits $X^0$, $X^1$, and $X^2$ for each symbol. The operation of the bit extracting unit 27a in the case of 3,200 Baud, is the same as the bit extracting unit 27a of FIG. 21, as indicated in FIG. 23. A series of bits, $A^0$, $A^1$, $A^2$, $B^0$, $B^1$, $B^2$, $C^0$, $C^1$, $C^2$ ... from the scrambler 20 are aligned as from the scrambler 20 are aligned as indicated in FIG. 23 to generate a set of three bits $X^0$, $X^1$, and $X^2$ for each symbol. The phase generation unit 51b receives three bits $X^0$, $X^1$, and $X^2$ for each symbol, and determines the phase shift value 0 according to the correspondence as indicated in Table 2.

TABLE 2

Correspondence between
Three Bits and Phase Shift Value
for Inverse Random Transformation

| Bit Series | | | Phase Shift Value |
| --- | --- | --- | --- |
| $X^0$ | $X^1$ | $X^2$ | 0 |
| 0 | 0 | 0 | −0° |
| 0 | 0 | 1 | −45° |
| 0 | 1 | 0 | −90° |
| 0 | 1 | 1 | −135° |
| 1 | 0 | 0 | −180° |
| 1 | 0 | 1 | −225° |
| 1 | 1 | 0 | −270° |
| 1 | 1 | 1 | −315° |

Then, the phase generation unit 51b generates and outputs a random phase vector signal having the determined phase 0, where the vector signal is comprised of two vector components, cos 0 and sin 0. The vector signal is supplied to they multiplier 52 to be mixed with the above digital base band signal therein.

PASSBAND TRANSFORMATION (FIG. 36)

Figure 36:
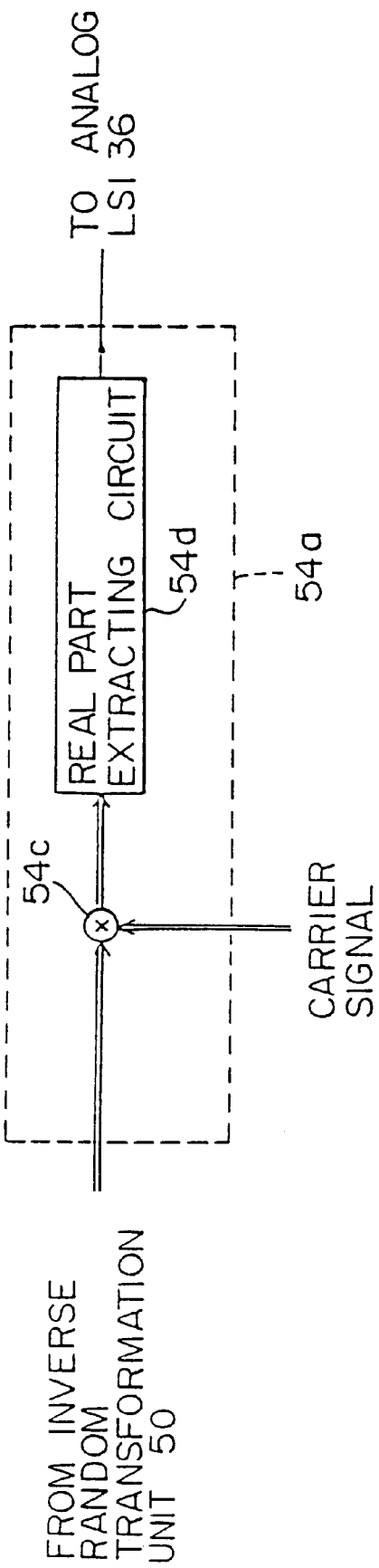
FIG. 36 is a block diagram illustrating an embodiment of a modulator.

The passband transformation unit 53 receives the above output (the regenerated second base band signal) of the inverse random transformation unit 50 and transforms the regenerated second base band signal to regenerate the voice or facsimile signal in the form of a digital passband signal. As indicated in FIGS. 30A–30B, the passband transformation unit 53 comprises a modulator 54a and a carrier signal generation unit 54b. The above output of the inverse random transformation unit 50 is first modulated by the modulator 54a. FIG. 36 is a block diagram illustrating an exemplified embodiment of the modulator 54a. The modulator 54a comprises a multiplier 54c and a real part extracting circuit 54d. The above second base band signal is modulated in the multiplier 54c using a carrier signal generated carrier signal generation unit 54b, and a real part of the modulated signal is extracted by the real part extracting circuit 54d to obtain the digital passband signal representing the voice or facsimile signal. The digital passband signal is supplied to the analog large scale integrated circuit 36. The analog large scale integrated circuit 36 comprises a digital to analog converter 37a and a low-pass filter 37b. The above digital passband signal is converted to an analog form by the digital to analog converter 37a, and the analog passband signal is filtered through the low-pass filter 37b to regenerate the analog voice or facsimile passband signal. The low-pass filter 37b is provided for suppressing higher harmonic frequency components generated in the digital to analog converter 37a.

SIGNAL QUALITY DETECT SIGNAL (FIGS. 30A–30B)

As indicated in FIGS. 30A–30B, the above second digital base band signal from the vector signal subtracter unit 49 is also supplied to the signal quality detecting unit SQD 55. In the signal quality detecting unit 55, the error rate in the second digital base band signal is monitored, and the error rate is transmitted to the transmitter which is transmitting the monitored signal to the receiver of FIGS. 30A–30B, through a secondary channel provided between the receiver to the transmitter.

Figure 37:
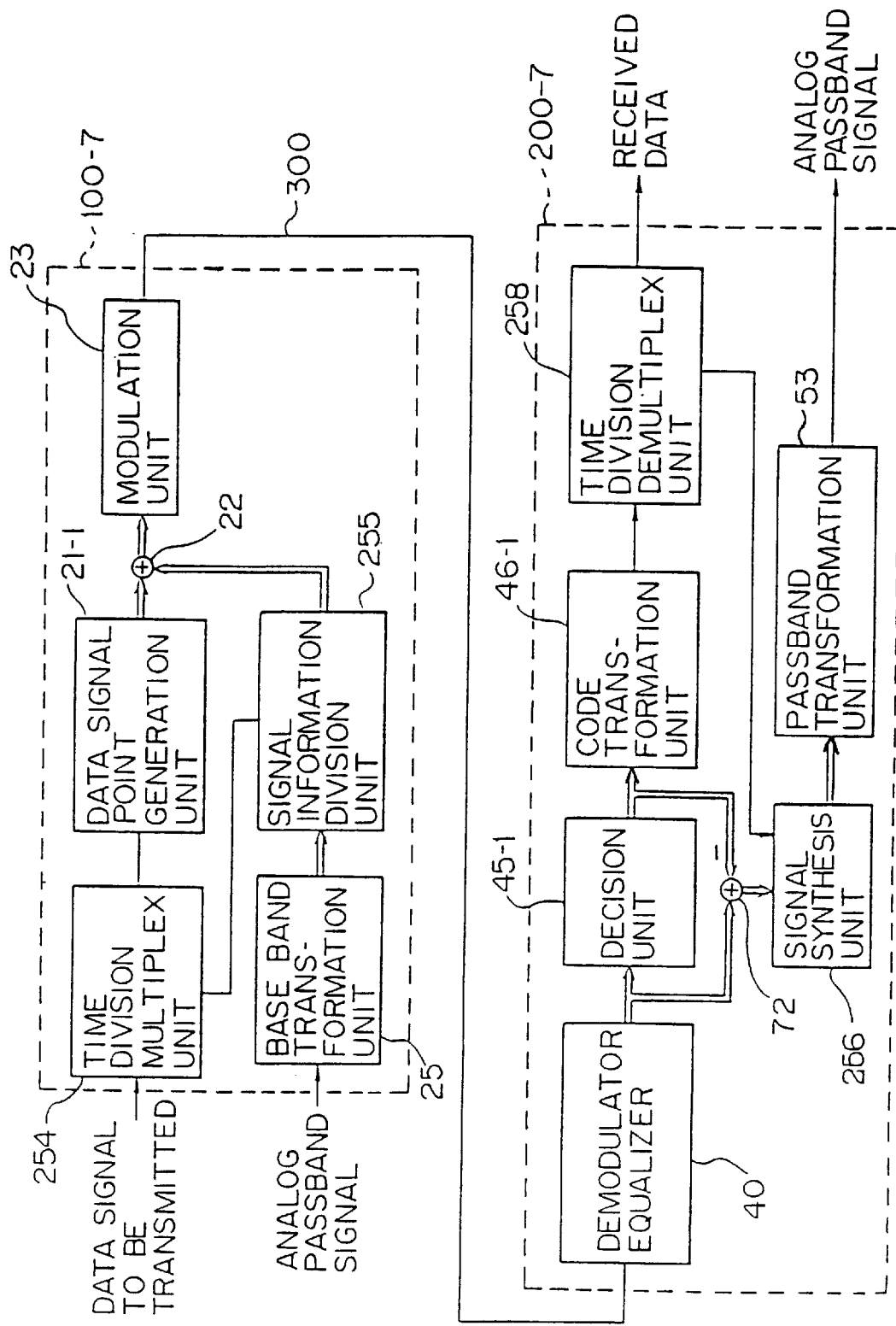
FIG. 37 is a block diagram illustrating a transceiver according to the seventh aspect of the present invention.
Figure 38:
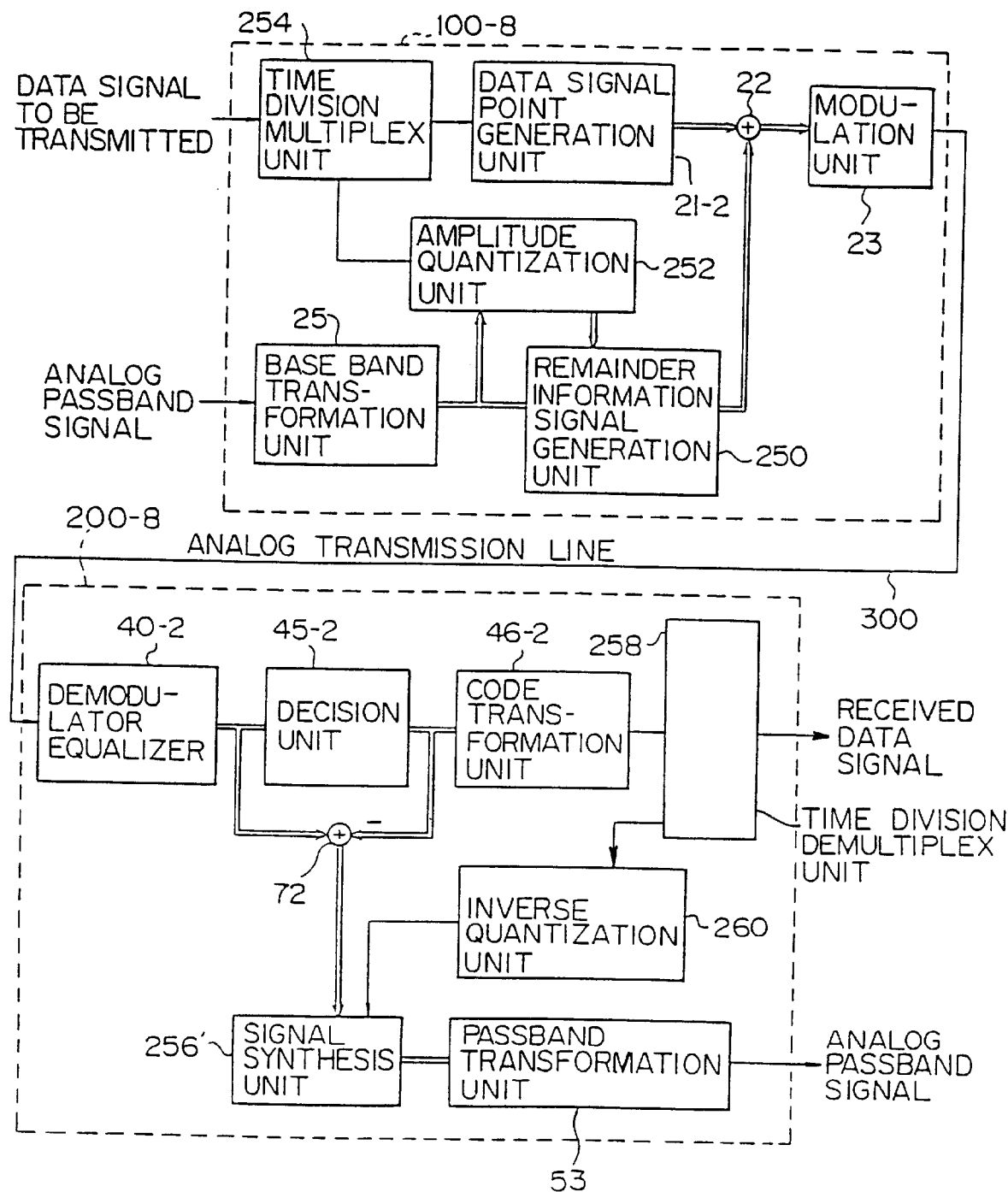
FIG. 38 is a block diagram of the transmission system according to the seventh aspect of the present invention.

BASIC CONSTRUCTION OF THE SEVENTH ASPECT OF THE INVENTION (FIGS. 37 and 38)

FIG. 37 is a block diagram illustrating a transceiver according to the seventh aspect of the present invention. In FIG. 37, reference numeral 100-7 denotes a transmitted, and 200-7 denotes a receiver. In the construction of FIG. 37, reference numeral 254 denotes a time division multiplex unit, 21-1 denotes a data signal point generation unit, 22 denotes a vector signal superimposing unit (signal adder), 23 denotes a modulation unit, 255 denotes a signal information division unit, 300 denotes an analog transmission line, 40 denotes a demodulator and equalizer, 45-1 denotes a decision circuit, 72 denotes a vector signal subtracter, 46-1 denotes a code transformation unit, 256 denotes a signal synthesis unit, and 258 denotes a time division demultiplex unit. In the transmitter 100-7, the base band transformation unit 25 receives an analog voice or facsimile signal in the form of a passband signal, and transforms the analog voice or facsimile signal into a first vector, base band signal. The signal information division unit 255 receives the first vector base band signal and dividers information included in (carried by) the first vector base band signal into first and second portions. The first portion of the information is supplied to the time division multiplex unit 254 as a first digital signal, and the second portion of the information is supplied to the vector signal superimposing unit 22 as a second vector base band signal. The time division multiplex unit 254 has first and second signal input ports and at least one signal output port. The time division multiplex unit 254 receives the first digital signal from the signal information division unit 255 through the first signal input port, and a second digital signal (data signal) through the second signal input port. The time division multiplex unit 254 multiplexes the first and second digital signals to supply the multiplexed digital signal to the data signal point generation unit 21-1. The data signal point generation unit 21-1 receives the multiplexed digital signal, and generates a third vector base band signal representing a data signal point in a vector signal space, based an a block (or series) of samples of the received multiplexed digital signal. The generated data signal point is one of a plurality of predetermined data signal points in the vector signal space. The vector signal superimposing unit (signal adder) 22 superimposes a plurality of vector components of the second vector base band signal on a plurality of vector components of the third vector base band signal, component by component to generate a superimposed vector base band signal. The modulation unit 23 modulates the superimposed vector base band signal to generate an analog modulated signal. The analog modulated signal is transmitted through an analog transmission lines 300 connecting the transmitter 100-7 with the receiver 200-7.

In the receiver 200-7, the demodulator and equalizer 40 receives the analog modulated signal, and equalizes and demodulates the analog modulated signal to regenerate the above superimposed vector base band signal. The decision unit 45-1 receives the regenerated superimposed vector base band signal, and determines which one of the plurality of predetermined data signal points in the vector signal space the above regenerated superimposed vector base band signal corresponds to (is nearest), to regenerate the above third vector base band signal. The code transformation unit 46-1 receives the third vector base band signal, and transforms the same to the above multiplexed digital signal. The vector signal subtracter unit 72 receives the above regenerated superimposed vector base band signal and the above regenerate third vector base band signal, and subtracts a plurality of vector components of the third vector base band signal from a plurality of vector components of the superimposed vector base band signal, component by component, to regenerate the respective vector components of the above second vector base band signal. The regenerated second vector base band signal is supplied to the signal synthesis unit 256. The time division demultiplex unit 258 receives the regenerated multiplexed digital signal, and demultiplexes the same to regenerate the first and second digital signals. The regenerated first digital signal is supplied to the signal synthesis unit 256. The signal synthetic unit 256 receives the above regenerated second vector base band signal and the regenerated first digital signal, and synthesizes these signals to regenerate the first vector base band signal. The regenerated first vector base band signal is supplied to the passband transformation unit 53. The passband transformation unit 53 receives the regenerated first base band signal and transforms the same to the above analog voice or facsimile signal in the form of the passband signal.

FIG. 38 is an exemplified embodiment of the transmission system according to the seventh aspect of the present invention. In the transmitter 100-8 of the construction of FIG. 38, the signal information division unit 255 of FIG. 37 is comprised of an amplitude quantization unit 252 and a remainder information signal generation unit 250, and in the receiver 200-8, the signal synthesis unit 256 of FIG. 37 comprises an inverse quantization unit 260. The amplitude quantization unit 252 extracts (detects) information on an amplitude of the analog passband signal (analog voice or facsimile signal) input into the base band transformation unit 25, or a power of the first vector base band signal output from the base band transformation unit 25, (non-linearly) quantizes the amplitude or the power, and supplies the quantized value of the amplitude or the power to the time division multiplex unit 254 as the above first digital signal. The remainder information signal generation unit 250 receives the first vector base band signal from the base band transformation unit 25 and generates the second vector base band signal (a remainder information signal) which includes all the information included in (carried by) the analog voice or facsimile signal, other than the amplitude of the analog voice or facsimile signal.

In the receiver 200-8, the time division demultiplex unit 258 receives the regenerated multiplexed signal as explained with reference to FIG. 37, and demultiplexes the same to separate the above first digital signal from the second digital signal (data signal). The separated first digital signal is supplied to the inverse quantization unit 260, and the first digital signal is inverse-quantized therein to regenerate information on the amplitude of the analog voice or facsimile signal. The regenerated information on the amplitude is supplied to the signal synthesis unit 256'. The signal synthesis unit 256', receives the above information on the amplitude from the inverse quantization unit 260 and the regenerated second vector base band signal from the vector signal subtracter 72, and regenerates the first base band signal based on the regenerated information on the amplitude and the regenerated second vector base band signal.
TRANSMITTER OF THE SECOND EMBODIMENT (FIGS. 39A–39B)

Figure 39A:
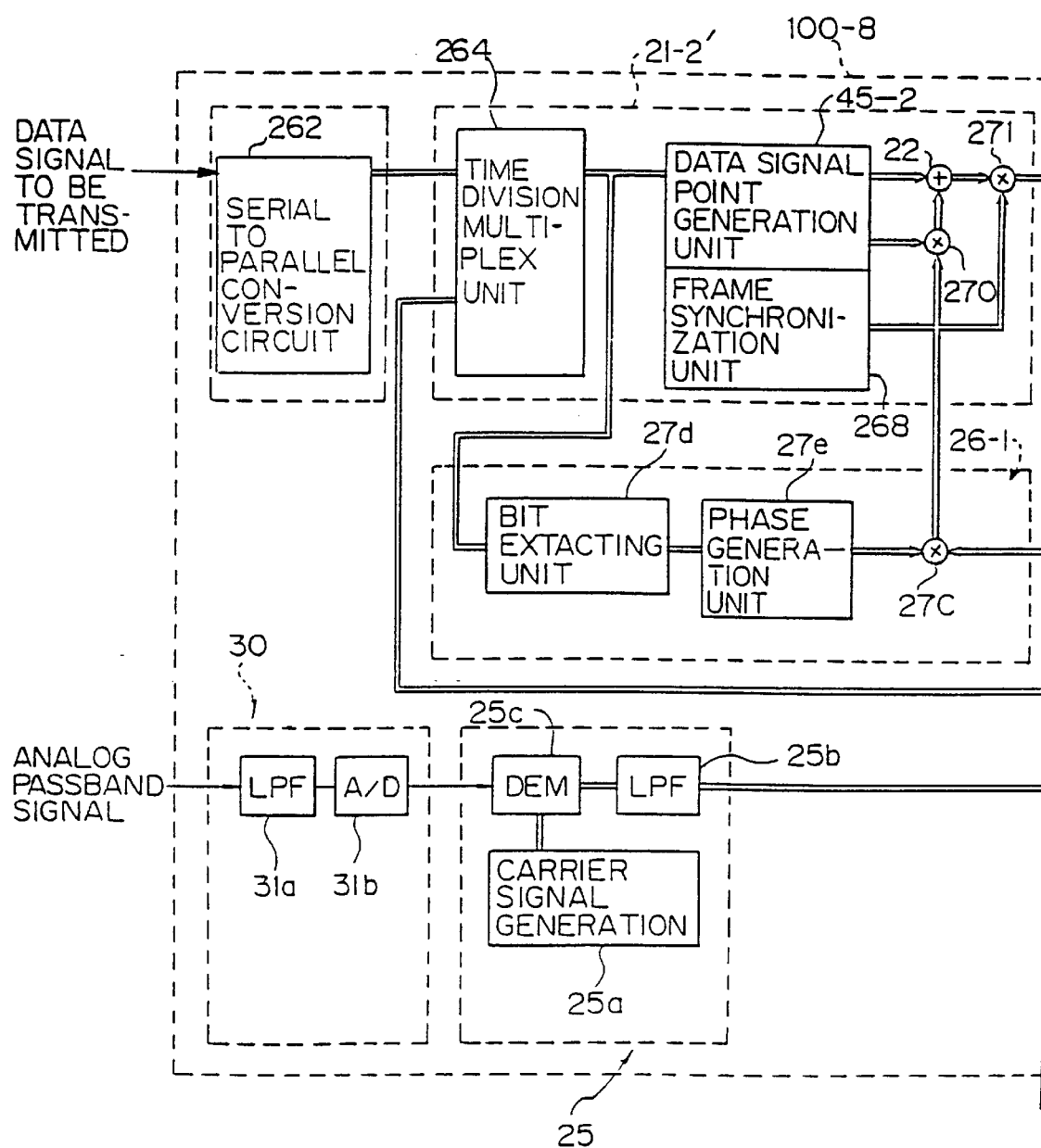
FIGS. 39A–39B show a block diagram illustrating of the transmitter of the second embodiment of the invention.
Figure 39B:
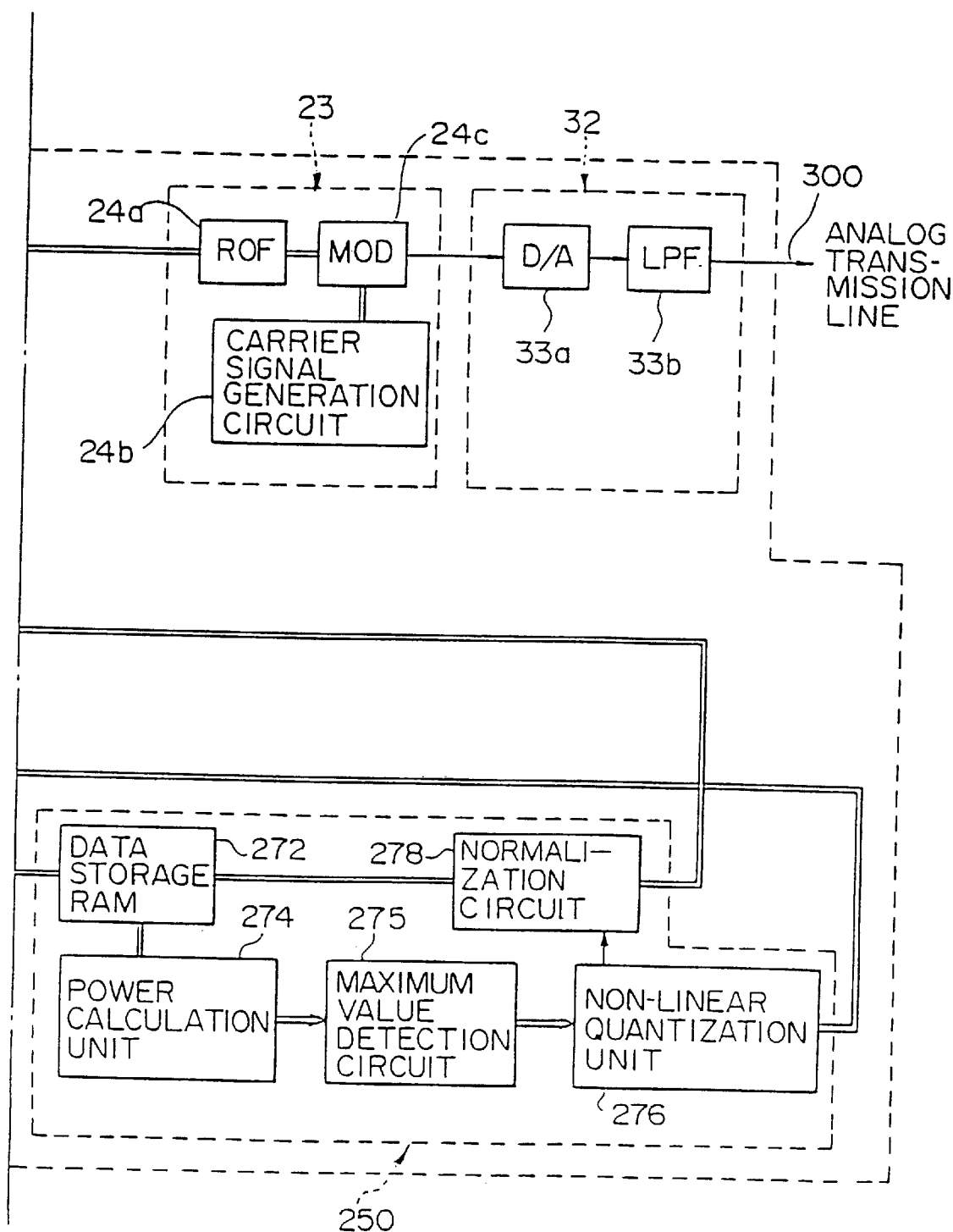

FIGS. 39A–39B show a block diagram illustrating the transmitter of the system of the second embodiment of the present invention. The construction of FIGS. 39A–39B realizes the transmitter 100-8 the seventh embodiment of the present invention. In this embodiment, data transmission rate is assumed to be 9,600 bps, and the Baud rate is assumed to be 2,880 Baud. In FIGS. 39A–39B, reference numeral 262 denotes a serial to parallel conversion circuit, 264 denotes a time division multiplex unit, 21-2' denotes a superimposed signal generation unit, 26-1 denotes a random transformation unit, 23 denotes a modulation unit, 25 denotes a base band transformation unit, 30 and 32, each denote an analog large scale integrated circuit (LSI), and 250' denotes a signal information division unit. The constructions and operations of the modulation unit 23, the base band transformation unit 25, and the analog large scale integrated circuits 30 and 32 are the same as the corresponding elements in the embodiment of FIGS. 18A–18B.

The analog passband signal is input into and filtered through the low-pass filter 31 a in the analog large scale integrated circuit 30, and is then convected to a digital passband signal by the sampling the analog to digital passband signal by the analog to digital converter 31b. The sampling frequency in the analog to digital converter 31b is equal to the Baud rate, 2,880 Hz since the frame frequency of the analog passband signal is 240 Hz and twelve symbols are sampled for each frame. The above digital passband signal is converted to a vector base band signal in the base band transformation unit 25.

SIGNAL INFORMATION DIVISION UNIT (FIGS. 39A–39B and 40–43)

Referring to FIGS. 39, 40, 41, 42 and 43, the vector base band signal is supplied to the signal information division unit 250', and the signal information division unit 250' generates a maximum amplitude signal which indicates a maximum amplitude of the analog passband signal in each frame cycle, and a remaining information signal which includes all the information included in (carried by) the analog voice or facsimile signal, other than the amplitude of the analog voice or facsimile signal. The signal information division unit 250' comprises a data storage RAM 272, a normalization circuit 278, a power calculation unit. 274, a maximum value detection circuit 275, and a nonlinear quantization unit 276.

Digital vector data represented by the vector base band signal (corresponding to the first vector base band signal in FIG. 37) from the base band transformation unit 25 is stored in the data storage RAM 272 for respective symbols. Then, the vector digital data is read from the data storage RAM 272 to be supplied the power calculation unit 274 and the normalization circuit 278.

Figure 40:
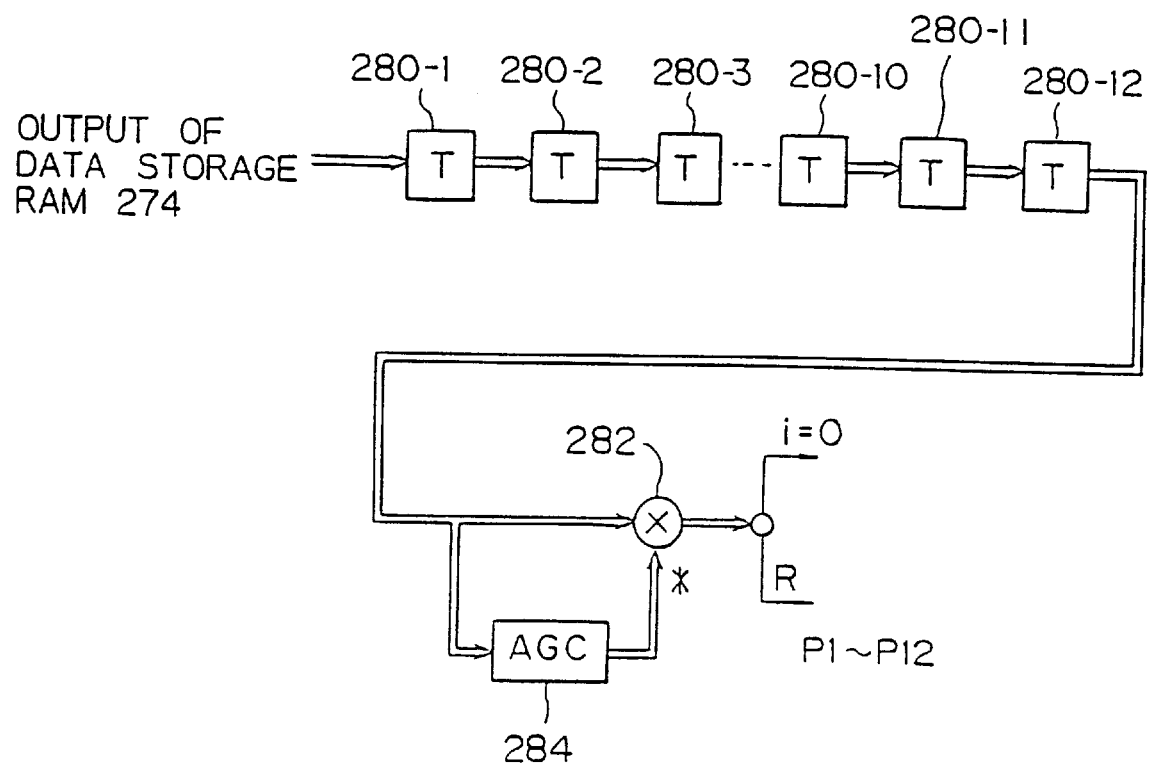
FIG. 40 is a block diagram illustrating an embodiment of a power calculation unit of the transmitter of FIGS. 39A–39B.

FIG. 40 is a block diagram illustrating an exemplified embodiment of the power calculation unit 274. In FIG. 40, reference numerals 280-1 to 280-12 each denote a tapped delay line, 282 denotes a multiplier, and 284 denotes an automatic gain control circuit (AGC). The digital vector data, represented by the vector base band signal, for twelve successive symbols are supplied in turn to the automatic gain control circuit 284 and the multiplier 282. In the automatic gain control circuit 284, a normalized complex conjugate vector of the vector data is generated for each symbol to be supplied to the multiplier 282. In the multiplier 282, the above vector data and the normalized complex conjugate vector data thereof are multiplied for each symbol to generate a vector signal comprised of a real component (denoted by R) equal to the amplitude (norm) of the vector data represented by the vector base band signal, and an imaginary component (denoted by I) equal to zero. Thus, the amplitudes P1 to P12 of the twelve symbols in each frame Ire obtained as the successive real component outputs of the power calculation unit 274.

Figure 41:
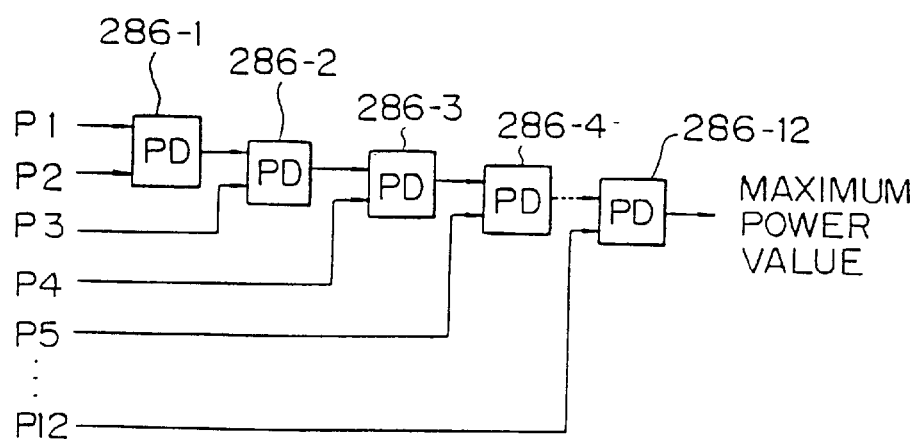
FIG. 41 is a block diagram illustrating an embodiment of a maximum value detection circuit of the transmitter of FIGS. 39A–39B.

The above amplitudes P1 to P12 of the twelve symbols in each frame are then supplied to the maximum value detection circuit 275 in FIG. 39. FIG. 41 is a diagram illustrating an example construction of the maximum value detection circuit 275. In FIG. 41, reference numerals 280-1 to 280-12 each denote a comparator. As indicated in FIG. 41, the comparator 286-1 compares the above amplitude P1 with the amplitude P2, and output-8 a greater one of the amplitudes compared therein. The comparator 286-i (i=2 to 12) compares the amplitude output from the comparator 286-(i–1) with the amplitude P(i+1), and outputs a greater one of the amplitudes compared therein. Thus, the maximum amplitude among the twelve amplitude P1 to P12 for each frame is output from the comparator 286-12.

Figure 42:
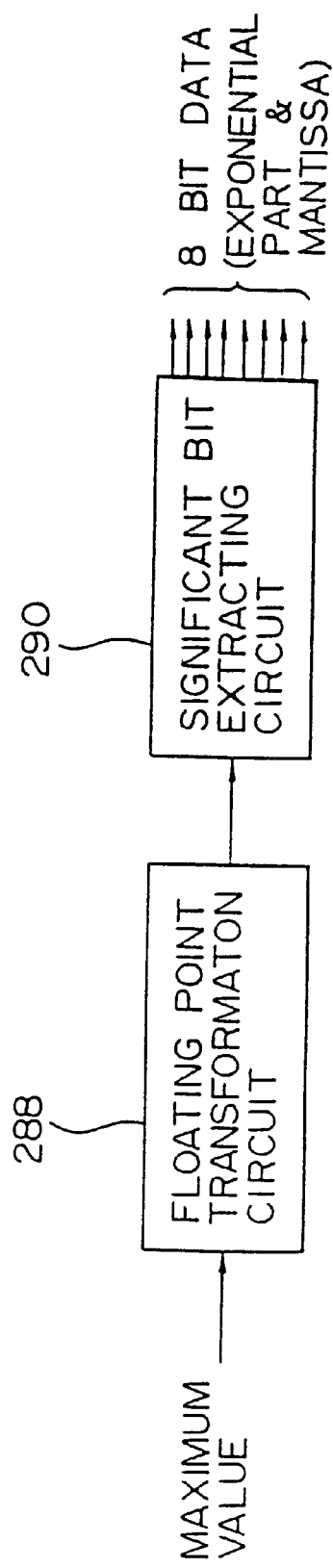
FIG. 42 is a block diagram illustrating an embodiment of a non-linear quantization unit of the transmitter of FIGS. 39A–39B.

The maximum amplitude obtained in the maximum value detection circuit 275 is supplied to the non-linear quantization unit 276 in FIGS. 39A–39B. FIG. 42 is a block diagram illustrating an exemplified embodiment of the non-linear quantization unit 276. In FIG. 42, reference numeral 288 denotes a floating point transformation circuit, and 290 denotes a significant bit extracting circuit. The above maximum value of the amplitude in each frame is transformed to a floating point representation in the floating point transformation circuit 288, and a predetermined number (eight in this example) of significant bits of the maximum value in the floating point representation, are extracted by the significant bit extracting circuit 290. Since a value in a floating point, representation contains an exponential part and a mantissa, the above maximum value of the amplitude in each frame is thus quantized in the significant bit extracting circuit 290 to eight-bit data. Namely, the nonlinear quantization is carried out by a round-off operation of the floating point data.

Figure 43:
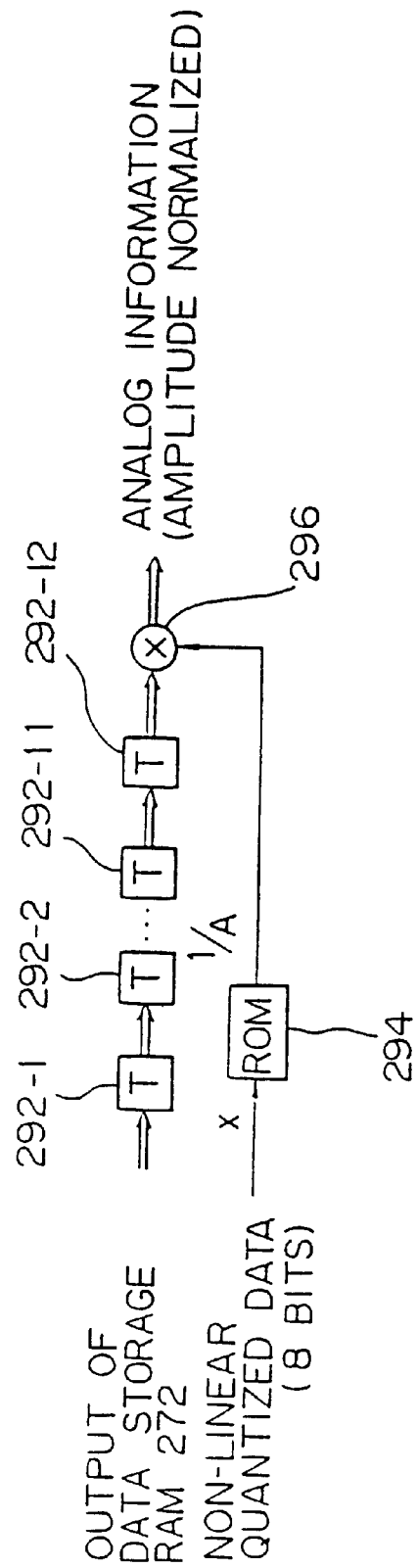
FIG. 43 is a block diagram illustrating an embodiment of a normalization circuit of the transmitter of FIGS. 39A–39B.

The above non-linear quantized value of the amplitude is supplied to the normalization circuit 278 and the superimposed signal generation unit 21-2' in FIGS. 39A–39B. FIG. 13 is a diagram illustrating an example construction of the normalization circuit 278. In FIG. 43, reference numerals; 292-1 to 292-12 each denote a tapped delay line, 294 denotes a road-only memory (ROM), and 296 denotes a multiplier. In FIG. 43, the digital vector data, represented by the vector base band signal, for twelve symbols per each frame, are successively supplied through the tapped delay lines 292-1 to 292-12 to the multiplier 296. In parallel to the above, the non-linear quantized value of the amplitude for each frame, supplied from the non-linear quantization unit 276, is supplied to the read-only memory (ROM) 294 to obtain an inverse number of the maximum amplitude of the base band signal corresponding to the analog voice or facsimile passband signal in each frame. The inverse number of the maximum amplitude is supplied to the multiplier 296 to multiply respective vector components of the digital vector data (represented by the vector base band signal) by the inverse number of the maximum amplitude to successively obtain normalized digital vector data for the twelve symbols for each frame. The normalized digital vector data correspond to the remainder information signal to be supplied to the random transformation unit 26-1. Thus, the amplitude of the remainder information signal can be made small enough so that the remainder information signal can be superimposed on the data signal within the noise margin of the data signal.

SERIAL-TO-PARALLEL CONVERSION CIRCUIT (FIG. 44)

Figure 44:
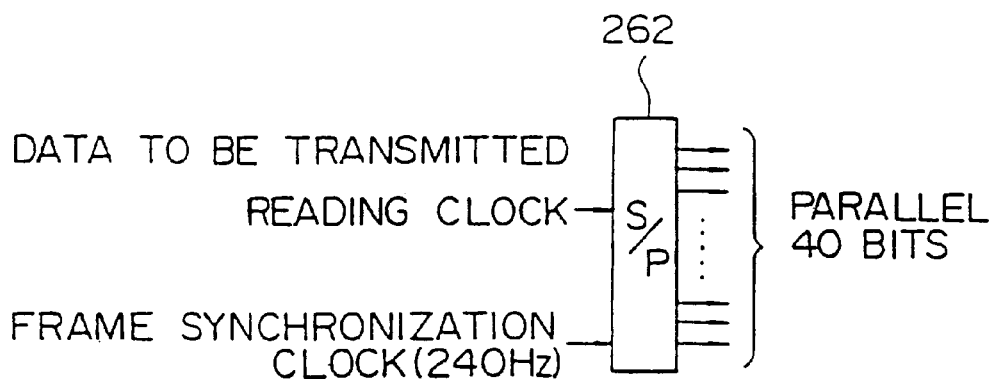
FIG. 44 is a block diagram illustrating inputs and output of a serial-to-parallel conversion circuit of the transmitter of FIGS. 39A–39B.

Digital data, which is to be transmitted together with the above analog voice or facsimile signal by the transmitter of FIG. 39, is serially supplied to the serial to parallel conversion circuit 262 in FIG. 39 with a transmission rate of 9,760 Hz. FIG. 44 is a diagram illustrating inputs and an output of the serial to parallel conversion circuit 262. As indicated in FIG. 44, the above digital data is serially supplied to the serial to parallel conversion circuit 262 synchronized with a corresponding reading clock of a frequency of 9,600 Hz. A frame synchronization clock of a frequency of 240 Hz is also supplied to the serial to parallel conversion circuit 262 to provide a timing of a parallel output. Thus, for each frame cycle of 1/240 second, the serial to parallel conversion circuit 262 serially input forty bits of the digital data, and outputs the forty bits in parallel. The parallel forty bits are supplied to the superimposed signal generation unit 21-2' in FIGS. 39A–39B.

SUPERIMPOSED SIGNAL GENERATION UNIT (FIGS. 39A–39B and FIGS. 45–53)

The superimposed signal generation unit 21-2' in FIGS. 39A–39B corresponds to the data signal point generation unit 21-2 and the vector signal superimposing unit 22 in FIG. 38. The superimposed signal generation unit 21-2' comprises a time division multiplex unit 264, a data signal point generation circuit 45-2, a frame synchronization circuit 268, a vector signal superimposing unit (signal adder) 22, and signal multipliers 270 and 272.

Figure 45:
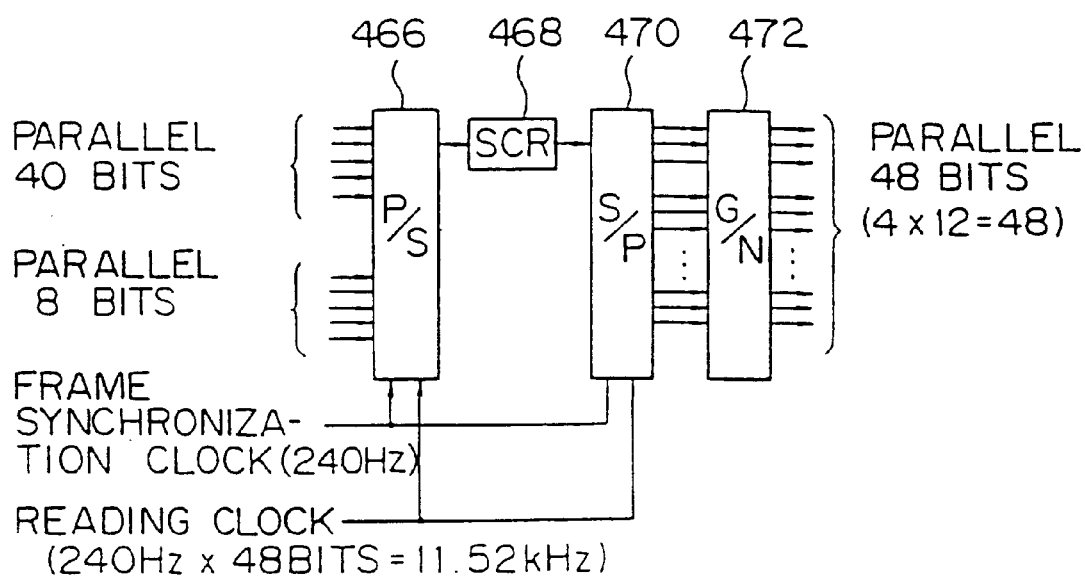
FIG. 45 is a block diagram illustrating an embodiment of a time division multiplex unit of the transmitter of FIGS. 39A–39B.
Figure 46:
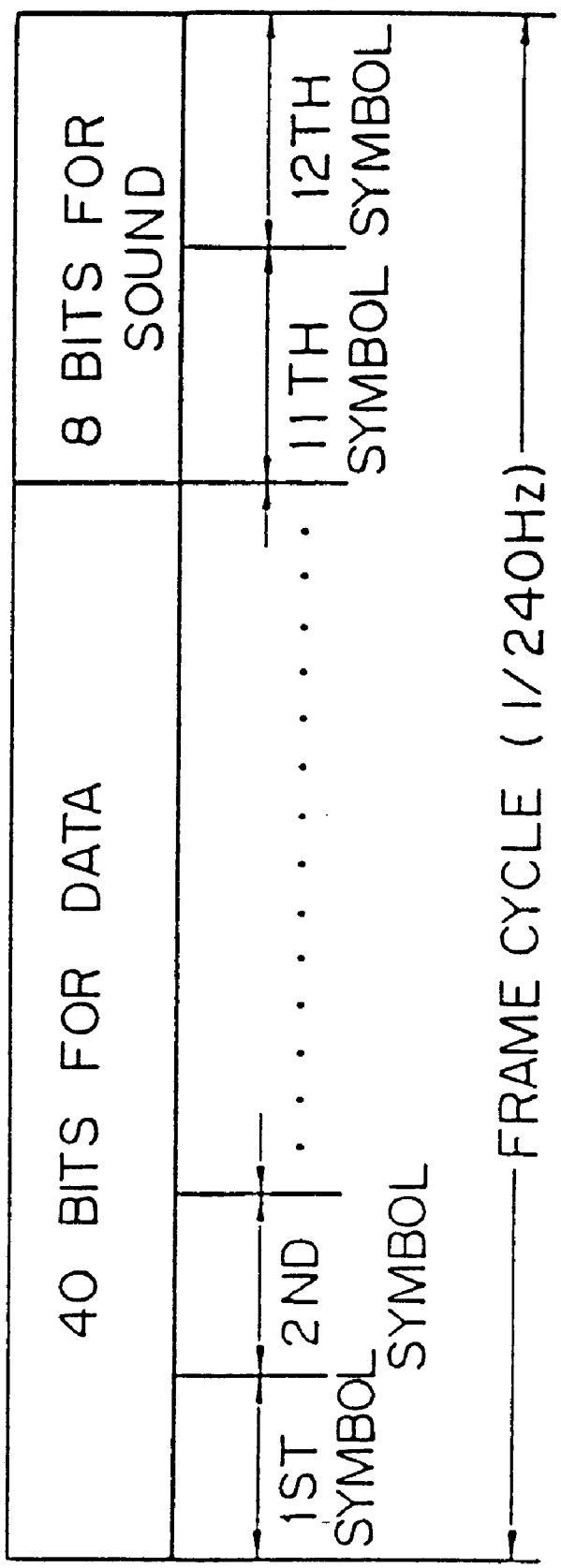
FIG. 46 is a block diagram illustrating a frame format of the multiplexed data used in the transmitter of FIGS. 39A–39B.

FIG. 45 is a block diagram illustrating an embodiment of the time division multiplex unit 264. In FIG. 45, reference numeral 466 denotes a parallel to serial conversion circuit, 468 denotes a scrambler, 470 denotes a serial to parallel conversion circuit, and 472 denotes a Gray/natural conversion circuit. The parallel to serial conversion circuit 466 receives the parallel forty bits from the serial to Parallel conversion circuit 262 of FIG. 44, and the parallel eight bits from the non-linear quantization unit 276 of FIG. 42. In addition, a frame synchronization clock of a frequency of 240 Hz and a reading clock of a frequency of 11.52 kHz are supplied to the parallel to serial conversion circuit 466. The above forty and eight bits are input into the parallel to serial conversion circuit 466 in parallel synchronizing with the frame synchronization clock, and serially output the respective bits synchronizing with the reading clock to the scrambler 468 to scramble the serial output therein. Thus, the above forty bits and the eight bits are multiplexed in the parallel to serial conversion circuit 466. FIG. 46 is a diagram illustrating a frame format of the multiplexed data used in the embodiment of FIG. 39. As indicated in FIG. 46, each flame contains forty bits (ten symbols, where each symbol comprised of four bits in the came of 9,600 bps and 2,400 Baud) for the data signal and eight bits (two symbols) for the voice or facsimile signal. A series of bits scrambled in the scrambler 468 is serially supplied to the serial to parallel conversion circuit 470. The above frame synchronization clock and the reading clock are also supplied to the serial to parallel conversion circuit 470. The output of the scrambler 468 is serially input into the serial to parallel conversion circuit 470 synchronizing with the reading clock, and a set of the total forty-eight bits are output to the Gray/natural conversion circuit 472 in parallel synchronizing with the frame synchronization clock. The parallel forty-eight bits are input into the Gray/natural conversion circuit 472, and converted from the natural code to the Gray code therein. The converted parallel forty-eight bits output from the Gray/natural conversion circuit 472 in FIG. 45 are supplied to the data signal point generation circuit 45-2 in FIGS. 39A–39B.

Figure 47:
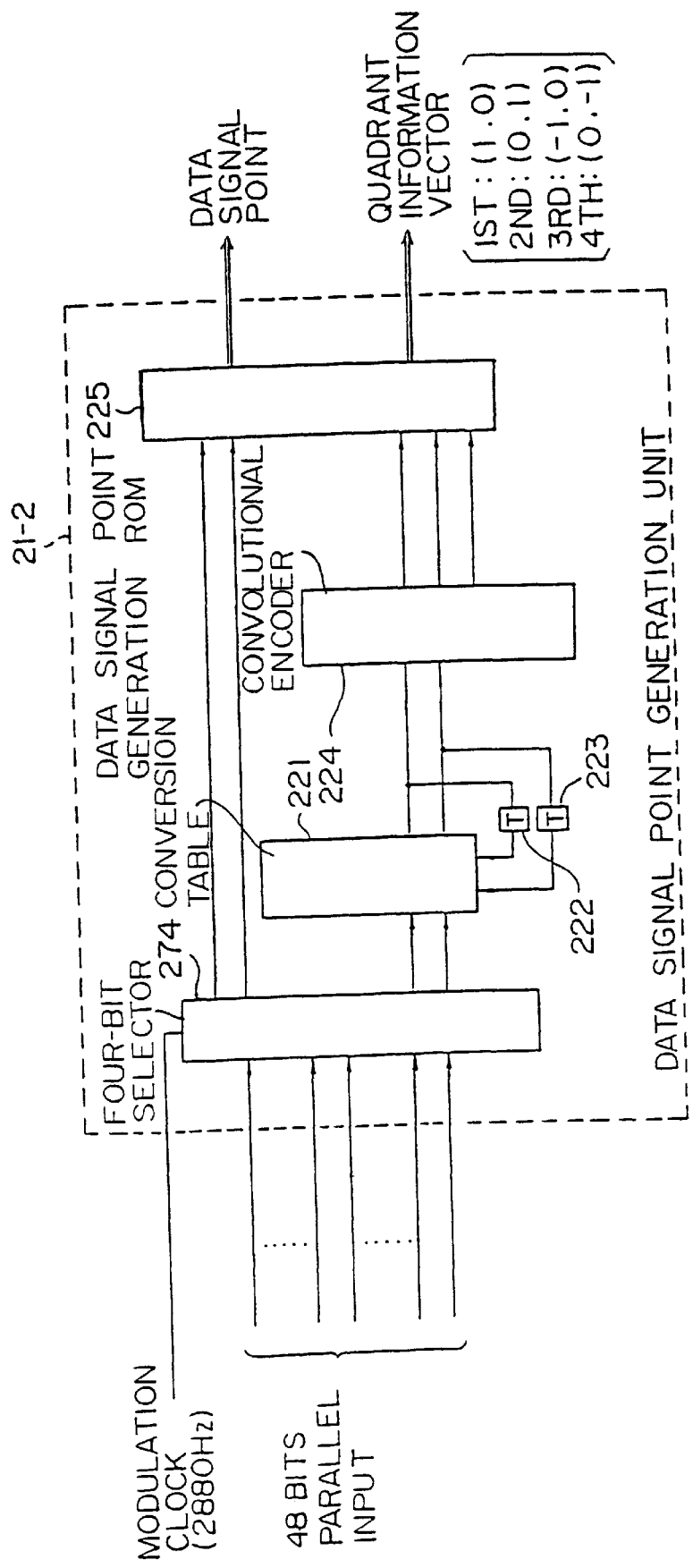
FIG. 47 is a diagram illustrating an embodiment of a data signal point generation circuit of the system of FIG. 38.
Figure 48:
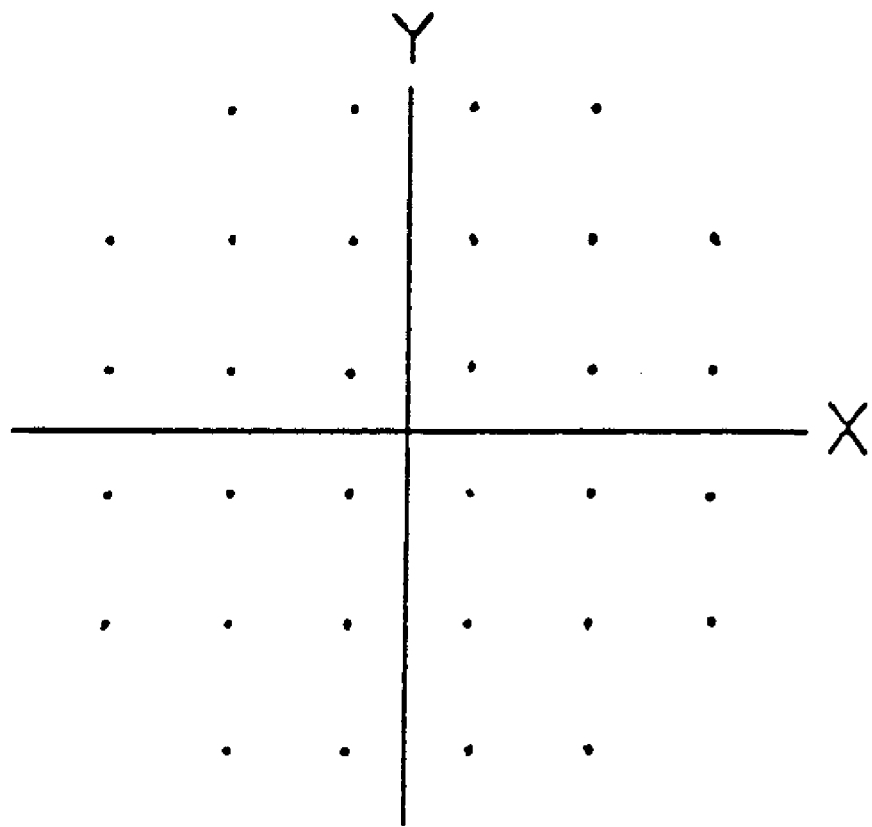
FIG. 48 is a signal-space diagram indicating thirty-two data signal points generated by a data signal point generation ROM of the circuit of FIG. 47.

FIG. 47 is a block diagram illustrating an exemplified embodiment of the data signal point generation circuit 45-2. In FIG. 47, reference numeral 221 denotes a conversion table, 222 and 223 each denote a tapped delay element, 224 denotes a convolutional encoder, 225 denotes n data signal point generation ROM (read-only-memory), and 274 denotes a four-bit selector. The above parallel forty-eight bits output from the Gray/natural conversion circuit 472 of FIG. 45 are applied to the four-bit selector 274, and a modulation clock of a frequency equal to 2,880 Hz (=240 Hz×12 symbols) is applied to the four-bit selector 274. For each cycle of the modulation clock, each four bits in the forty-eight bits are selected and output in parallel from the four-bit selector 274. Two bits of the four bits in each modulation cycle are directly applied to the data signal point generation ROM 225 as portion of an address signal thereof, and the other two bits output from the four-bit selector 274 are applied to the conversion table 221. The conversion table 221 and the tapped delay elements 222 and 223 constitute a phase differential encoder, and the two bits are phase-difference encoded therein. Namely, a pair of bits among the six parallel bits are input into the phase differential encoder, and the phase differential encoder obtains and outputs a pair of difference bits comprised of a first difference between a first bit of the input pair of bits and a first bit of the precedingly output pair of difference bits and a second difference between a second bit of the input pair and a second bit of the precedingly output pair of difference bits. The pair of difference bits output from the phase differential encoder are supplied to the convolutional encoder 224. The convolutional encoder 224 converts the pair of difference bits to three encoded bits which include one redundant bit. The three encoded bits are input into the data signal point generation ROM 225 together with the remaining two bits output from the serial/parallel and Gray/natural conversion circuit 274. The data signal point generation ROM 225 maps the symbol determined by the five (three plus two) bits onto a vector signal space to determine a data signal point and output a signal representing the data signal point. Thirty-two data signal points as indicated in FIG. 48 can be generated from the five bits. The data signal point generation ROM 225 also outputs a quadrant information vector (sector information vector) indicating in which quadrant (which sector in the signal space) the determined data signal point is located on the signal space (signal plane) as indicated in FIG. 47.

TABLE 3

Correspondence between
Frame Phase and
Frame Synchronization Data Vector

| Frame Phase (Symbol Number) | Vector Angle 0 | Frame Synchronization Data Vector |
|---|---|---|
| 1 | 0° | $\cos 0° + j \sin 0°$ |
| 2 | 90° | $\cos 90° + j \sin 90°$ |
| 3 | 0° | $\cos 0° + j \sin 0°$ |

TABLE 3-continued

Correspondence between
Frame Phase and
Frame Synchronization Data Vector

| Frame Phase (Symbol Number) | Vector Angle 0 | Frame Synchronization Data Vector |
|---|---|---|
| 4 | 0° | cos0° + j sin0° |
| 5 | 90° | cos90° + j sin90° |
| 6 | 90° | cos90° + j sin90° |
| . | . | |
| . | . | |
| . | | |
| 12 | 0° | cos0° + j sin0° |

Figure 49:
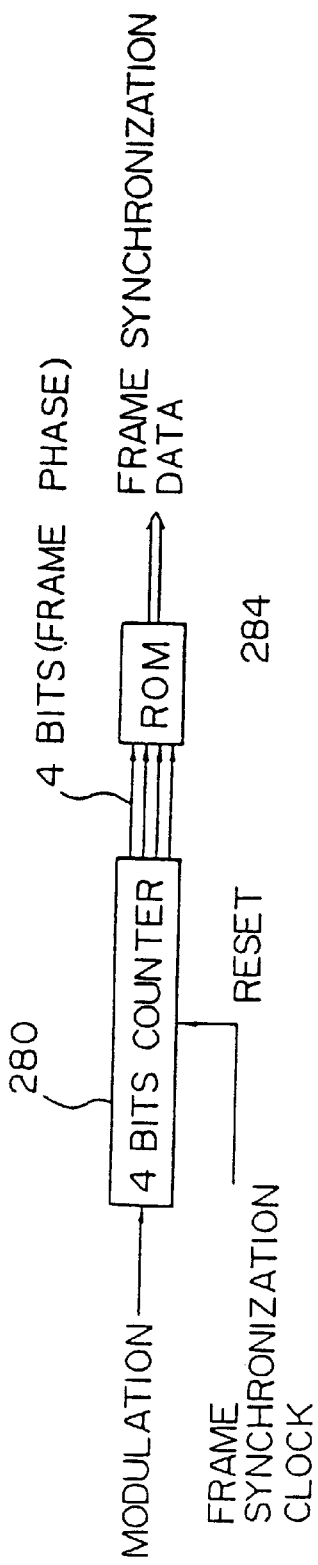
FIG. 49 is a block diagram illustrating an embodiment of a frame synchronization unit of the transmitter of FIGS. 39A–39B.
Figure 50:
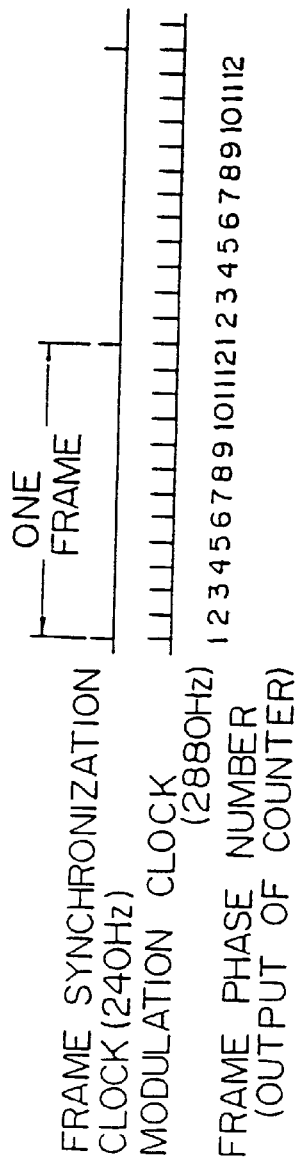
FIG. 50 is a diagram illustrating the operation of the frame synchronization unit of FIG. 49.

FIG. 49 is a block diagram illustrating an embodiment of the frame synchronization unit 268. In FIG. 49, reference numeral 280 denotes a four-bit counter, and 284 denotes a ROM (read-only-memory). The four-bit counter 280 receives the modulation clock as a count-up signal and the frame synchronization clock as a reset signal, and counts the number of cycles of the modulation clock input thereto from each time the frame synchronization clock is input thereto, as indicated in FIG. 50. Thus, the count output of the counter 280 indicates a frame phase in each frame, i.e., the frame phase signal indicates which symbol data (the first symbol to the twelfth symbol) in each frame is now transmitting. The output of the four-bit counter 280 is supplied to the ROM 284 as an address signal. The ROM 284 stores frame synchronization data corresponding to the frame phase and having three phases, and outputs the frame synchronization data in a vector form. Table 3 indicates correspondence between the frame phase and the frame synchronization data. As indicated in FIG. 39, the frame synchronization data output from the frame synchronization unit 268 is supplied to the multiplier 272.

Figures 51, 52:
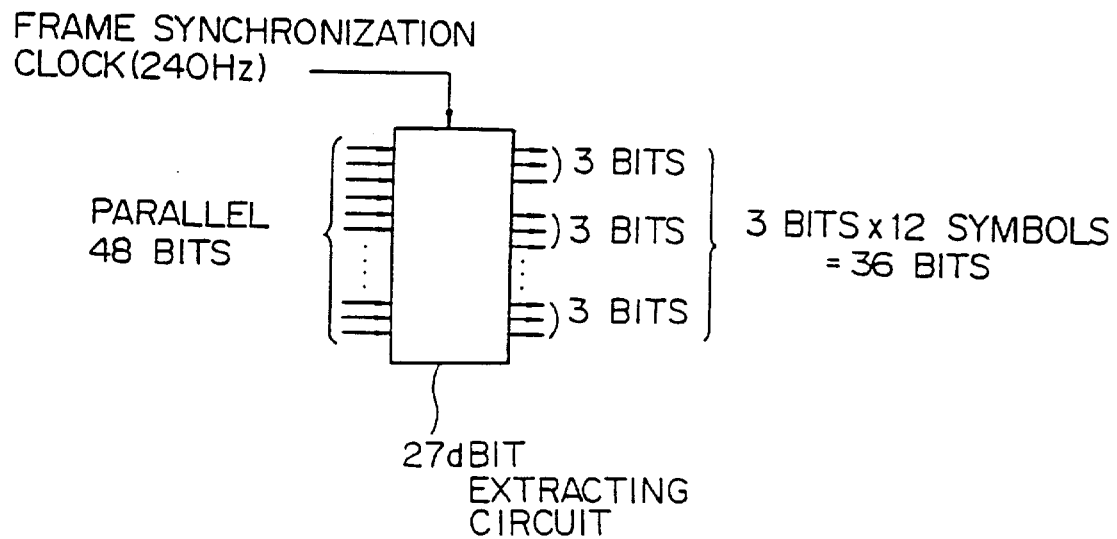
FIG. 51 is a block diagram illustrating the inputs and outputs of the bit extracting unit of the transmitter of FIGS. 39A–39B.
FIG. 52 is a block diagram illustrating the operation of the bit extracting unit of FIG. 51 in the case of 2,880 Baud.

As indicated in FIGS. 39A–39B, the random transformation unit 26-1 comprises a bit extracting unit 27d, a phase generation unit 27e, and a multiplier 27c. FIG. 51 is a diagram illustrating the inputs and outputs of the bit extracting unit 27d of FIG. 39. The bit extracting unit 27d receives the output of the Gray/natural conversion circuit 472 (FIG. 45) in the time division multiplex unit 264, and obtains and outputs twelve blocks corresponding to twelve symbols, where each block is comprised of three bits X0, X1, and X2 for each symbol. The bit extracting unit 27d also receives FIG. 52 is a diagram illustrating the operation of the bit extracting unit 27d of FIG. 51 in the case of 2,880 Baud. Since three bits are required to generate the eight phase shift values, 0°, 45°, 90°, 135°, 180°, 225°, 270°, 315°, and 360°, as indicated in FIG. 10, 3 bits×12 symbols=36 bits are used among the forty-eight bits in each frame. The phase generation unit 27e determines phase shift values according to the values of the respective blocks of bits supplied from the bit extracting unit 27a, and generates vector signals respectively having phases of the phase shift values. Namely, the phase generation unit 27e receives three bits $X^0$, $X^1$, and $X^2$ for each symbol, and determines the phase shift value 0 according to the correspondence as indicated in Table. 1. Then, the phase generation unit 27b generates a random phase vector signal having the determined phase 0, where the random phase vector signal is comprised of two vector components, cos 0 and sin 0. The vector signal is supplied to the multiplier 27c to be mixed with the above digital base band signal therein. The multiplier 27c receives the normalized digital base band signal from the normalization unit 278 in the signal synthesis unit 250' and the above vector signals from the phase generation unit 27e and multiplies the digital base band signal by the vector signals to generate the randomly transformed vector base band signal. The randomly transformed vector base band signal is output from the multiplier 27c to the multiplier 270 in the superimposed signal generation unit 21-2'.

Figure 53:
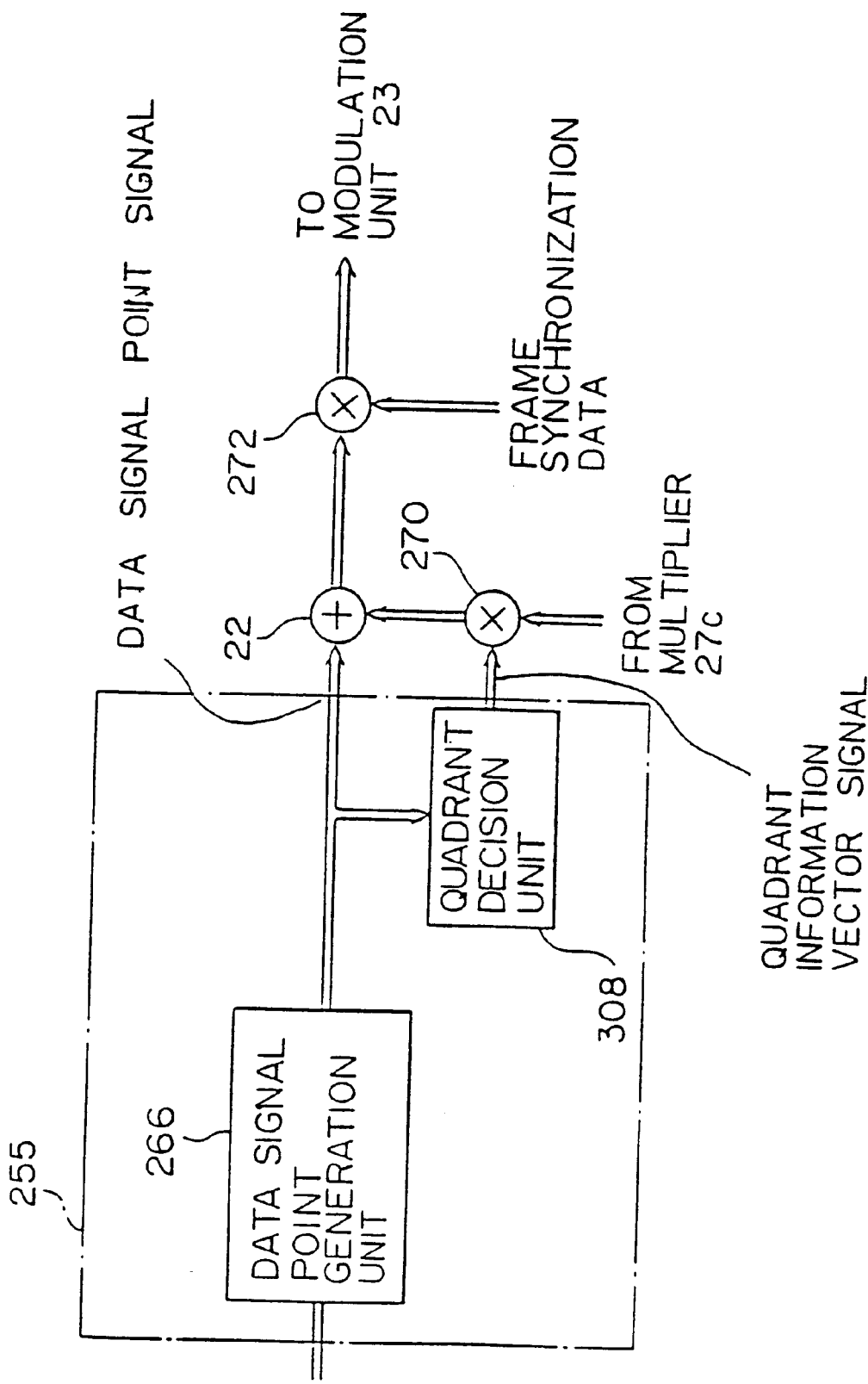
FIG. 53 is a block diagram illustrating the construction around the quadrant decision unit in the transmitter of FIGS. 39A–39B.

FIG. 53 is a block diagram illustrating the circuit arrangement on the output side of the data signal point generation unit 45-2 in the construction of FIG. 39. In FIG. 53, the data signal point generation unit 45-2 comprises a data signal point generation unit 266 and a quadrant decision unit 308, while the data signal point generation ROM 225 of FIG. 47 realizes the functions of both the data signal point generation unit 266 and the quadrant decision unit 308. The data signal point generation unit 266 generates and outputs the data signal point vector signal, and the quadrant decision unit 308 generates and outputs the quadrant information vector signal. The quadrant information vector signal which is indicated in Table 4, is supplied to the multiplier 270. In the multiplier 270, the randomly transformed digital base band signal supplied from the normalization unit 27c, is multiplied by the quadrant information vector signal.

TABLE 4

Correspondence between
Quadrant and
Quadrant Information Vector

| Quadrant Quadrant Information Phase | Vector |
|---|---|
| 1 | cos0° + j sin0° |
| 2 | cos90° + j sin90° |
| 3 | cos180° + j sin180° |
| 4 | cos270° + j sin270° |

Figure 54B:
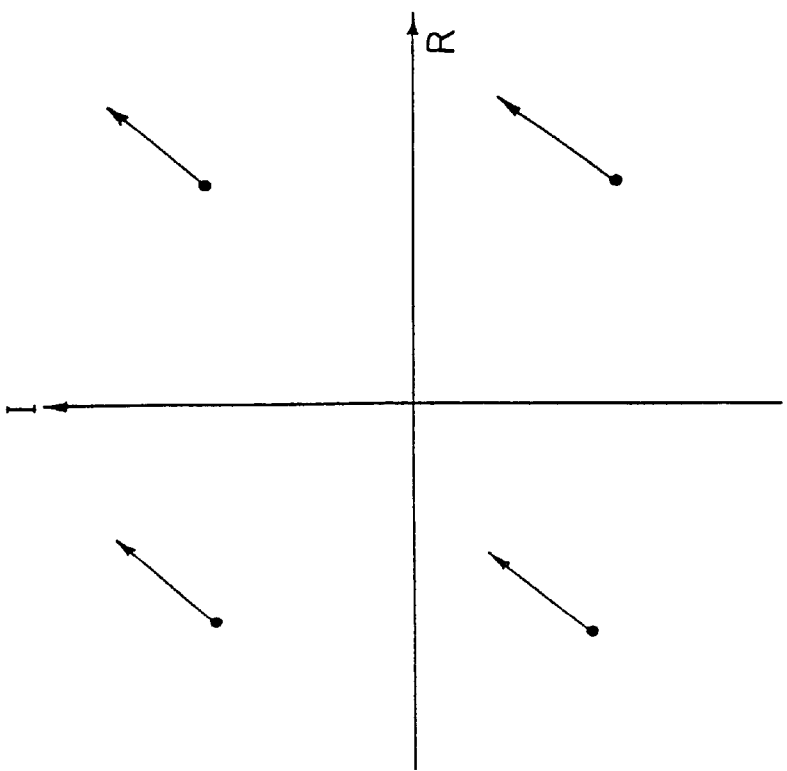
FIG. 54B is a signal-space diagram indicating vector base band signals superimposed on the data signal points when the randomly transformed digital base band signal is rotated corresponding to the respective quadrant.
Figure 54A:
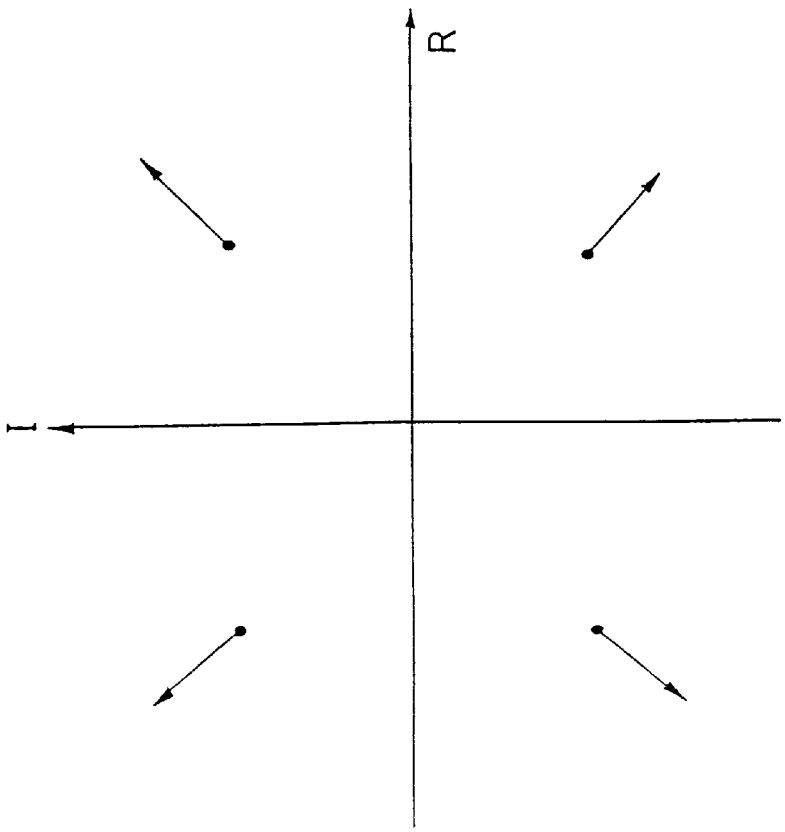
FIG. 54A is a signal-space diagram indicating vector base band signals superimposed on the data signal points when the randomly transformed digital base band signal is not rotated corresponding to the respective quadrant.

Thus, the randomly transformed digital base band signal is rotated corresponding to the respective quadrant in which the respective data signal point is located so that a direction of a vector of the randomly transformed digital base band signal is the same as the direction when the randomly transformed digital base band signal is superimposed on a data signal point located in the first quadrant, even when the randomly transformed digital base band signal is superimposed on a data signal point located in the second, third, or fourth quadrant, as indicated in FIGS. 54A and 54B. The randomly transformed and rotated digital base band signal is supplied to the signal adder 22 to be superimposed on the data signal point vector signal therein. FIG. 54A is a signal-space diagram indicating vector base band signals superimposed on the data signal points when the randomly transformed digital base band signal is not rotated corresponding to the respective quadrant, and FIG. 54B in a signal-space diagram indicating vector base band signals superimposed on the data signal points when the randomly transformed digital base band signal is rotated corresponding to the respective quadrant. Thus, even when a phase of the carrier signal slips, the superimposed vector base band signal can be correctly regenerated.

Then, the superimposed vector base band signal output, from the signal adder 22 is supplied to the multiplier 272. In the multiplier 272, the superimposed vector base band signal is multiplied by the frame synchronization data supplied from the frame synchronization unit 268.

RECEIVER OF THE SECOND EMBODIMENT (FIGS. 55A–55B)

Figure 55A:
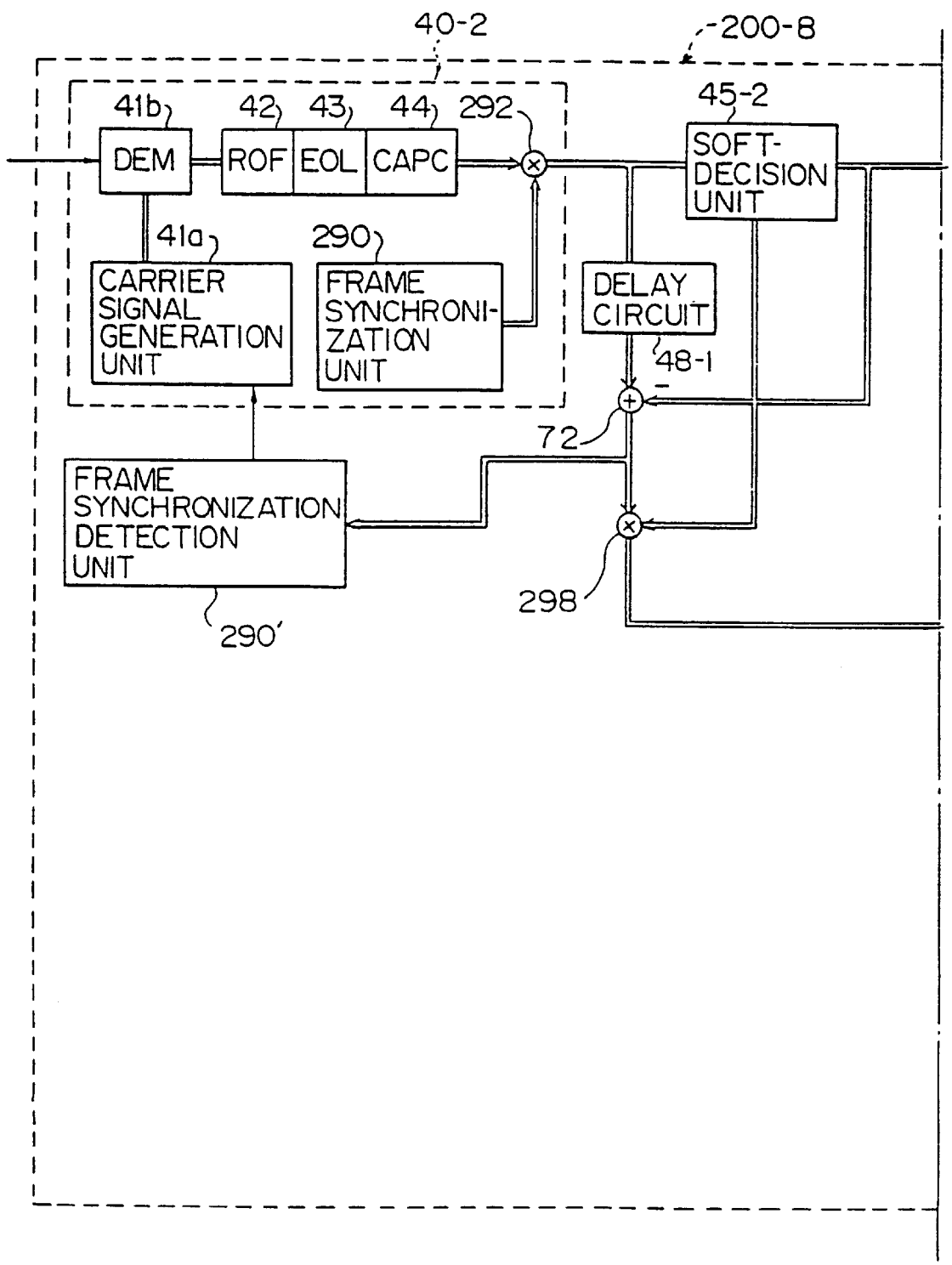
FIGS. 55A–55B show a block diagram illustrating a second embodiment of the receiver.
Figure 55B:
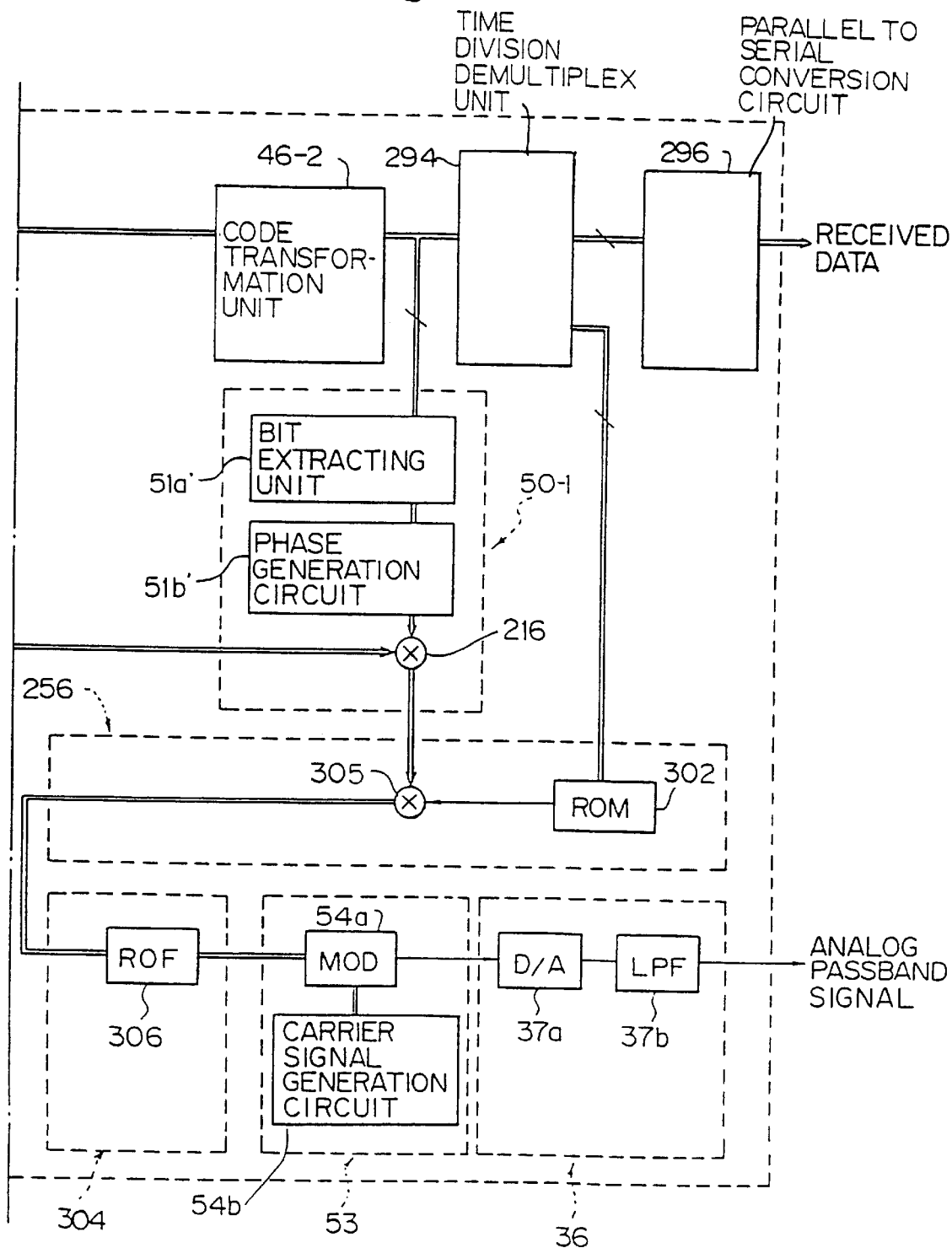

FIGS. 55A–55B show a block diagram illustrating the construction of the receiver in the second embodiment of the present invention. The construction of FIG. 55 realizes the receiver 200-8 in the seventh aspect of the present invention. In this embodiment, data transmission rated is assumed to be 9,600 bps, and the Baud rate is assumed to be 2,880 Baud. In FIG. 55, reference numeral 40-2 denotes a demodulator/equalizer unit, 45-2' denotes a soft-decision unit, 413-1 denotes a delay circuit, 72 denotes a signal subtracter, 298 denotes a multiplier, 46-2 denotes a code transformation unit, 290' denotes a frame synchronization detection circuit, 294 denotes a time division demultiplex unit, 296 denotes a parallel to serial conversion circuit, 50-1 denotes an inverse random transformation unit, 256 denotes a signal synthesis unit, 306 denotes a roll-off filter, 53 denotes a passband transformation unit, and 36 denotes an analog large scale integrated circuit.

The demodulator/equalizer unit 40-2 comprises a frame synchronization unit 290 and a multiplier 292, in addition to the same construction as the demodulator/equalizer 40 in FIG. 30. The frame synchronization unit 290 has a construction similar to that of the frame synchronization unit 268 of FIG. 39, and generates and outputs a complex conjugate vector signal as the frame synchronization data output from the frame synchronization unit 268 in FIG. 39. A reset signal in supplied to the frame synchronization unit 264 from the frame synchronization detection circuit 290' when a frame synchronization during a training operation is detected. During a normal receiving operation, the frame synchronization detection circuit 290' monitors the output (error signal) of the delay circuit 48-1 and generates and outputs a request for a retraining operation. The complex conjugate vector signal corresponding to the frame synchronization data is supplied to the multiplier 292. The multiplier 292 receives the demodulated and equalized signal output from the carrier automatic phase control unit 44 and the frame synchronization data, and the demodulated and equalized signal is multiplied by the complex conjugate vector signal. The multiplied signal in output from the multiplier 292 to the soft-decision circuit 45-2 and the delay circuit 48-1.

TABLE 5

Correspondence between
Quadrant and
Complex Conjugate Vector

| Quadrant Complex Conjugate Phase | Vector |
|---|---|
| 1 | $\cos 0° + j \sin 0°$ |
| 2 | $\cos 90° + j \sin 90°$ |
| 3 | $\cos 180° + j \sin 180°$ |
| 4 | $\cos 270° + j \sin 270°$ |

Figure 56:
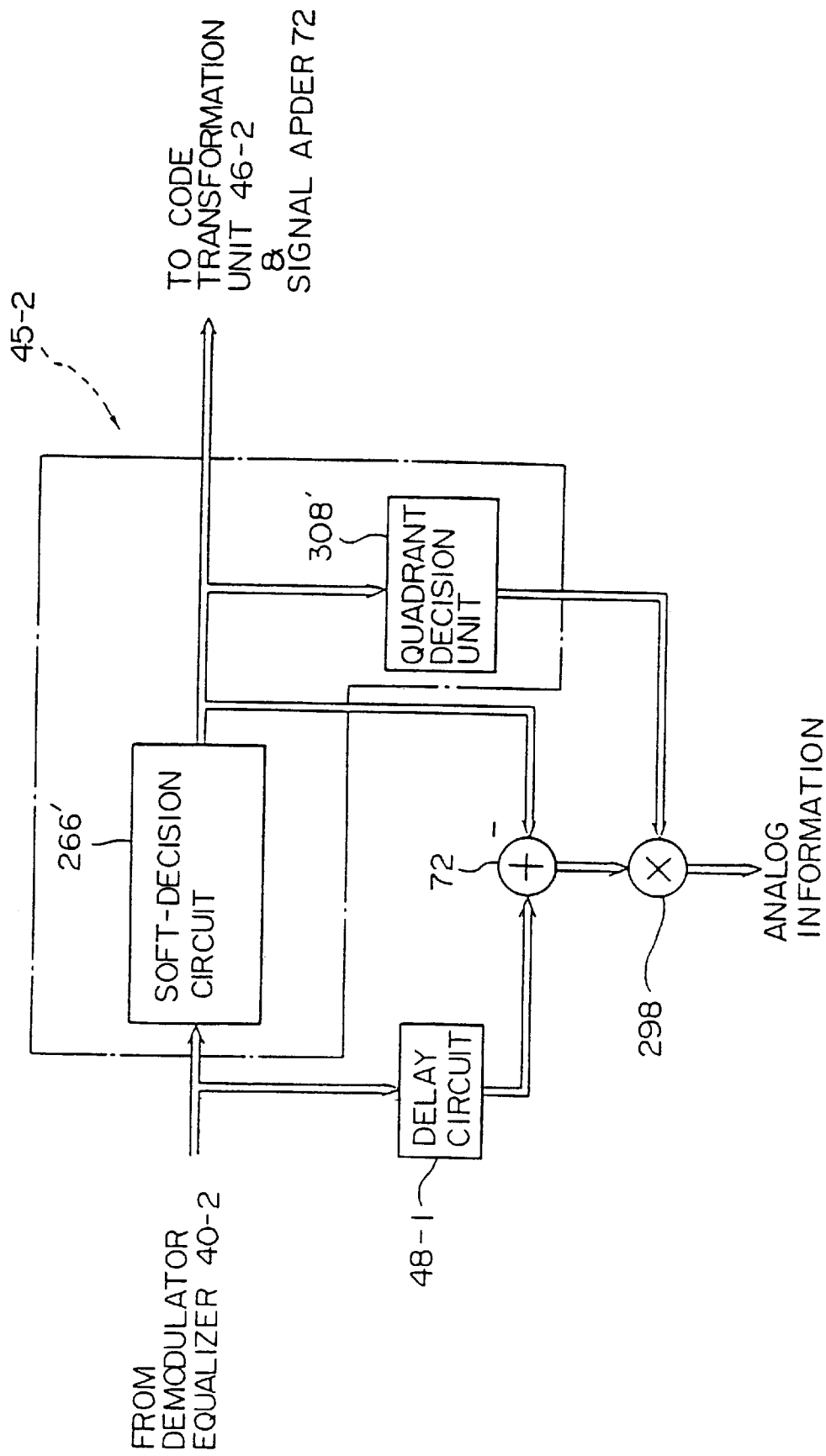
FIG. 56 is a block diagram illustrating the construction of a soft-decision circuit of the receiver of FIGS. 55A–55B.

FIG. 56 is a block diagram illustrating the embodiment of the soft-decision circuit 45-2 in FIG. 55. The soft-decision circuit 45-2 comprises a soft-decision circuit 266' and a quadrant decision unit 308'. The soft-decision unit 266' in FIG. 56, the delay circuit 48-1, and the signal subtracter 72 are basically the same as the soft-decision unit 45', the delay circuit 48, and the signal subtracter 49 of FIGS. 30A–30B. The quadrant decision unit 308' determines in which quadrant the data signal point determined by the soft-decision circuit 266' is located, and generates and outputs a complex conjugate vector signal of the aforementioned quadrant information vector signal output from the quadrant decision circuit 308' in the data signal point generation unit 255 in FIG. 53, as indicated in Table 5. The above complex conjugate vector signal is supplied to the multiplier 298, together with the output of the signal adder 72, and the randomly transformed digital base band signal supplied from the normalization unit 27c, is multiplied by the complex conjugate signal of the quadrant information vector signal to regenerate the randomly transformed digital base band signal generated in the normalization unit 27c of FIGS. 39A–39B.

The operations of the code transformation unit 46-2 and the inverse random transformation unit 50-1 are basically the same as the corresponding elements in the construction of FIG. 30. Thus, the data signal point output of the soft-decision unit 45-2 is transformed to a multiplexed base band signal in the code transformation unit 46-2. Then, the multiplexed base band signal is transformed from a Gray code to a natural code, descrambled, and demultiplexed in the time division demultiplex unit 294. Although not shown, the construction of the time division demultiplex unit 294 is self-explanatory from the construction of the time division multiplex unit 264 in FIG. 39, the operation of the time division demultiplex unit 294 is the inverse process of inverse process of the operation of the time division multiplex unit 264 in FIG. 39. Thus, the non-linearly quantized value of the amplitude for each frame, generated in the non-linear quantization unit 276 of FIG. 39, is regenerated in the time division demultiplex unit 294 (separated from the parallel forty bits for the digital data) to be supplied to the read-only memory (ROM) 302 as an address signal. The ROM 302 stores inversely quantized amplitude values corresponding to non-linear quantized amplitude values, and outputs an inversely quantized amplitude value corresponding to the non-linear quantized amplitude value applied thereto as the address signal. The inversely quantized amplitude value output from the ROM 302 is supplied to the multiplier 305. Parallel to the above operation through the ROM 302, the inverse random transformation unit 50-1 regenerates the normalized digital base band signal generated in the normalization unit 278 in the signal synthesis unit 250' of the transmitter 100-8' of FIGS. 39A–39B. The normalized digital base band signal regenerated by the inverse random transformation unit 50-1 is multiplied by the inversely quantized amplitude value output from the ROM 302 to regenerate the vector base band signal representing the analog voice or facsimile signal for each symbol. The vector base band signal regenerated by the multiplier 305 is supplied to the roll-off filter 306 for reshaping the waveform thereof and depressing unnecessary frequency components. Then, the vector base band signal filtered through the roll-off filter 306 is transformed to a passband signal in the passband transformation unit 53, and converted to an analog form in the analog large scale integrated circuit 36 to regenerate the analog voice or facsimile passband signal.

According to the second embodiment, the information on the amplitude of the base band signal corresponding to the analog voice or facsimile passband signal is separated from the information on the phases of the base band signal corresponding to the analog voice or facsimile passband signal, quantized, and time division multiplexed with the digital signal, and the discrete data signal points are generated on a signal space based on the time division multiplexed signal, and the above separated information on the phases is superimposed on the discrete data signal points. Since only the information on the phases of the base band signal corresponding to the analog voice or facsimile passband signal is superimposed on the data signal points, the vector base band signal representing the information on the phases can be superimposed on the data signal points within the noise margin as indicated by dashed lines in FIG. 8, without controlling the amplitude of the signal representing the analog voice or facsimile passband signal.

Figure 57A:
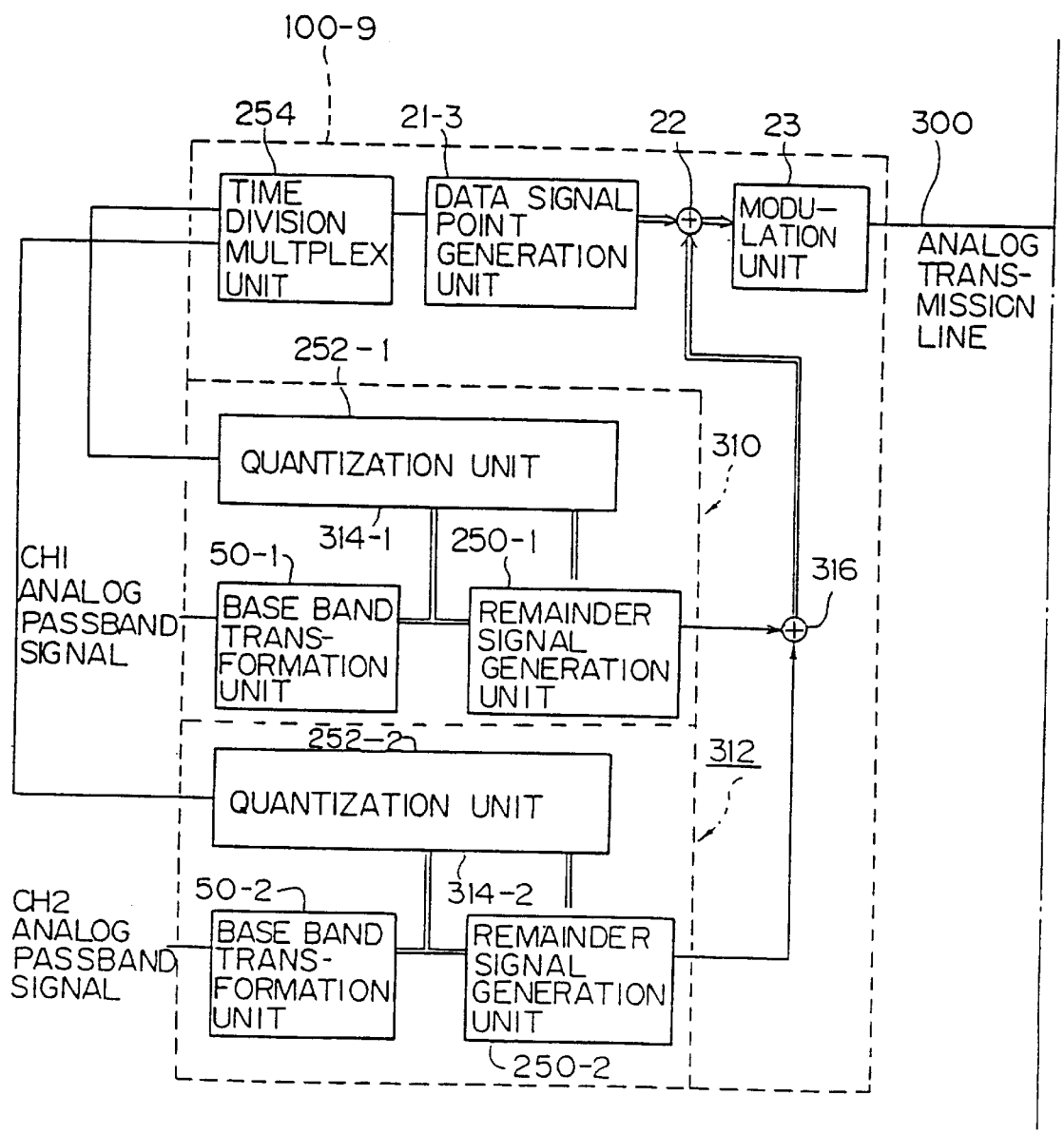
FIGS. 57A–57B show a block diagram of a transceiver according to the eighth aspect of the present invention.
Figure 57B:
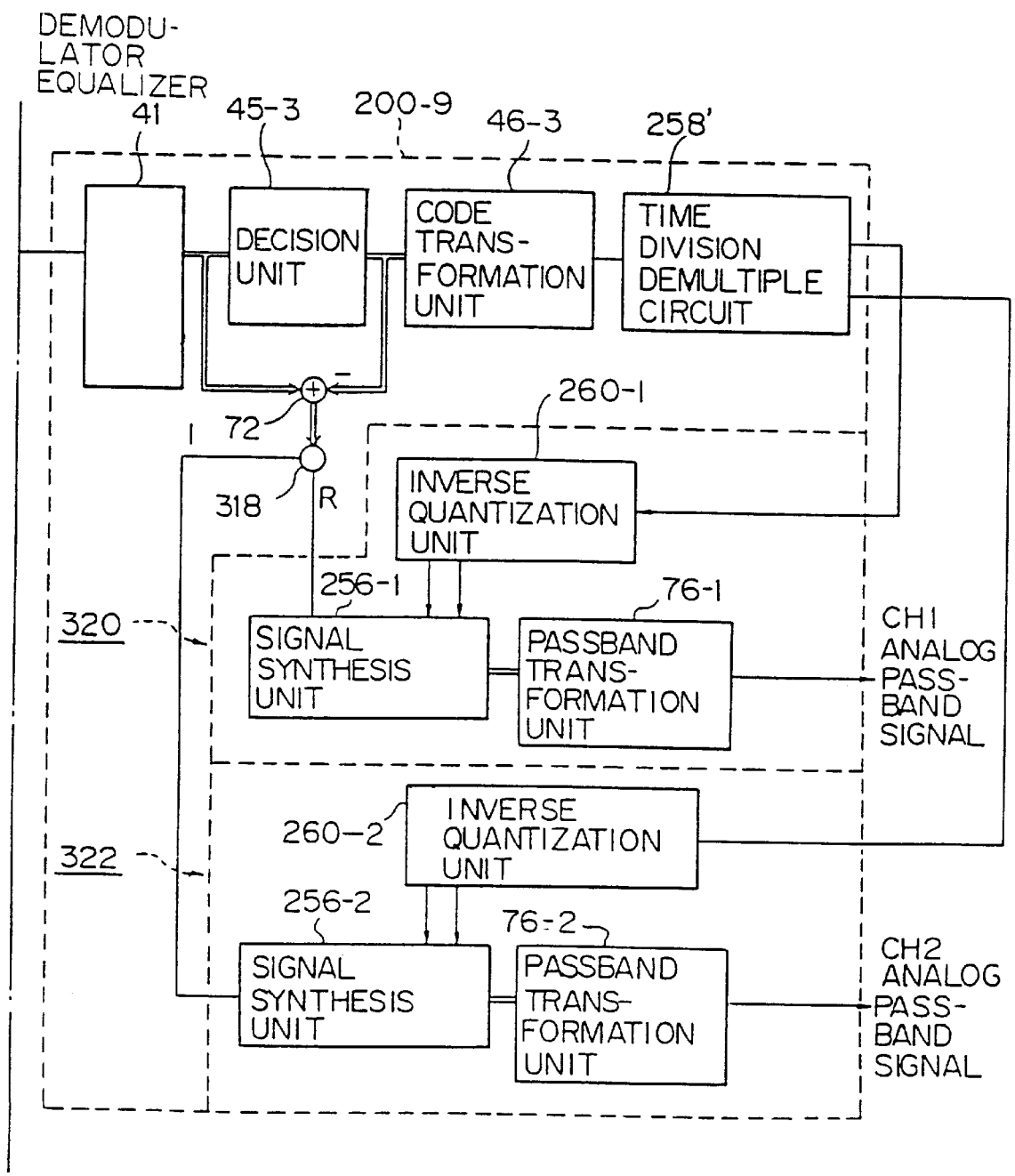

BASIC CONSTRUCTION OF THE EIGHTH ASPECT OF THE INVENTION (FIGS. 57A and 57B)

FIGS. 57A–57B show a block diagram illustrating a transceiver according to the eighth embodiment of the present invention. In FIGS. 57A–57B, reference numeral 100-9 denotes a transmitter, and 200-9 denotes a receiver or transmission system. In the construction of FIG. 57, reference numeral 254 denotes a time division multiplex unit, 21-3 denotes a data signal point generation unit, 22 denotes a vector signal superimposing unit (signal adder), 23 denotes a modulation unit, 252-1 and 252-2 each denote a quantization unit, 50-1 and 50-2 each denote a base band transformation unit, 250-1 and 250-2 each denote a remainder signal generation unit, 300 denotes an analog transmission line, 40-3 denotes a demodulator and equalizer, 45-3 denotes a decision unit, 72 denotes a vector signal subtracter, 46-3 denotes a code transformation unit, 258' denotes a time division demultiplex unit, 260-1 and 260-2 each denote an inverse quantization unit, 256-1 and 256-2 each denote a signal synthesis unit, and 76-1 and 76-2 each denote a passband transformation unit.

The transmitter 100-9 according to the eighth aspect of the present invention receives two channels CH1 and CH2 of analog voice or facsimile passband signals. Information included in (carried by) each analog voice or facsimile passband single is divided into first and second portions. The first portion of information in each channel is quantized, and the quantized information of the first potions for the first and second channels are time division multiplexed. A signal representing discrete data signal point is generated based on the multiplexed signal, and the second portions of the information for the first and second channels are superimposed on the data signal point signal, and the superimposed signal is transmitted to the receiver 200-9 through the analog transmission line. The receiver 200-9 receives the above superimposed signal, and separates the second portions superimposed on the data signal point signal from the data signal point signal. The multiplexed signal is regenerated based on the data signal point signal, and is demultiplexed to the first portions of information for the first and second channels. Then, the first and second portions of information for the first and second channels are synthesized to regenerate the information included in the analog voice or facsimile passband signals of the respective channels.

The above discussed transmitting and receiving operations are performed by the respective elements in the transmitter 100-9 and the receiver 200-9 as will be explained below.

In the transmitter 100-9, the base band transformation units 50-1 and 50-2, the remainder signal generation units 250-1 and 250-2, and the quantization units 252-1 and 252-2 are provided for the first and second channels, respectively. The analog voice or facsimile passband signal for each channel is transformed to abase band signal by the base band transformation unit 50-1 or 50-2 for the channel. The baste band signal for each channel is supplied to the quantization unit 252-1 or 252-2 for the channel and the remainder signal generation unit 250-1 or 250-2 for the channel. The quantization unit 252-1 or 252-2 for each channel generates the first portion of information for the channel based on the base band signal for the channel, and quantizes the first portion information to supply the quantized first portion of information to the time division multiplex unit 254. The remainder signal generation unit 250-1 or 250-2 for each channel generates the second portion of the information for the channel based on the base band signal for the channel. The time division multiplex unit 254 receives the first portions of information for the first and second channels and multiplexes the quantized first portions of information for the first and second channels to generate a multiplexed signal. The data signal point generation unit 21-3 receives the multiplexed signal, and generates a data signal point signal representing a data signal point based on the multiplexed signal. The above second portion of information for the first and second channels are superimposed on the data signal point signal in the signal adder 22. The data signal point signal on which the second portions are superimposed, is modulated by the modulation unit 23, and is then transmitted to the receiver 200-9 through the analog transmission line 300.

In the receiver 200-9, the signal transmitted from the transmitter 100-9 is demodulated and equalized in the demodulator and equalizer unit 40-3, and the data signal point included in the demodulated and equalized signal is determined by the decision unit 45-3, to regenerate the data signal point signal. The vector signal subtracter 72 obtains a difference between the demodulated and equalized signal and the data signal point signal. The difference includes the second portions of information for the first and second channels, and the second portions of information for the first and second channels are supplied to the signal synthesis units 256-1 and 256-2 for the first and second channel, respectively. The data signal point signal regenerated in the decision unit 45-3, is transformed by the code transformation unit 46-3 to regenerate the multiplexed signal. The multiplexed signal is demultiplexed to the quantized first portion of information for the first and second channels in the time division demultiplex unit 258' and the quantized first portions of information for the first and second channels are supplied to the inverse quantization units 260-1 and 260-2 for the first and second channels, respectively. The inverse quantization units 260-1 and 260-2 for the first and second channels inversely quantizes the quantized first portions of information to regenerate the first portions of information to supply the regenerated first portion of information to the signal synthesis units 256-1 and 256-2 for the first and second channels, respectively. The signal synthesis unit 256-1 or 256-2 for each channel receives the first and second portions of information for the channel, and regenerates the base band signal containing information included in the analog voice or facsimile passband signal for the channel. The regenerated base band signal for each channel is transformed to regenerate the analog voice or facsimile passband signal in the passband transformation unit 76-1 or 76-2 for the channel. In the above construction of the receiver, the inverse quantization unit may be included in the signal synthesis unit for each channel.

Within the scope of the present invention, the transmitter 100-9 and the receiver 200-9 each can contain more thin two channels of analog voice or facsimile passband signals.

TRANSMITTER OF THE THIRD EMBODIMENT (FIGS. 58A–58B)

Figure 58A:
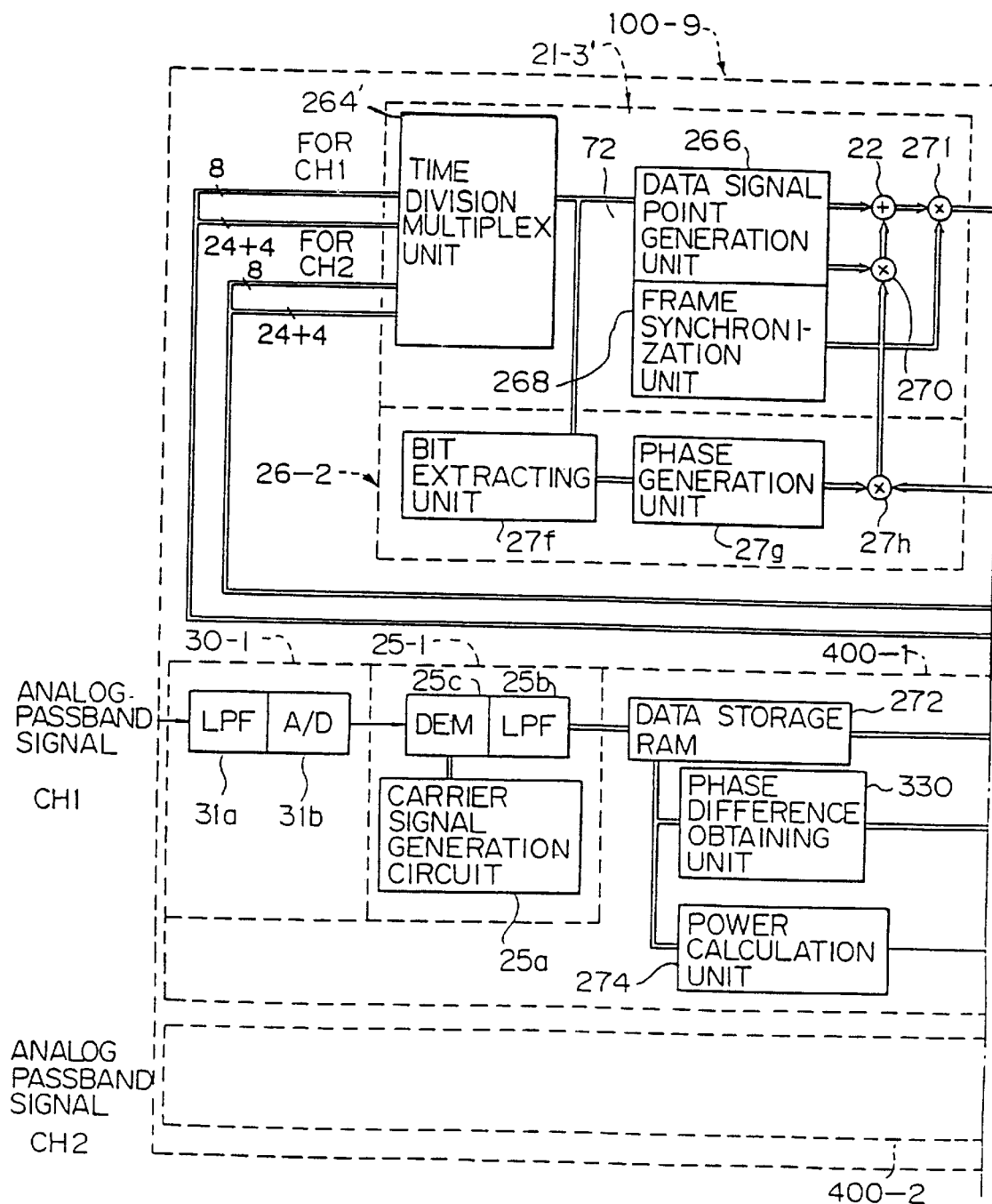
FIGS. 58A–58B show a block diagram illustrating the transmitter of the third embodiment of the present invention.
Figure 58B:
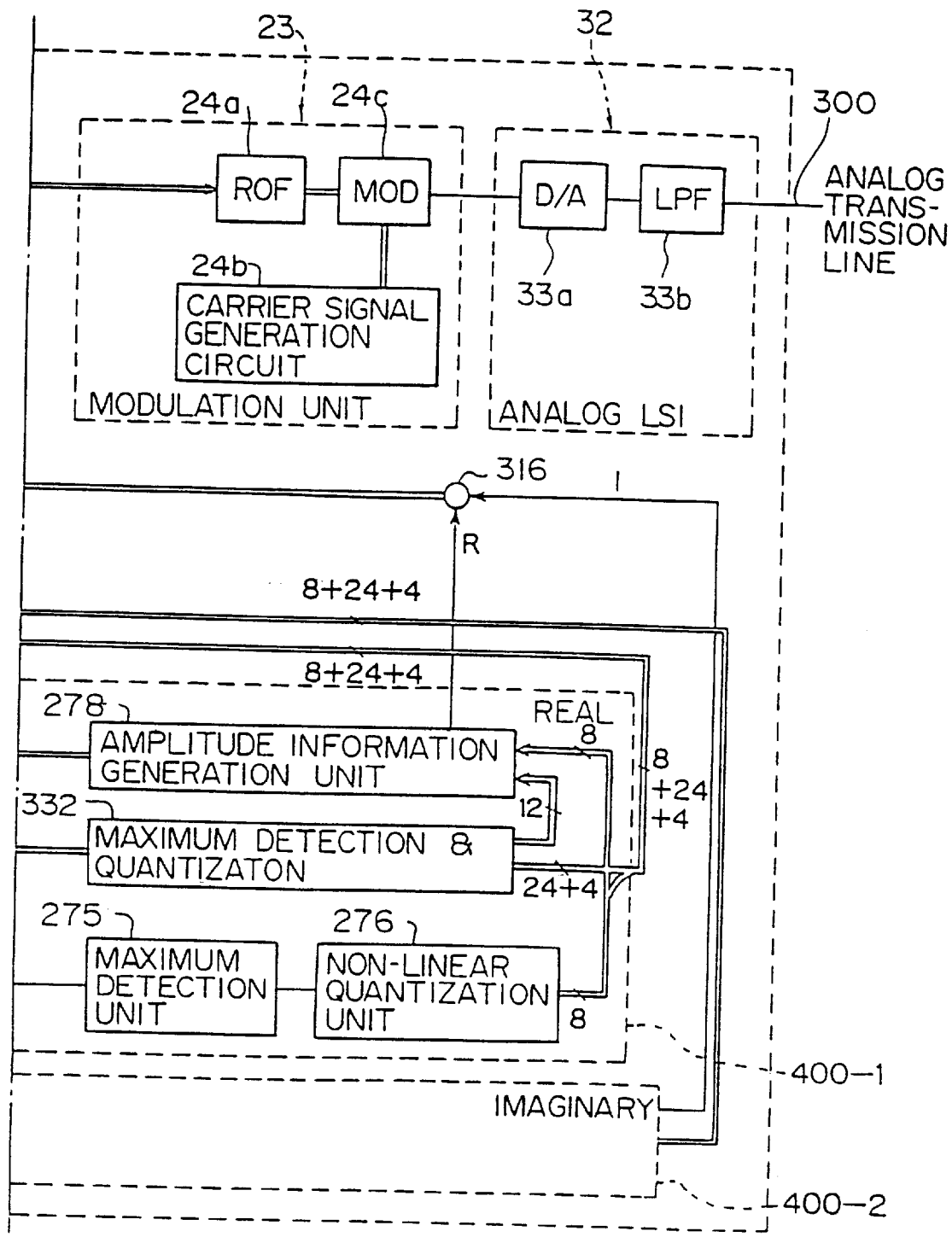

FIGS. 58A–58B show a block diagram illustrating the construction of the transmitter in the third embodiment of the present invention. The construction of FIGS. 58A–58B realizes the transmitter 100-9 in the eighth aspect of the present invention. In this embodiment, the Baud rate is assumed to be 2,880 Baud, twelve symbols (seventy-two bits) are transmitted in each symbol, and the frame frequency is assumed to be 240 Hz. In FIGS. 58A–58B, reference numeral 21-3' denotes a superimposed signal generation unit, 264 denotes a time division multiplex unit, 266 denotes a data signal point generation unit, 268 denotes a frame synchronization unit, 22 denotes a signal adder unit, 270 and 271 each denote a multiplier, 26-2 denotes a random transformation unit, 27f denotes a bit extracting unit, 27g denotes a phase generation unit, 27h denotes a multiplier, 23 denotes a modulation unit, 25-1 and 25-2 each denote a base band transformation unit, 30-1, 30-2, and 32 each denote an analog large scale integrated circuit (LSI) 316 denotes a vector signal generation circuit, 400-1 and 400-2 each denote a signal information division unit. The constructions and operations of the modulation unit 23 and the analog large scale integrated circuit 32 are the same as the corresponding elements in the construction of FIGS. 18 10 and 39.

As indicated in FIGS. 58A–58B, the analog large scale integrated circuits 30-1, the random transformation units 25-1 an(d 25-2, and the signal information division units 400-1 and 400-2 are provided for the first and second channels, respectively. The analog voice or facsimile passband signals for the first and second channels are received at the analog large scale integrated circuits 30-1 and 30-2, respectively. The analog large scale integrated circuits 30-1 and 30-2, and the base band transformation units 25-1 and 25-2 have the same constructions and operate in the same manner as the corresponding elements in the construction of FIG. 39. Thus, the analog voice or facsimile passband signal for each channel is transformed to the base band signals through the analog large scale integrated circuit 30-1 or 30-2 and the base band transformation unit 25-1 or 25-2 for the channel, to bed supplied to the signal synthesis unit 400-1 or 400-2 for the channel.

SIGNAL SYNTHESIS UNIT (FIGS. 57–63)

The signal synthesis unit 400-i (i=1 or 2) for each channel (CH-1) comprises a data storage RAM 272, an amplitude information generation unit 278, a phase difference obtaining unit 330, a maximum detection and quantization unit 332, a power calculation unit 274, a maximum detection unit 275, and a non-linear quantization unit 276.

Digital vector data represented by the vector base band signal from the base band transformation unit 25-i is stored in the data storage RAM 272 for respective symbols. Then, the vector digital data is read from the data storage RAM 272 to be supplied the power calculation unit 274 and the phase difference obtaining unit 330. The non-linear quantized value representing the maximum amplitude value of the bases band signal corresponding to the analog voice or facsimile passband signal for each frame is obtained through the power calculation unit 274, the maximum detection unit 275, anal the non-linear quantization unit 276, in the same manner js in the signal synthesis unit 250' in FIG. 39. The non-linear quantized value representing the maximum amplitude value of the base band signal corresponding to the analog voice or facsimile passband signal for each frame, is supplied to the time division multiplex unit 264' and the amplitude information generation unit 278.

Figure 59:
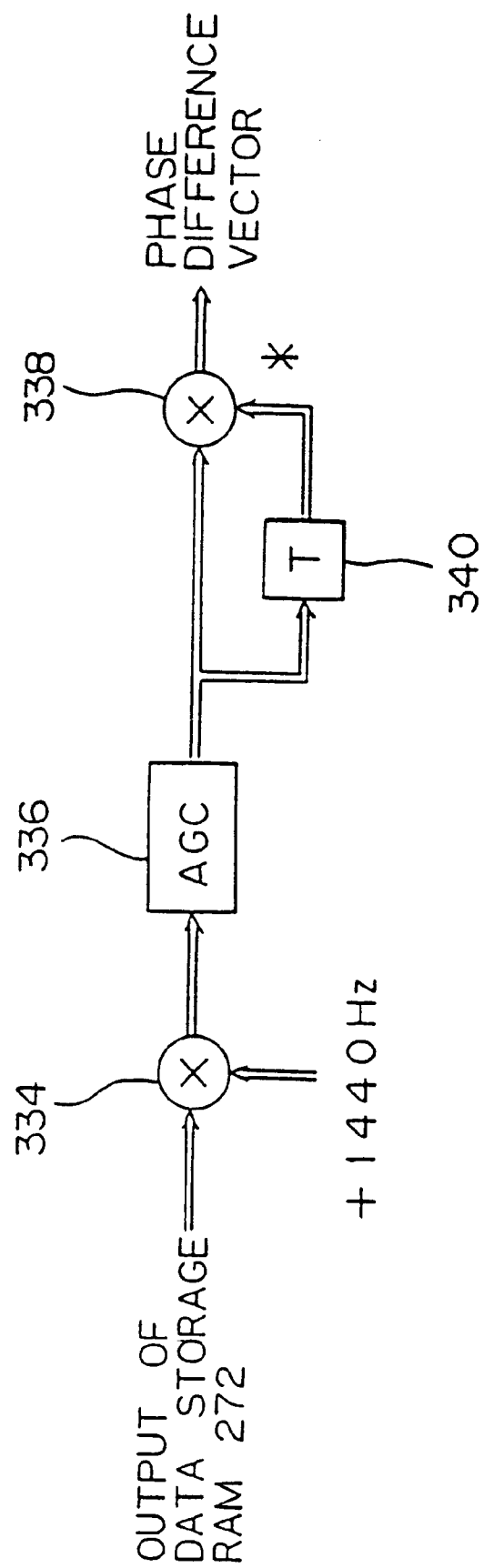
FIG. 59 is a block diagram illustrating an embodiment of the phase difference obtaining unit of the transmitter of FIGS. 58A–58B.

FIG. 59 is a block diagram illustrating an embodiment of the phase difference obtaining unit 330 in FIGS. 58A–58B. In FIG. 59, reference numerals 334 and 338 each denote a multiplier, 336 denotes an automatic gain control circuit (AGC), and 340 denotes a one-symbol delay circuit. In the construction of FIG. 59, the multiplier 334 is provided to shift the frequency of the vector base band signal supplied from the data storage RAM 272 by +1,440 Hz. The human sense of heating is more sensitive in the lower frequency band rather than in the higher frequency band. By shifting the frequency band of the base band signal as indicated in FIG. 7 by +1,440 Hz, the information on phase differences in the lower frequency band can be quantized more finely. The frequency-shifted base band signal is then normalized by the automatic gain control circuit 336. The frequency-shifted and normalized base band signal (frequency-shifted base band signal having an frequency equal to one) of the automatic gain control circuit 336 is supplied to the multiplier 338 and the one-symbol delay 340. In the one-symbol delay 340, the frequency-shifted and normalized base band signal is delayed by one-symbol is generated to be supplied to the multiplier 338. Thus, the multiplier 338 receives the frequency-shifted and normalized base band signal from the automatic gain control circuit 336 and the complex conjugate of the frequency-shifted and normalized base band signal of the preceding symbol, and multiplies the frequency-shifted and normalized base band signal from the automatic gain control circuit 336 by the complex conjugate of the frequency-shifted and normalized base band signal of the preceding symbol to obtain a phase difference vector signal (cos 0, sin 0) having a phase 0 equal to a phase difference from the preceding symbol. The phase difference vector signal obtained in the phase difference vector signal obtained in the phase difference obtaining unit 330 is supplied to the maximum detection and quantization unit 332.

Figure 60:
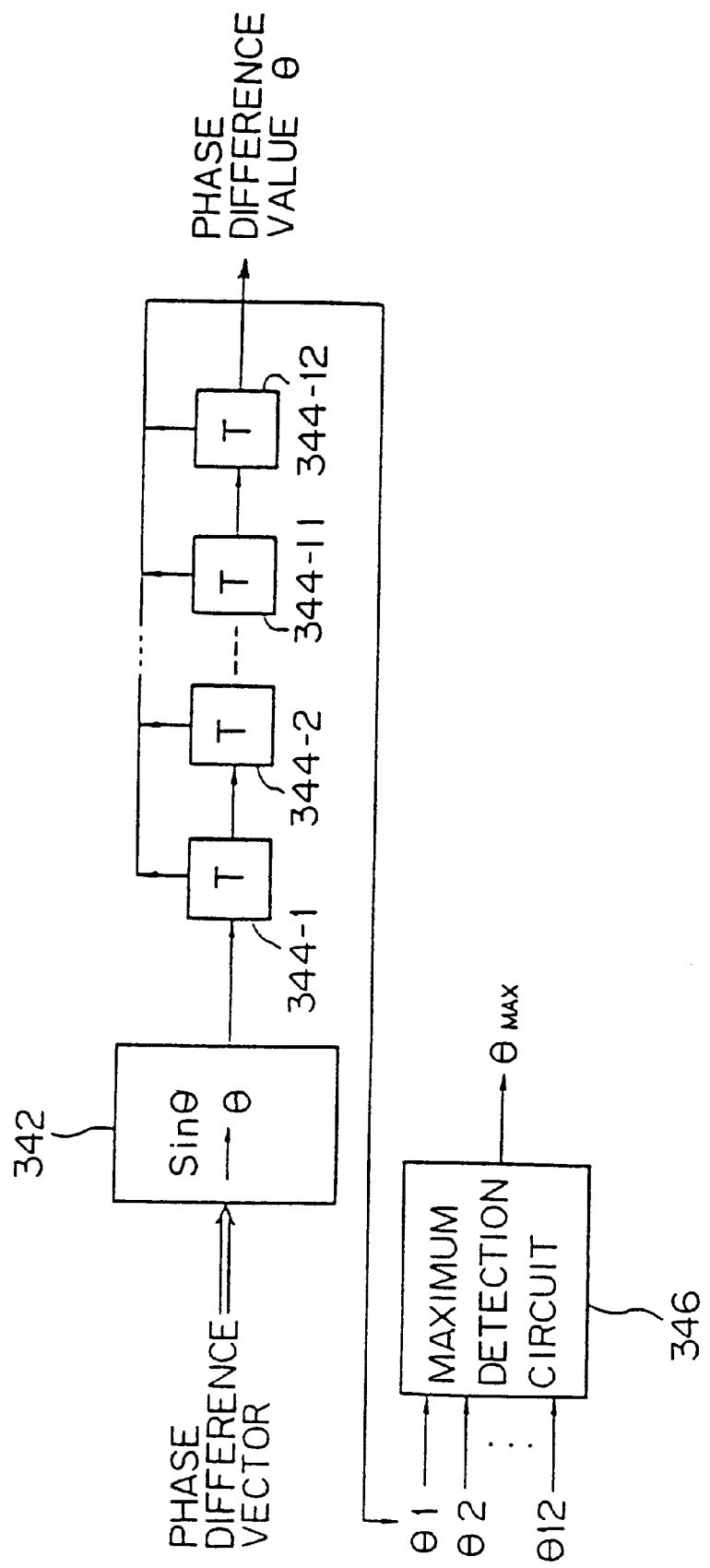
FIG. 60 is a block diagram illustrating an embodiment of a maximum detection portion of the maximum detection and quantization unit of the transmitter of FIGS. 58A–58B.
Figure 62:
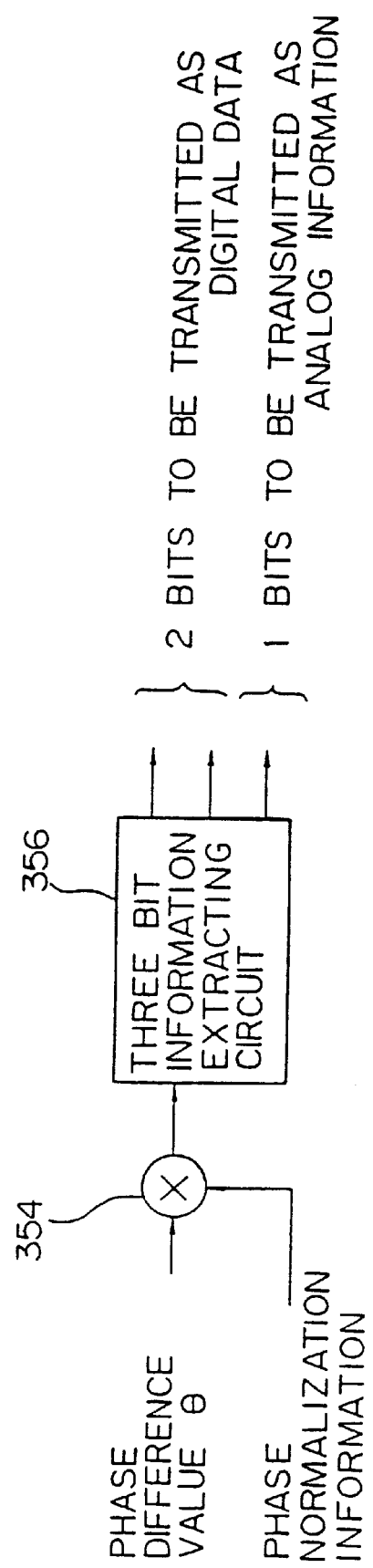
FIG. 62 is a block diagram illustrating an example construction of a final stage of the maximum detection and quantization unit.

FIG. 60 is a block diagram illustrating an exemplified embodiment of a maximum detection portion o the maximum detection and quantization unit 332 in FIGS. 58A–58B. In FIG. 60, reference numeral 342 denotes a phase value conversion circuit, 344-1 to 344-12 each denote a tapped one-symbol delay element, and 346 denotes a maximum detection circuit. The above phase difference vector signal (cos 0, sin 0) is converted to the phase difference value 0. The phase difference value 0 is then shifted through a series of the tapped one-symbol delay elements 344-1 to 344-12, and the outputs (the phase difference values for twelve successive symbols in each frame) of the respective tapped one-symbol delay elements 344-1 to 344-12 are applied to the maximum detection circuit 346 in parallel. The maximum detection circuit 346 has a construction similar to the construction of the maximum value detection circuit 275 in the signal synthesis unit 250' in FIG. 39, and obtains a maximum value Qmax of the phase difference values for twelve successive symbols in each frame. The phase difference value 0 shifted through the series of the tapped one-symbol delay elements 344-1 to 344-12, is supplied to a final stage of the maximum detection and quantization unit 332 as indicated in FIG. 62.

Figure 61:
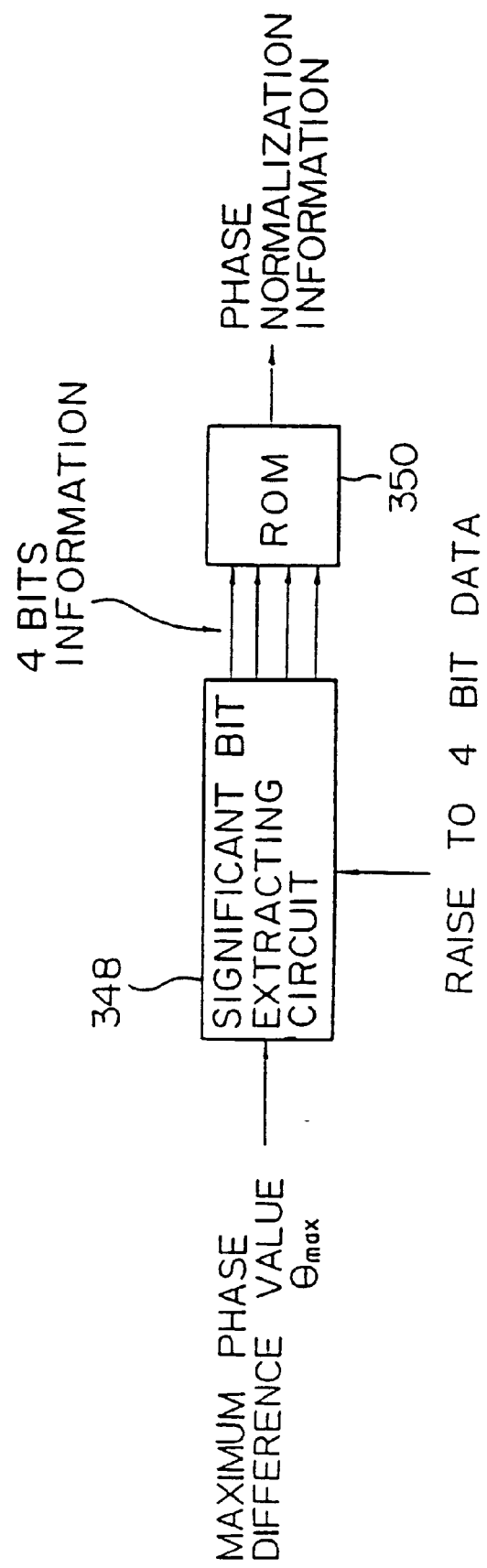
FIG. 61 is a block diagram illustrating an embodiment of a quantization portion of the maximum detection and quantization unit of FIG. 60.

FIG. 61 is a block diagram illustrating an exemplified embodiment of a quantization portion of the maximum detection and quantization unit 332. In FIG. 61, reference numeral 348 denotes a significant bit extracting circuit, and 350 denotes a read-only memory (ROM). A predetermined number (eight in this example) of significant bits of the above maximum value Qmax of the phase difference in each frame, are extracted by the significant bit extracting circuit 348. The above maximum value of the phase difference in each frame is thus quantized in the significant bit extracting circuit 350 to four-bit data. The quantized maximum value of the phase difference for each frame is supplied to the time division multiplex unit 264' in FIGS. 58A–58B. The quantized maximum value of the phase difference for each frame is also applied to the read-only memory (ROM) 350 as an address signal to obtain phase normalization information. The obtained phase normalization information is supplied to a final stage of the maximum detection and quantization unit 332. The relationship between four-bit input and the output of the phase normalization information in the read-only memory (ROM) 350 is indicated in Table 6 below.

TABLE 6

Correspondence between Four-bit Input and Phase Normalization Information

| Four-Bit Input | Maximum Phase Difference | Phase Normalization Information |
| --- | --- | --- |
| 0000 | 0°–22.50 | x 16 |
| 0001 | 22.5°–450 | x 16/2 |
| 0010 | 22.5°–450 | x 16/3 |
| 0011 | 22.5°–450 | x 16/4 |
| . | . | |
| . | . | |
| . | . | |
| 1111 | 22.5°–450 | x 16/16 |

FIG. 62 is a block diagram illustrating an embodiment of a final stage of the maximum detection and quantization unit 332. In FIG. 62, reference numeral 354 denotes a multiplier, and 356 denotes a three-bit information extracting unit. The multiplier 354 receives the above phase difference value 0 for each symbol, shifted through the series of the tapped one-symbol delay elements 344-1 to 344-12, and the phase normalization information, and multiplies the phase difference value 0 for each symbol by the phase normalization information. The multiplied result is supplied to the three-bit information extracting unit 356, which may be realized by a read-only memory (ROM). The three-bit information extracting unit 356 stores phase difference information of three bits, corresponding to various values of the output of the multiplier 354, and outputs phase difference information corresponding to the value of the output of the multiplier 354. The relationship between the input value and the three-bit output of the three-kit information extracting circuit 356 is indicated in Table 7 below.

TABLE 7

Correspondence between Input and Three Bit Output of Three-bit Information Extracting Circuit

| Input | Three Bit Output |
| --- | --- |
| 0° + 22.5° | 000 |
| 45° + 22.5° | 001 |
| 90° + 22.5° | 010 |
| 135° + 22.5° | 011 |
| 180° + 22.5° | 100 |
| 225° + 22.5° | 101 |
| 270° + 22.5° | 110 |
| 315° + 22.5° | 111 |

The least significant bit (LSB) of the three bits output from the three-bit information extracting unit 356 is supplied to the amplitude information generation unit 278, and the other two bits of the three bits are supplied to the time division multiplex unit 264' to be transmitted as digital data.

Figure 63:
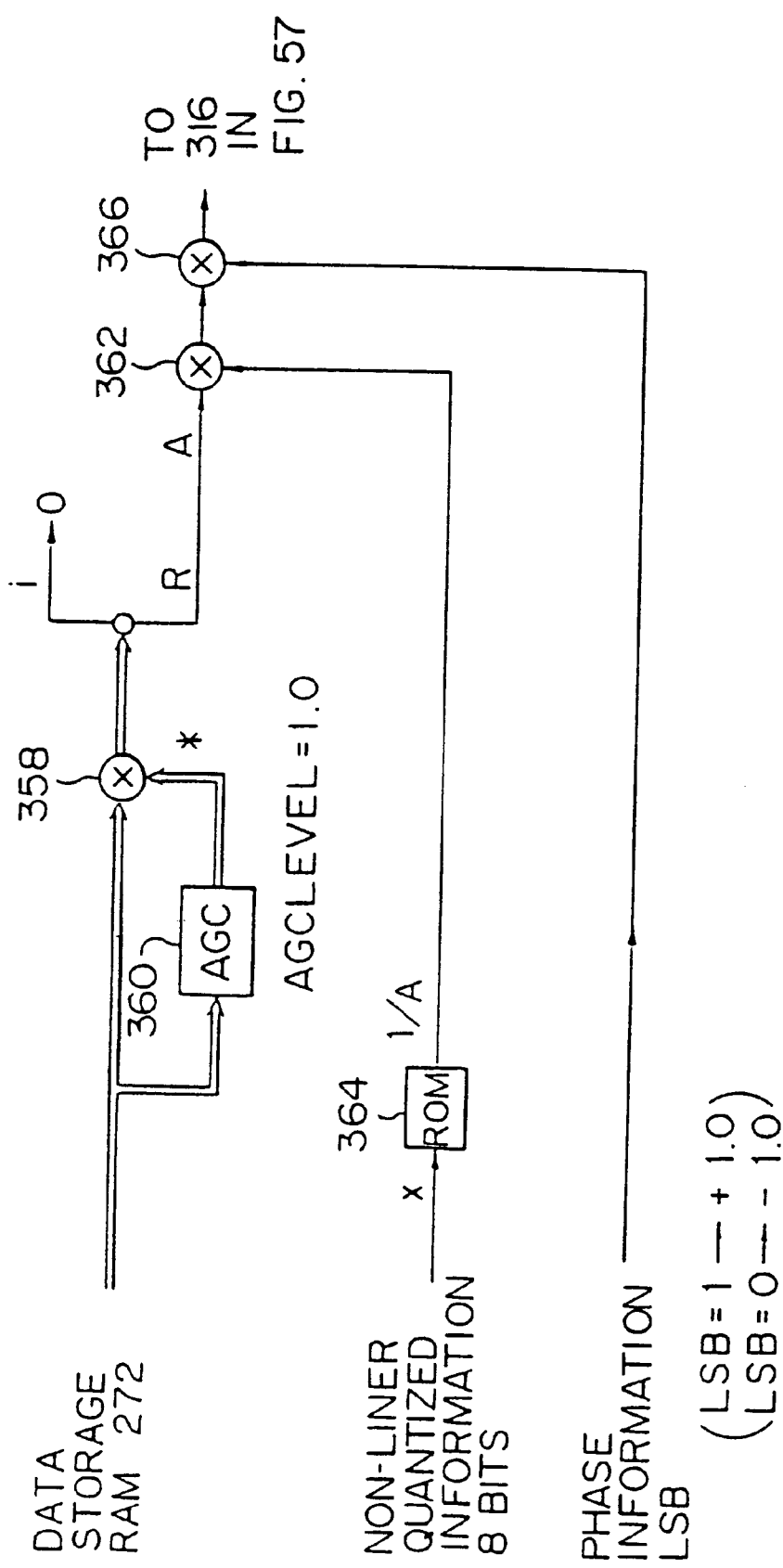
FIG. 63 is a block diagram illustrating an embodiment of an amplitude information generation unit of the transmitter of FIGS. 58A–58B.

FIG. 63 is a diagram illustrating an example construction of the amplitude information generation unit 278 for the first channel (CH1). In FIG. 63, reference numeral 358, 362, and 366 each denote a multiplier, 360 denotes an automatic gain control circuit (AGC), and 364 denotes a divider. The vector digital data read from the data storage RAM 272 is supplied to the multiplier 358 and the automatic gain control circuit 360 for each symbol. In the automatic gain control circuit 360, a normalized complex conjugate vector of the vector data is generated for each symbol to be supplied to the multiplier 358. In the multiplier 358, the above vector data and the normalized complex conjugate vector data thereof are multiplied for each symbol to generate a vector signal comprised of a real component (denoted by R) equal to the amplitude (norm) of the vector data represented by the vector base band signal, and an imaginary component (denoted by I) equal to the zero. Thus, the amplitudes P1 to P12 of the twelve symbols in each frame are obtained as the successive real component outputs of the multiplier 358. The non-linear quantized information, representing the maximum amplitude in each frame and output from the non-linear quantization unit 276, is supplied to the divider 364, and an inverse value of the non-linear quantized information is generated and output to the multiplier 362. In the multiplier 362, the amplitudes P1 to P12 of the twelve symbols in each frame are respectively multiplied by the non-linear quantized information. Then, the output of the multiplier 362 is multiplied by the least significant bit (LSB) of the three bits output from the three-bit information extracting unit 356 of FIG. 62, where (although not shown) the value of the least significant bit (LSB) is changed to −1 before being multiplied in the multiplier 366 when the least significant bit (LSB) output from the three-bit information extracting unit 356 of FIG. 62 is equal to zero. Thus, normalized information on the amplitudes of the twelve symbols in each frame, with a polarity corresponding to the least significant bit (LSB) of the phase difference information of the respective symbols, are obtained as an output of the multiplier 366. The output of the multiplier 366 is supplied to the vector signal generation circuit 316 in FIG. 58 as a real part R of a vector signal generated in the vector signal generation circuit 316.

Similarly, the amplitude information generation unit 278 in the signal synthesis unit 400-2 for the second channel (CH2) generated normalized information on the amplitudes of the twelve symbols in each frame, with a plurality corresponding to the least significant bit (LSB) of the phase difference information of the respective symboled as an imaginary part I of a vector signal generated in the vector signal generation circuit 316. The vector signal generation circuit 316 generates the vector signal, and supplies the same to the multiplier 27h in the random transformation unit 26-2 to be randomly transformed therein.

TIME DIVISION MULTIPLEX UNIT (FIG. 64)

Figure 64:
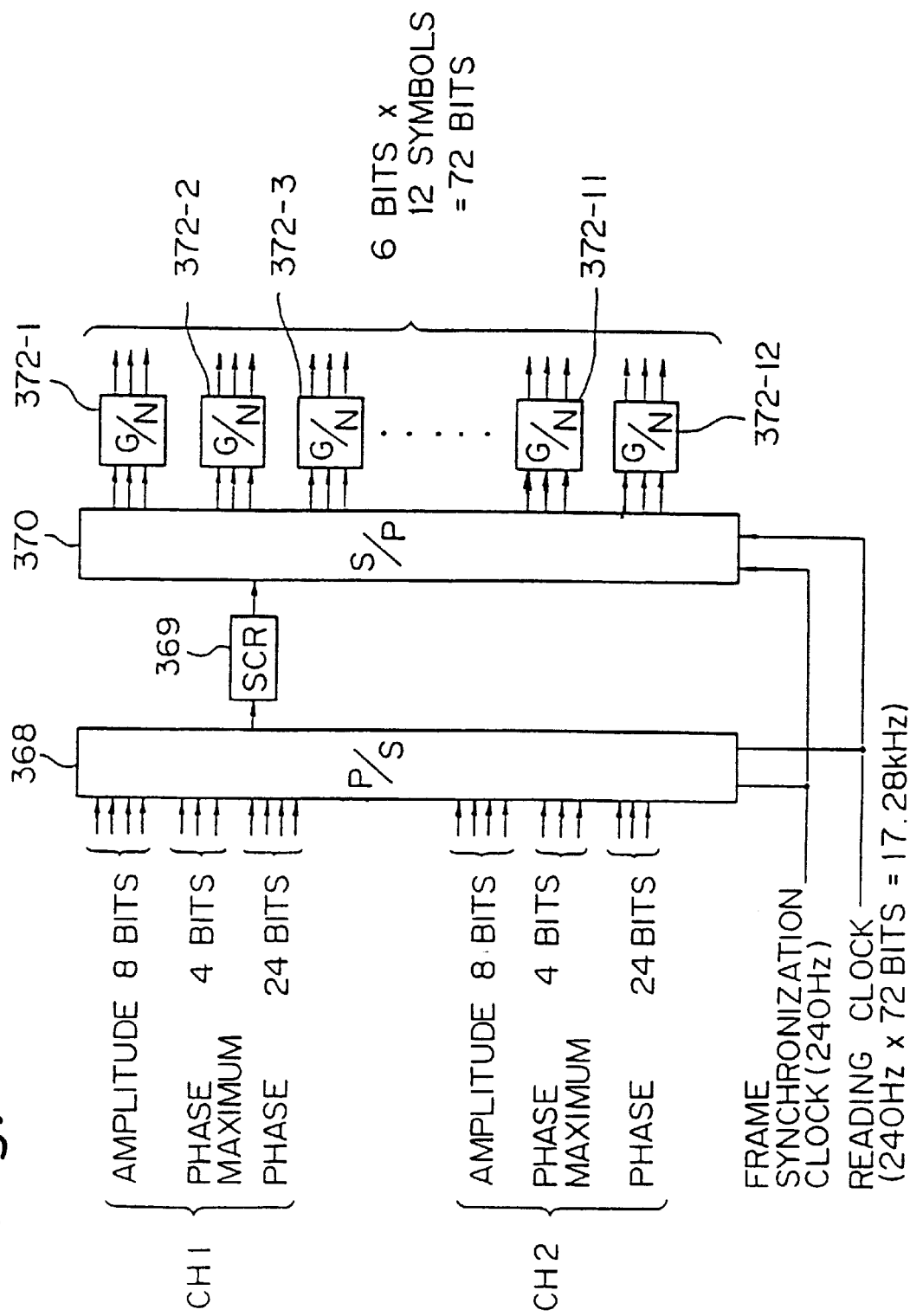
FIG. 64 is a block diagram illustrating an embodiment of a time division multiplex unit of the transmitter of FIGS. 58A–58B.
Figure 65:
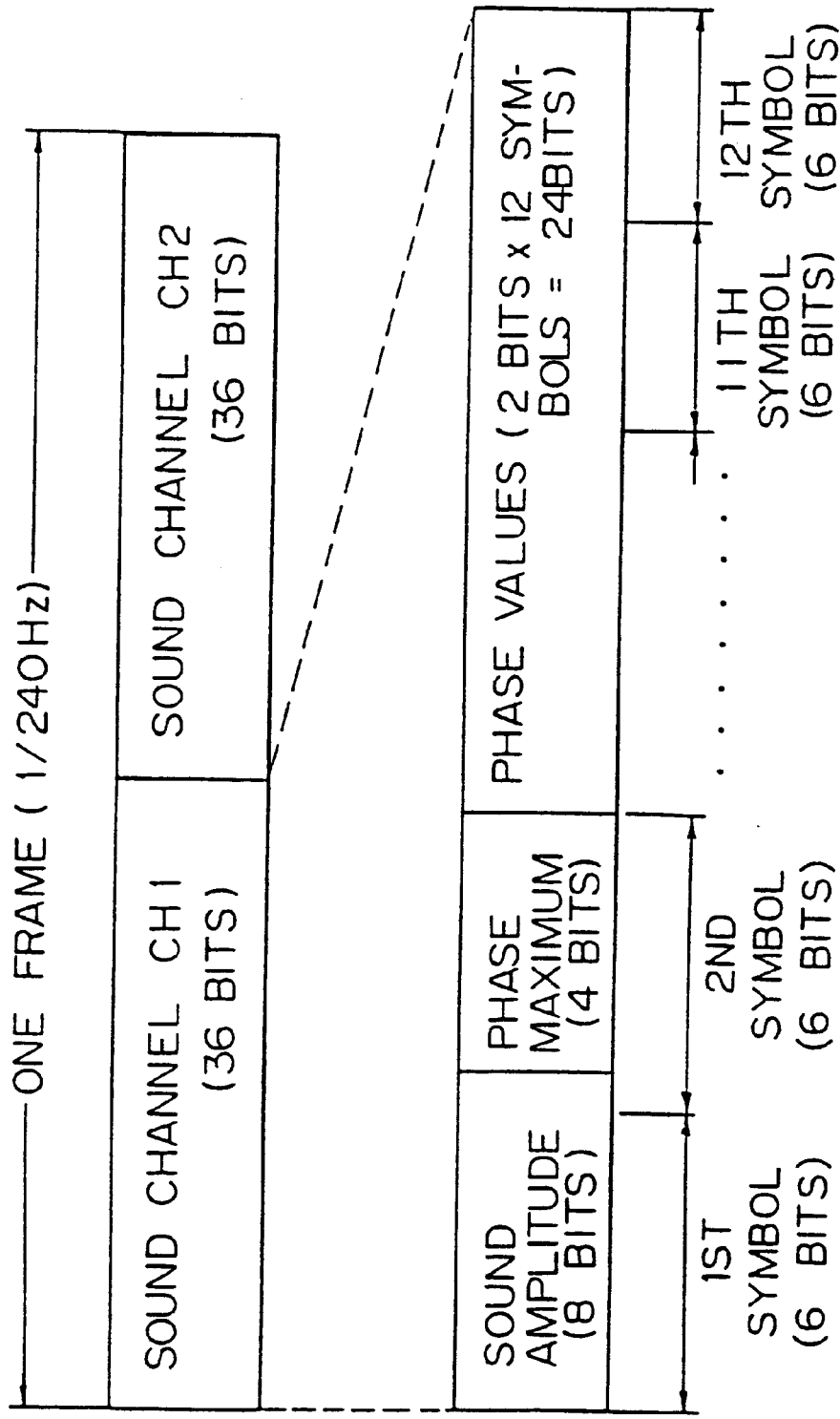
FIG. 65 is a diagram illustrating a frame format generated in the time division multiplex unit of FIG. 64.

FIG. 64 is a block diagram illustrating an embodiment of the lime division multiplex unit 264' in FIG. 58. In FIG. 64 reference numeral 368 denotes a parallel to serial conversion circuit, 369 denotes a scrambler, 370 denotes a serial to parallel conversion circuit, 372-1 to 372-12 each denote a Gray/natural conversion circuit. As indicated in FIG. 64, the parallel to serial conversion circuit 368 receives in parallel the non-linear quantized information (8 bits) from the non-linear quantization unit 276, the quantized maximum value of the phase difference for each frame (4 bits) from the quantization portion of the maximum detection and quantization unit 332 (FIG. 61), and the two bit outputs for twelve symbols (24 bits=two bits×12 symbols) from the three-bit information extracting unit 356 (FIG. 62), for each channel, synchronizing with the frame synchronization clock (240 Hz), and serially output the respective bits synchronizing with the reading clock (240 Hz×72 bits=17.28 kHz) to supply the same to the scrambler 369. FIG. 65 is a diagram illustrating a frame format generated in the time division multiplex unit 264'. The bits serially output from the parallel to serial conversion circuit 368 is scrambled in the scrambler 369, and the respective bits scrambled and output from the scrambler 369 is serially input into the serial to parallel conversion circuit 370 synchronizing with the reading clock (240 Hz×72 bits=17.28 kHz), and the 72 bits in each frame are output in parallel synchronizing with the frame synchronization clock (240 Hz). Each six bits in the parallel 72 bit output of the serial to parallel conversion circuit 370 are transformed from the Gray code to the natural code in the respective Gray/natural conversion circuits 372-1 to 372-12.

RANDOM TRANSFORMATION UNIT (FIGS. 58A–58B)

The random transformation unit 26-2 in FIGS. 58A–58B operates in a manner similar to the random transformation unit 26-1 in FIG. 39. Namely, the bit extracting unit 27*d* extracts three bits for each symbol as indicated in FIG. 52, and that phase generation unit 27*g* generates a random phase vector signal similar to the vector signal generated by the phase generation unit 27*e* in FIG. 39, to supply the random phase vector signal to the multiplier 27*h* in the random transformation unit 26-2. Thus, the vector signal supplied from the vector signal generation circuit 316 is randomly transformed in the multiplier 27*h*, multiplied by the random phase vector signal, and the randomly transformed vector signal is supplied to the multiplier 270. The operation thereafter is the same as the operation in the construction of FIGS. 39A–39B.

RECEIVER OF THE THIRD EMBODIMENT (FIGS. 66A–66B)

Figure 66A:
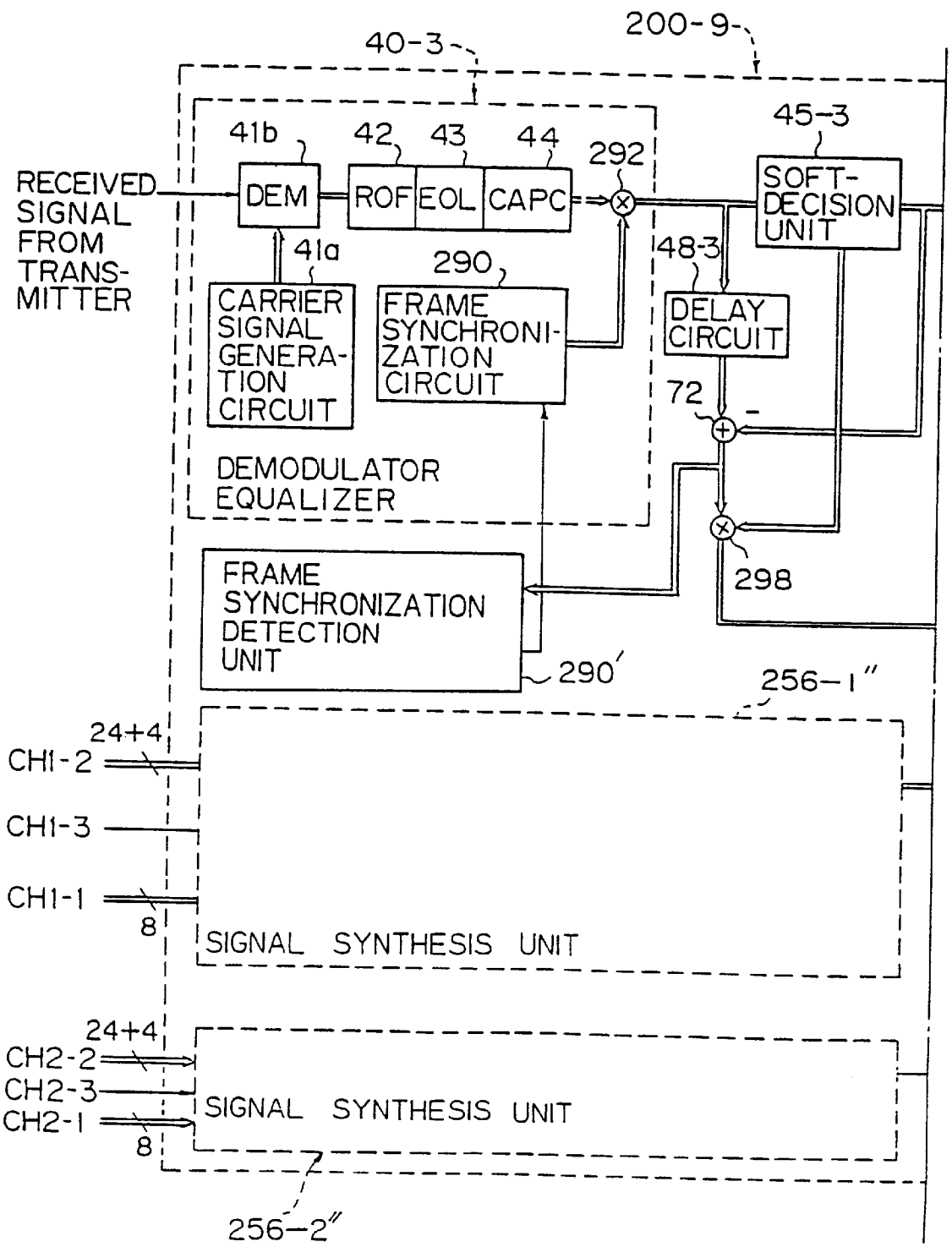
FIGS. 66A–66B show a block diagram illustrating an embodiment of the receiver in the third embodiment of the present Invention.
Figure 66B:
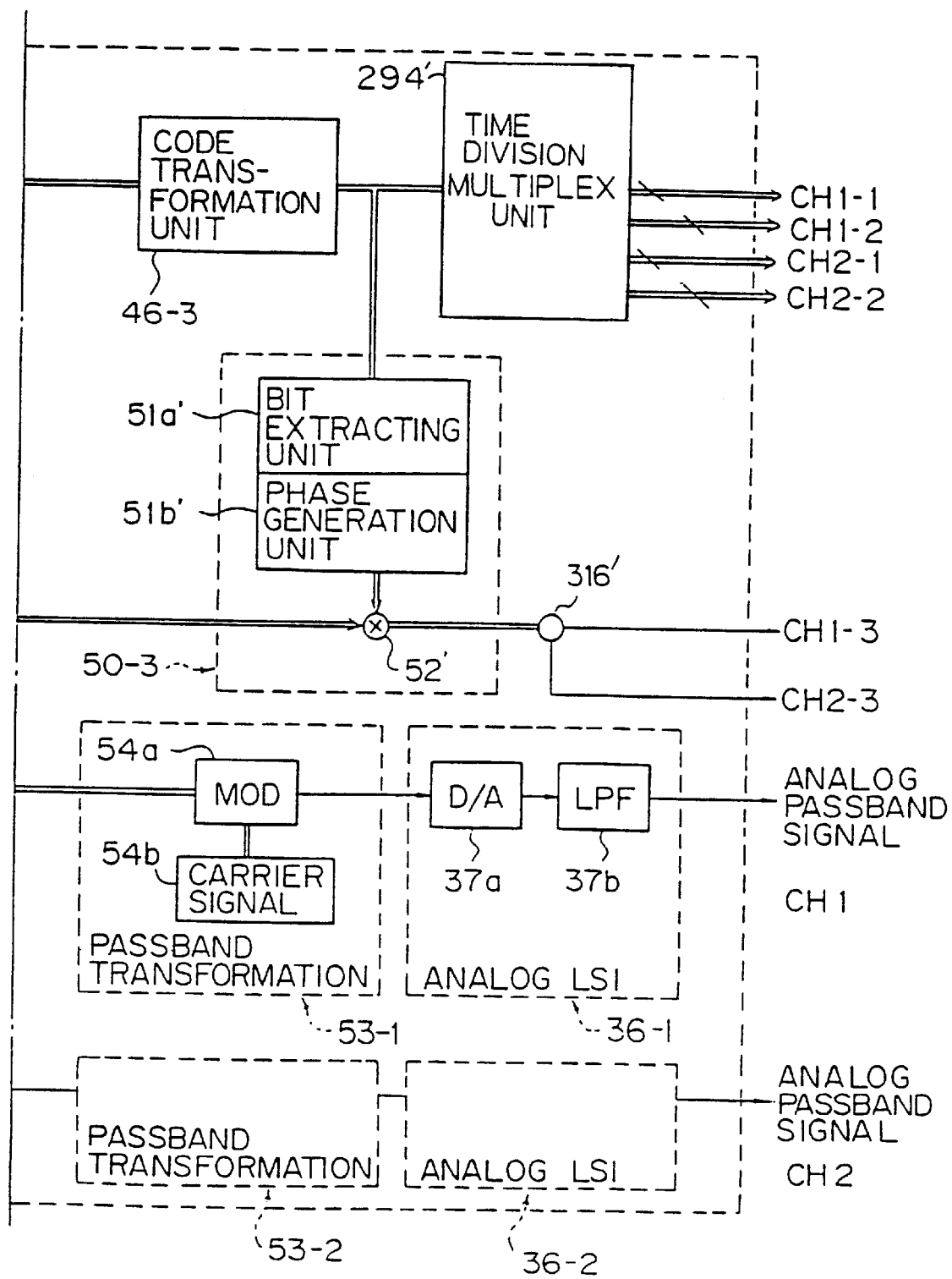

FIGS. 66A–66B show a block diagram illustrating the embodiment of the receiver in the third embodiment of the system of the present invention. The construction of FIGS. 66A–66B realizes the receiver 200-9 in the eighth aspect of the present invention. In this embodiment, data transmission rate is assumed to be 9,600 bps, and the Baud rate is assumed to be 2,880 Baud. In FIG. 66, reference numeral 40-3 denotes a demodulator/equalizer unit, 45-3 denotes a soft-decision unit, 48-3 denotes a delay circuit, 72 denotes a signal subtracter, 298 denotes a multiplier, 46-3 denotes a code transformation unit, 290' denotes a frame synchronization detection circuit, 294' denotes a time division demultiplex unit, 50-3 denotes an inverse random transformation unit, 316' denotes a signal separation circuit, 256-1" and 256-2" each denote a signal synthesis unit, 53-1 and 53-2 each denote a passband transformation unit, and 36-1 and 36-2 each denote an analog large scale integrated circuit.

The portion of the construction comprised of the demodulator/equalizer unit 40-3, the soft-decision unit 45-3, the delay circuit 48-2, the vector signal subtracter unit 72, the multiplier 298, the code transformation unit 46-3, the inverse random transformation unit 50-3, and the time division demultiplex unit 294' is basically the same as corresponding portion in the construction of FIG. 55, except that the time division demultiplex unit 294' outputs the 72 bits which are the same as the 72 input bits into the time division multiplex unit of FIG. 64, and that the multiplier 298 regenerates the randomly transformed vector signal which are the same as the output of the multiplier 27*h* in the construction of FIG. 58.

The vector signal which is the same as the vector signal output from the vector signal generation circuit 316 in the transmitter 100-9' of FIG. 55, is generated in the multiplier 52' in the inverse random transformation unit 50-3, to be supplied to the signal separation circuit 316'. The signal separation circuit 316' receives the vector signal from the multiplier 52' and separates the real and imaginary parts of the vector signal to supply the respective parts to the signal synthesis unit 256-1" for the first channel and to the signal synthesis unit 256-2" for the second channel, as indicated in FIG. 66 by CH1-3 and CH2-3, respectively.

The non-linear quantized information (8 bits), the quantized maximum value of the phase difference for each frame (4 bits), and the two bit outputs for twelve symbols (24 bits=two bits×12 symbols), for each channel, are supplied to the signal synthesis unit 256-1" or 256-2" for the channel. In FIG. 66, the above 8 bits are indicated by CHi-1, and the above 24 +4 bits are indicated by CHi-2, where i=1 or 2.

SIGNAL SYNTHESIS UNIT (FIG. 67)

Figure 67:
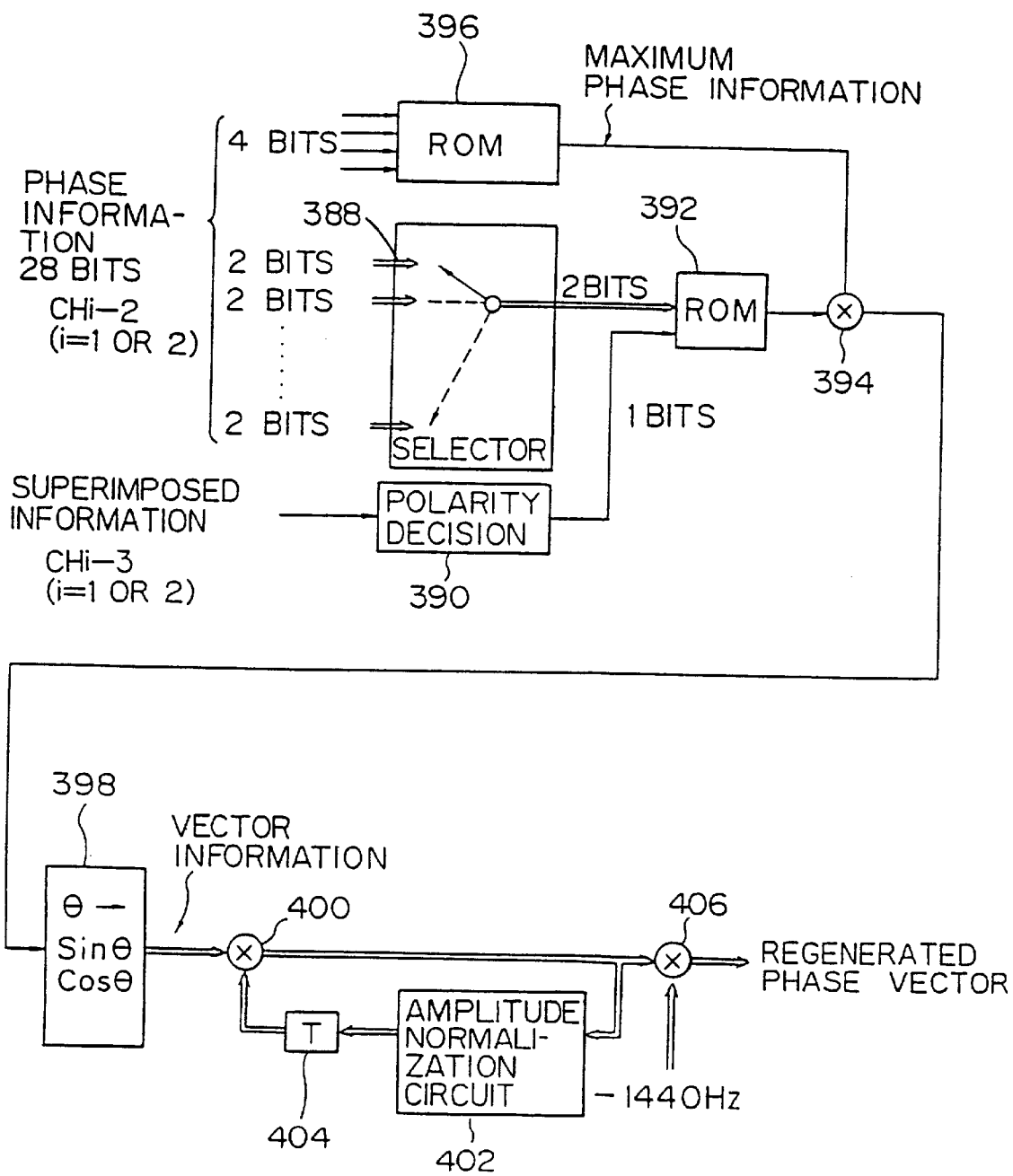
FIG. 67 is a block diagram illustrating a signal synthesis unit for regenerating the phase vector signal of the receiver of FIGS. 66A–66B.

FIG. 67 is a block diagram illustrating the construction for regenerating the phase vector signal in the signal synthesis unit 256-i" (i=1 or 2). In FIG. 67, reference numeral 392 and 396 each denote a read-only memory (ROM), 388 denotes a two-bit selector, 390 denotes a polarity decision circuit, 394, 400, and 406 each denote a multiplier, 398 denotes a vector signal generation circuit, 402 denotes an amplitude normalization circuit, and 404 denotes a one symbol delay element. The above 24 bits in the 24=4 bits (CHi-2, i=1 or 2) from the time division demultiplex unit 294, are applied to the two-bit selector 388, the signal CHi-3 (i=1 or 2) from the signal separation circuit 316' is supplied to the polarity decision circuit 390, and the 4 bits in the 24=4 bits (CHi-2, i=1 or 2) from the time division demultiplex unit 294, is applied to the read-only memory (ROM) 396 in the signal synthesis unit 256-i" (i=1 or 2).

The above 4 bits in CHi-2 are equal to the output of the significant bit extracting circuit 348 in FIG. 61, and the read-only memory (ROM) 396 regenerates the maximum value Qmax of the phase difference values θ in each frame based on the 4 bits input thereto. The two-bit selector 388 selects two bits corresponding to each symbol among the 24 bits, and supplies the selected two bits to the read-only memory (ROM) 392. At the same time, the polarity decision circuit 390 determines the polarity of the signal CHi-3 (superimposed information) input thereto for each symbol, and outputs +1 when the polarity is positive, and 0 when the polarity is negative. The output of the polarity decision circuit 390 is supplied to the read-only memory (ROM) 392 for the same symbol as the output of the two-bit selector 388, and the read-only memory (ROM) 392 regenerates a value which is the same ash the input of the three-bit information extracting circuit 356 in FIG. 62, based on the three bits as a total from the two-bit selector 388 and the polarity decision circuit 390. The read-only memory (ROM) 396 generates maximum phase information which corresponds to an inverse value of the phase normalization value supplied to the multiplier 354 in FIG. 62 as indicated in Table 8 below, based on the 4 bits input thereto. The output of the read-only memory (ROM) 392 is multiplied by the maximum phase information to regenerate the phase difference value θ which is the same as the output of the phase difference value conversion circuit in FIG. 60. The phase difference value θ is converted to a phase difference vector having vector components (cos θ, sin θ) in the vector signal generation circuit 398. The phase difference vector is supplied to a phase accumulation circuit comprised of the multiplier 400, the amplitude normalization circuit 402, and the one-symbol delay circuit 404. The output of the vector signal generation circuit 398 is applied to the multiplier 400. The amplitude normalization circuit 402 normalizes an output of the multiplier 400, and outputs the normalized vector to the one-symbol delay circuit 404. The output of the one-symbol delay circuit 404 is applied to the multiplier 400. Thus, the vector signal which is the same as the output of the automatic gain control circuit 336 in FIG. 59, is regenerated in the phase accumulation circuit. The regenerated vector signal is applied to the multiplier 406. In the multiplier 406, the frequency of the vector signal is shifted by −1,440 Hz for compensating the frequency shift in than multiplier 334 in FIG. 59. Thus, the vector signal having the phase of the base band signal corresponding to the analog voice or facsimile passband signal is regenerated for each symbol.

TABLE 8

Correspondence between Four-bit Input and Maximum Phase Information

| Four-Bit Input | Maximum Phase Difference | Maximum Phase Information |
|---|---|---|
| 0000 | 0°–22.5° | x 1/16 |
| 0001 | 22.5°–45° | x 2/16 |
| 0010 | 22.5°–45° | x 3/16 |
| 0011 | 22.5°–45° | x 4/16 |
| . | . | |
| . | . | |
| . | . | |
| 1111 | 22.5°–45° | x 16/16 |

Figure 68:
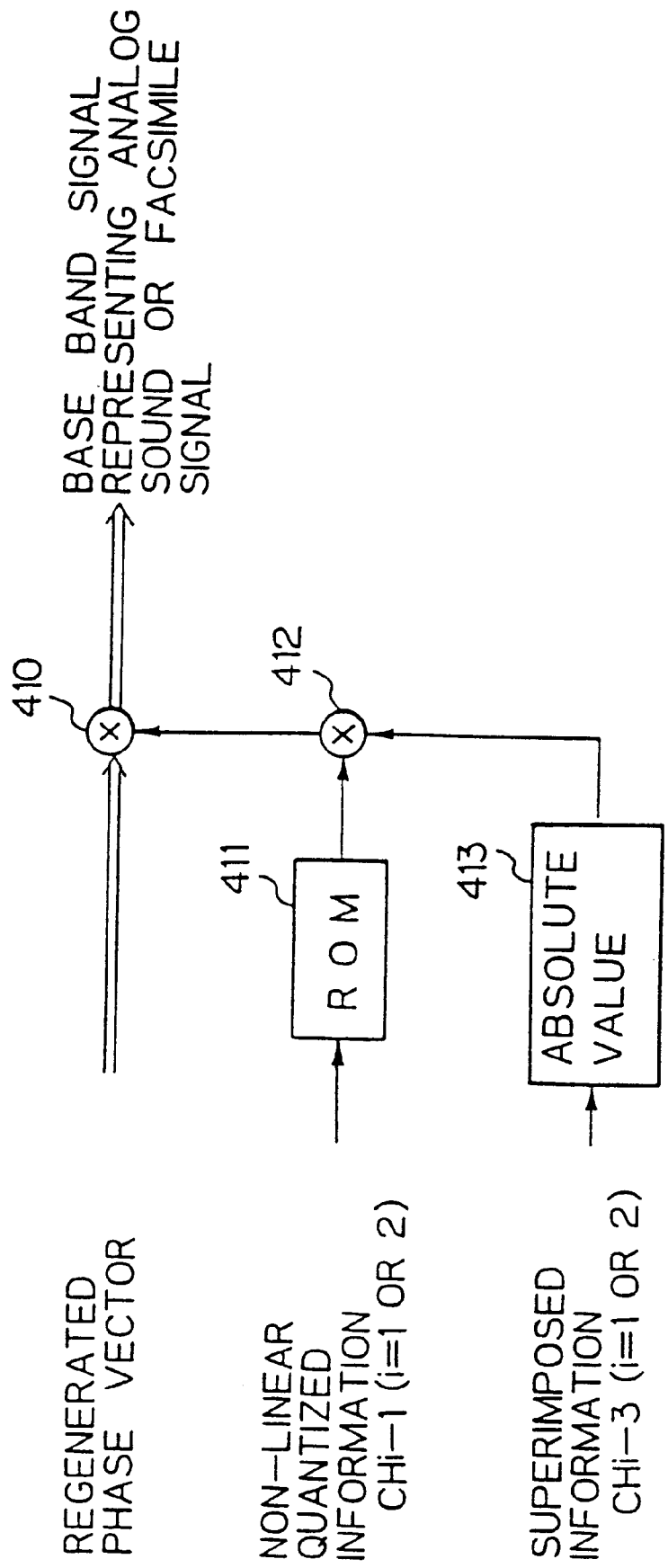
FIG. 68 is a block diagram illustrating a unit for regenerating the base band signal corresponding to the analog voice or facsimile passband signal in the signal synthesis unit of FIG. 67.

FIG. 68 is a block diagram illustrating the construction for regenerating the base band signal corresponding to the analog voice or facsimile passband signal in the signal synthesis unit 256-i" (i=1 or 2). In FIG. 68, reference numerals 410 and 412 each denote a multiplier, 411 denotes a read-only memory (ROM), and 413 denotes an absolute value obtaining circuit. The above non-linear quantized information CHi-1 (i=1 or 2) from the time division demultiplex unit 294' in FIGS. 66A–66B, is applied to the read-only memory (ROM) 411, and the maximum amplitude of the base band signal corresponding to the analog voice or facsimile passband signal in each frame, which is the same as the output of the maximum detection unit 275, is output from the read-only memory (ROM) 411. The signal (superimposed information) CHi-3 (i=1 or 2) from the signal separation circuit 316' is supplied to the absolute value obtaining circuit 413 to regenerate the normalized amplitudes P1 to P12 of the base band signal corresponding to the analog voice or facsimile passband signal, which are the same as the outputs of the multiplier 282 in FIG. 40, in the twelve symbols in each frame. The output of the absolute value obtaining circuit 413 is multiplied by the output of the read-only memory (ROM) 411 to regenerate the amplitudes of the base band signal corresponding to the analog voice or facsimile passband signal. Then, the regenerated amplitudes in each frame are multiplied by the regenerated phase vectors from the construction of FIG. 67, symbol by symbol, to regenerate the base band signal corresponding to the analog voice or facsimile passband signal. The regenerated base band signal is supplied to the passband transformation unit 53-i (i=1 or 2) to regenerate the passband signal, and the analog voice or facsimile passband signal is regenerated through the analog large scale integrated circuit 36-i (i=1 or 2).

FREQUENCY BAND FOR TRANSMISSION

The frequency band for the G3 facsimile is given in the CCITT recommendations V.29 and V33 (and V.17). The CCITT recommendations V.29 recommends 320 Hz to 3,080 Hz with a carrier signal of 1,700 Hz and 2,400 Baud, and the CCITT recommendation V.33 recommends 420 Hz to 3,180 Hz with a carrier signal of 1,800 Hz and 2,400 Baud. Therefore, at least a transmission band from 320 Hz to 3,180 Hz (2,860) Baud) is necessary to transmit signals of the facsimile signals of either of the recommendations V.29 or V33. Since the minimum transmission rate for transmitting data signals is 2,400 bps, it is desirable that the Baud rate used the multiplex transmissions system according to the present invention has a common divisor with 2,400 Hz, and is greater than the above Baud rate 2,860 Baud. Thus, the Baud rate of 2,880 Baud is used in the embodiments of the present invention. Further, 40 Baud (1/72 of 2,880 Baud) is used for the secondary channel.

Further the amplitudes of voice signals can be deemed as stationary for 10 milliseconds. In the embodiments of the present invention the frame rate of 240 Hz is used and the maximum amplitude in each frame is transmitted.

BIT ASSIGNMENT

In the above explanations of the second and third embodiments, the transmission rate of the digital signal is assumed as 9,600 bps. In the case the transmission rate of the digital signal is 4,800 bps, 10 bits/480 HZ for the data signal and 8 bits/480 Hz for the maximum amplitude of the analog voice or facsimile passband signal are assigned, 3 bits per-symbol are transmitted as a digital signal for transmitting information for the data signal and the maximum amplitude, and the remaining information in the analog voice or facsimile passband signal is transmitted superimposed on the digital signal. In the case the transmission rate of the digital signal is 2,400 bps, 5 bits/480 Hz for the data signal and 7 bits/480 Hz for the maximum amplitude of the analog voice or facsimile passband signal are assigned, 2 bits per symbol are transmitted as digital a digital signal for transmitting information for the data signal and the maximum amplitude, and the remaining information in the analog voice or facsimile passband signal is transmitted superimposed on the digital signal.

MODULATION MODE

In the multiplex transmission system according to the present invention, any modulation modes such as the phase shift keying (PSK), quadrature amplitude modulation (QAM) and Trellis-coded modulation (TCM) can be applied, since the characteristic feature of the present invention does not reside in the modulation mode.

What is claimed is:

1. A signal processing unit for use in a receiver, comprising:

a decision means for receiving a signal through a transmission line, and determining which one of the plurality of predetermined data signal points in the vector signal space the received signal corresponds to;

a signal subtracter receiving the received signal and an output of said decision means, and subtracting said output of the decision means from said received signal; and an inverse random transformation unit for inversely shifting the phase of an output of said substractor, which is randomly shifted, in relation to said output of the decision means.

2. A signal processing unit according to claim 1, wherein:

said inverse random transformation unit comprises a bit extracting means for extracting a block of bits from the output of the decision means, and a phase generation means for determining a phase shift value according to the values of the block of bits supplied from the bit extracting means;

said inverse random transformation unit shifts the phase of the output of the subtracter according to the phase shift value.

3. A signal processing unit for use in a receiver, comprising:

a decision means for receiving a signal through a transmission line, and determining which one of the plurality of predetermined data signal points in the vector signal space the received signal corresponds to;

a delay means for delaying the received signal, for delaying the received signal to compensate for a delay caused by the decision means; and a subtracter means for receiving the output signal from said decision means and the delayed signal, and subtracting the output signal from said decision means from said delayed signal.

4. A signal processing unit according to claim 3, wherein:

said decision means is a soft decision unit.

5. A signal processing unit for use in a transmitter, comprising:

a data signal point generation means for receiving digital data signal, and generating a data signal point which is one of a plurality of predetermined data signal points in the vector signal space;

said signal point generation means comprising a frame synchronization unit for generating a frame synchronization signal;

a signal superimposing means for superimposing an analog signal on said data signal point; and a multiplier for multiplying the signal generated by said signal superimposing means by the frame synchronization signal.

6. A signal processing unit according to claim 5, wherein:

said data signal point generation means further comprises a quadrant decision means for detecting the phase of the data signal point; and a second multiplier which rotates a phase of the analog signal according to the phase of the data signal point.

7. A signal processing unit for use in a receiver, comprising:

a frame synchronization unit for generating a frame synchronization signal;

a multiplier for multiplying the signal received through a transmission line by the frame synchronization signal;

a decision unit for receiving the multiplied signal, and determining to which one of the plurality of predetermined data signal points in a signal space the multiplied signal corresponds; and a subtraction unit for subtracting an output signal of said decision unit from an output of said multiplier.

8. A signal processing unit according to claim 7, and further comprising a frame synchronization detection unit for monitoring the output of said subtraction unit.

9. A signal processing unit for use in a transmitter, comprising:

a signal information division means for dividing information carried by an input signal into a first and a second portions;

a data signal point generation means for receiving the first portion of the input signal in multiplexed form through a multiplexer and generating a data signal point which is one of a plurality of predetermined data signal points in a vector signal space; and a signal superimposing means for receiving the data signal point and the second portion of the input signal, and superimposing the second portion of the input signal onto the data point.

10. A signal processing unit according to claim 9, wherein:

said signal information division means comprises:

a quantization unit for quantizing the input signal and outputting a quantized signal as the first portion of said signal; and a remainder signal generation unit for generating a remainder signal in the operation of the quantization unit as the second portion of said signal;

said signal superimposing means superimposing said remainder signal onto the data signal point generated from said quantized signal.

11. A signal processing unit according to claim 9, wherein:

said signal information division means extracts an amplitude component of said input signal as the first portion of said input signal, and a remainder component of the input signal as the second portion of signal, from the input signal.

12. A signal processing unit for use in a receiver, comprising:

a decision unit for determining to which one of a plurality of predetermined data signal point in a vector signal space an input signal corresponds, and outputting the determined data signal point as a first signal portion;

a signal subtracter means for receiving the input signal and a first signal portion, subtracting an output signal of the decision unit from the received signal and outputting the subtracted result as a second signal portion; and a signal synthesis unit for synthesizing the first portion of said signal and the second portion of said signal, to output a regenerated signal.

13. A signal processing unit for use in a transmitter, comprising:

a data signal point generation mean for receiving a serial digital data signal, and generating a first vector base band signal in a vector signal space, based on a block series of samples of the received serial digital data signal, where the generated data signal point is one of a plurality of a predetermined data signal points in the vector signal space;

a base band transformation means for receiving an analog signal in the form of a passband signal, and transforming the analog signal into a second vector base band signal;

said data signal point generation means including a quadrant decision unit for detecting the phase of the data signal point and a multiplier which rotates the phase of the analog vector signal according to the phase of the data signal point detected by said quadrant decision unit;

a vector signal superimposing means for superimposing a plurality of vector components of the second vector base band signal on a plurality of vector components of the first vector base band signal, component by component to generate a superimposed vector base band signal; and a modulation means for modulating the superimposed vector base band signal to generate an analog modulated signal to be transmitted through an analog transmission line.

14. A signal processing unit for use in a receiver, comprising:

a demodulator means for receiving an analog modulated signal from an analog transmission line and demodulating the analog modulated signal to regenerate a superimposed vector base band signal;

a decision means for receiving the regenerated superimposed vector base band signal, and determining to which one of a plurality of predetermined data signal points in a vector signal space the regenerated superimposed vector base band signal corresponds to regenerate a first vector base band signal;

a vector signal subtracter means for receiving the regenerated superimposed vector base band signal and the regenerated first vector base band signal, and subtracting a plurality of vector components of the first vector base band signal from a plurality of vector components of the superimposed vector base band signal, component by component, to regenerate the respective vector components of a second base band signal and output an analog vector signal;

said decision means including a quadrant decision unit for detecting the phase of said determined signal point;

a multiplier, coupled to said quadrant decision unit and said vector signal subtracter means for inversely rotating the phase of the analog vector signal according to the phase of said determined signal point, detected by said quadrant decision unit;

a code transformation means for receiving the first vector base band signal, and transforming the first vector base band signal to regenerate the serial digital data signal; and a passband transformation means for receiving the regenerated second base band signal, and transforming the regenerated second base band signal to regenerate the analog signal in the form of the passband signal.

15. A signal processing unit according to claim 14, wherein said decision means includes a soft-decision circuit and said quadrant decision unit coupled thereto and detecting the phase of a soft-decided signal point.

* * * * *